US012760243B2

(12) United States Patent
Humby-Smith et al.

(10) Patent No.: US 12,760,243 B2
(45) Date of Patent: Oct. 13, 2026

(54) BIOMASS DERIVED SURFACE-ACTIVE COMPOSITIONS AND PRODUCTS

(71) Applicant: PFEIFER & LANGEN UK LIMITED, Cambridge (GB)

(72) Inventors: Gemma L. Humby-Smith, Cambridge (GB); Jeremy Bartosiak-Jentys, Cambridge (GB); Alexander Nicholls, Cambridge (GB); Thomas J. Simmons, Cambridge (GB)

(73) Assignee: PFEIFER & LANGEN UK LIMITED, Cambridge (GB)

( * ) Notice: Subject to any disclaimer, the term of this patent is extended or adjusted under 35 U.S.C. 154(b) by 199 days.

(21) Appl. No.: 18/749,873

(22) Filed: Jun. 21, 2024

(65) Prior Publication Data

US 2025/0101338 A1 Mar. 27, 2025

Related U.S. Application Data

(63) Continuation of application No. PCT/EP2022/087601, filed on Dec. 22, 2022.

(60) Provisional application No. 63/292,642, filed on Dec. 22, 2021, provisional application No. 63/292,636, filed on Dec. 22, 2021.

(51) Int. Cl.

| | |
|---|---|
| ***C11D 1/00*** | (2006.01) |
| ***A61K 8/00*** | (2006.01) |
| ***C11D 1/58*** | (2006.01) |

(52) U.S. Cl.

CPC .................................... *C11D 1/58* (2013.01)

(58) Field of Classification Search

None

See application file for complete search history.

(56) References Cited

U.S. PATENT DOCUMENTS

| | | | |
|---|---|---|---|
| 7,033,626 | B2 | 4/2006 | Spendler et al. |
| 7,151,079 | B2 | 12/2006 | Fack et al. |
| 7,378,103 | B2 | 5/2008 | Kanji et al. |
| 7,598,069 | B2 | 10/2009 | Felby et al. |
| 7,754,456 | B2 | 7/2010 | Penttila et al. |
| 7,993,463 | B2 | 8/2011 | Griffin et al. |
| 8,057,840 | B2 | 11/2011 | Harrison et al. |
| 8,202,842 | B2 | 6/2012 | Sinclair et al. |
| 8,247,200 | B2 | 8/2012 | Foody et al. |
| 8,663,952 | B2 | 3/2014 | He et al. |

(Continued)

FOREIGN PATENT DOCUMENTS

| | | |
|---|---|---|
| EP | 1466926 B1 | 8/2007 |
| EP | 1751296 B1 | 4/2009 |

(Continued)

OTHER PUBLICATIONS

Aachary et al. Xylooligosaccharides (XOS) as an Emerging Prebiotic: Microbial Synthesis, Utilization, Structural Characterization, Bioactive Properties, and Applications. Comprehensive Reviews in Food Science and Food Safety, vol. 10, pp. 2-16 (2011).

(Continued)

*Primary Examiner* — Necholus Ogden, Jr.

(74) *Attorney, Agent, or Firm* — MH2 Technology Law Group, LLP

(57) ABSTRACT

Described herein are novel glycolipid surface-active compositions, products of, and methods of making the same.

21 Claims, 30 Drawing Sheets

A = XOS
B = Example 4 composition
C = Example 5 composition
D = Example 6 composition
E = Example 7 composition

(56) References Cited

U.S. PATENT DOCUMENTS

| | | | |
|---|---|---|---|
| 8,679,794 | B2 | 3/2014 | Muniglia et al. |
| 8,894,771 | B2 | 11/2014 | Floyd et al. |
| 8,927,038 | B2 | 1/2015 | Broekaert et al. |
| 8,956,846 | B2 | 2/2015 | Ben Chaabane et al. |
| 9,062,328 | B2 | 6/2015 | Medoff |
| 9,090,916 | B2 | 7/2015 | Casanave et al. |
| 9,113,652 | B2 | 8/2015 | Pilling et al. |
| 9,150,895 | B2 | 10/2015 | Kurihara et al. |
| 9,458,482 | B2 | 10/2016 | Bals et al. |
| 9,580,729 | B2 | 2/2017 | Noda et al. |
| 9,605,291 | B2 | 3/2017 | Yamada et al. |
| 9,670,516 | B2 | 6/2017 | Minamino et al. |
| 9,783,860 | B2 | 10/2017 | Floyd et al. |
| 9,797,021 | B2 | 10/2017 | Floyd et al. |
| 9,920,309 | B2 | 3/2018 | Reisinger et al. |
| 9,920,346 | B2 | 3/2018 | Funada et al. |
| 9,955,707 | B2 | 5/2018 | Delbaere |
| 9,963,725 | B2 | 5/2018 | Lali et al. |
| 9,963,728 | B2 | 5/2018 | Minamino et al. |
| 9,982,280 | B2 | 5/2018 | Noordam et al. |
| 9,988,657 | B2 | 6/2018 | Nagy et al. |
| 10,041,138 | B1 | 8/2018 | Eyal et al. |
| 10,131,923 | B2 | 11/2018 | Noordam et al. |
| 10,167,576 | B2 | 1/2019 | Chao et al. |
| 10,174,351 | B2 | 1/2019 | Smits et al. |
| 10,253,343 | B2 | 4/2019 | Yamada et al. |
| 10,351,633 | B2 | 7/2019 | Cheng et al. |
| 10,426,791 | B2 | 10/2019 | Speelmans et al. |
| 10,428,362 | B2 | 10/2019 | Nagy et al. |
| 10,472,657 | B2 | 11/2019 | Nagy et al. |
| 10,487,369 | B2 | 11/2019 | Floyd et al. |
| 10,557,153 | B2 | 2/2020 | De et al. |
| 10,563,238 | B2 | 2/2020 | Yamada et al. |
| 10,570,432 | B2 | 2/2020 | Nishino et al. |
| 10,633,461 | B2 | 4/2020 | Richard et al. |
| 10,752,705 | B2 | 8/2020 | Geremia et al. |
| 11,134,709 | B2 | 10/2021 | Hofmekler |
| 11,151,848 | B2 | 10/2021 | Strong et al. |
| 11,180,786 | B2 | 11/2021 | Cao et al. |
| 11,193,005 | B2 | 12/2021 | Behabtu |
| 11,208,674 | B2 | 12/2021 | Konishi et al. |
| 11,253,818 | B2 | 2/2022 | Kurihara et al. |
| 11,254,957 | B2 | 2/2022 | Retsina et al. |
| 11,279,960 | B2 | 3/2022 | Kasahara et al. |
| 2003/0091691 | A1 | 5/2003 | Olsen et al. |
| 2009/0042266 | A1 | 2/2009 | Vehmaanpera et al. |
| 2009/0305935 | A1 | 12/2009 | Cascao-Pereira et al. |
| 2011/0143402 | A1 | 6/2011 | De Laat et al. |
| 2012/0135500 | A1 | 5/2012 | Aehle et al. |
| 2013/0095531 | A1 | 4/2013 | Schooneveld-Bergmans et al. |
| 2013/0157318 | A1 | 6/2013 | Ishikawa et al. |
| 2017/0303548 | A1 | 10/2017 | Krogh et al. |
| 2020/0071736 | A1 | 3/2020 | Hammerer et al. |
| 2020/0113215 | A1 | 4/2020 | Hofmekler |
| 2020/0123577 | A1 | 4/2020 | De Laat et al. |
| 2020/0128860 | A1 | 4/2020 | Hofmekler |
| 2020/0216574 | A1 | 7/2020 | Richard et al. |
| 2020/0308212 | A1 | 10/2020 | Falck |
| 2021/0120855 | A1 | 4/2021 | Park et al. |
| 2021/0207321 | A1 | 7/2021 | Loureiro et al. |
| 2021/0227853 | A1 | 7/2021 | Pia |
| 2021/0253977 | A1 | 8/2021 | Huang et al. |
| 2021/0347694 | A1 | 11/2021 | Havenith et al. |
| 2021/0395284 | A1 | 12/2021 | Baur et al. |
| 2022/0017766 | A1 | 1/2022 | Kalb |
| 2022/0132896 | A1 | 5/2022 | Kannar et al. |

FOREIGN PATENT DOCUMENTS

| | | | | | |
|---|---|---|---|---|---|
| EP | 1699974 | B1 | | 7/2009 | |
| EP | 2235195 | B1 | | 7/2011 | |
| EP | 2076271 | B1 | | 9/2011 | |
| EP | 1871400 | B1 | | 10/2011 | |
| EP | 1811038 | B1 | | 2/2012 | |
| EP | 2225387 | B1 | | 9/2012 | |
| EP | 2265127 | B1 | | 10/2013 | |
| EP | 2665823 | A1 | | 11/2013 | |
| EP | 2427565 | B1 | | 1/2014 | |
| EP | 1977652 | B1 | | 3/2015 | |
| EP | 3013155 | A1 | | 5/2016 | |
| EP | 3034517 | A1 | | 6/2016 | |
| EP | 1706477 | B1 | | 10/2016 | |
| EP | 2313514 | B1 | | 11/2016 | |
| EP | 2784156 | B1 | | 6/2017 | |
| EP | 2817374 | B1 | | 6/2017 | |
| EP | 2996492 | B1 | | 7/2017 | |
| EP | 3041941 | B1 | | 12/2017 | |
| EP | 2548966 | B1 | | 7/2018 | |
| EP | 2548965 | B1 | | 8/2018 | |
| EP | 2117322 | B1 | | 10/2018 | |
| EP | 3177728 | B1 | | 10/2018 | |
| EP | 3177729 | B1 | | 10/2018 | |
| EP | 3182830 | B1 | | 10/2018 | |
| EP | 3190189 | B1 | | 12/2018 | |
| EP | 2734633 | B1 | | 5/2019 | |
| EP | 2917359 | B1 | | 7/2019 | |
| EP | 3541870 | A1 | | 9/2019 | |
| EP | 2917355 | B1 | | 10/2019 | |
| EP | 3088530 | B1 | | 4/2020 | |
| EP | 3511418 | B1 | | 7/2020 | |
| EP | 3737769 | A1 | | 11/2020 | |
| EP | 3010352 | B1 | | 12/2020 | |
| EP | 3784045 | A1 | | 3/2021 | |
| EP | 3815540 | A1 | | 5/2021 | |
| EP | 3960772 | A1 | | 3/2022 | |
| EP | 3981379 | A2 | | 4/2022 | |
| EP | 3993644 | A1 | | 5/2022 | |
| EP | 3438272 | B1 | | 6/2022 | |
| JP | H06192688 | A | * | 7/1994 | ............. C11D 9/262 |
| JP | 2006087319 | A | | 4/2006 | |
| WO | WO-2013016115 | A1 | | 1/2013 | |
| WO | WO-2013096603 | A2 | | 6/2013 | |
| WO | WO-2013159005 | A2 | | 10/2013 | |
| WO | WO-2019010336 | A1 | | 1/2019 | |
| WO | WO-2019227525 | A1 | | 12/2019 | |
| WO | WO-2019239366 | A1 | | 12/2019 | |
| WO | WO-2020009964 | A1 | | 1/2020 | |
| WO | WO-2021074271 | A1 | | 4/2021 | |
| WO | WO-2021074316 | A1 | | 4/2021 | |
| WO | WO-2021243151 | A1 | | 12/2021 | |
| WO | WO-2021257921 | A1 | | 12/2021 | |
| WO | WO-2022034078 | A1 | | 2/2022 | |
| WO | WO-2022060726 | A1 | | 3/2022 | |
| WO | WO-2022067131 | A1 | | 3/2022 | |
| WO | WO-2022069084 | A1 | | 4/2022 | |
| WO | WO-2022073646 | A1 | | 4/2022 | |
| WO | WO-2023118500 | A1 | | 6/2023 | |

OTHER PUBLICATIONS

Basholli-Salihu et al. The Use of Cellobiose and Fructooligosaccharide on Growth and Stability of Bifidobacterium infantis in Fermented Milk. Food and Nutrition Sciences, 2013, 4, 1301-1306. Published Online Dec. 2013. DOI: http://dx.doi.org/10.4236/fns.2013.412167.

Bhale et al. Enzymatic activity of *Trichoderma* species. Novus Natural Science Research, 2012, vol. 1, No. 4. 8 pages.

Bouxin, Florent, et al. Direct conversion of xylan into alkyl pentosides. Carbohydrate research. 345(17):2469-2473 (2010).

Green et al. Industrial Fungal Enzymes: An Occupational Allergen Perspective. Journal of Allergy, vol. 2011, Article ID 682574, 11 pages.

PCT/EP2022/087601 International Search Report and Written Opinion dated Mar. 30, 2023.

Qi et al. Application of ultrafiltration and nanofiltration for recycling cellulase and concentrating glucose from enzymatic hydrolyzate of steam exploded wheat straw. Bioresour Technol. Jan. 2012; 104:466-72. doi: 10.1016/j.biortech.2011.10.049. Epub Oct. 31, 2011.

* cited by examiner

A = XOS
B = Example 4 composition
C = Example 5 composition
D = Example 6 composition
E = Example 7 composition A = XOS
B = Xylose
C = Example 6 composition
D = Example 12 composition A = XOS; B = *n*-decylamine; C = Example 4 composition; D = Example 5 composition
E = Example 6 composition; F = Example 7 composition; G = Dodecyl Glucoside A = XOS; B = *n*-decylamine; C = Example 4 composition; D = Example 5 composition
E = Example 6 composition; F = Example 7 composition; G = Dodecyl Glucoside A = Sodium dodecyl sulfate; B =dodecyl glucoside;
C = Example 11 composition; D = Example 5 composition;
E = Example 27 composition; F = Example 26 composition;
G = Example 25 composition; H = Example 23 composition;
I = Example 34 composition A = Dodecyl Glucoside; B = Example 11 composition; C = Example 5 composition; D = Example 27 composition; E = Example 26 composition; F = Example 25 composition; G = Example 23 composition; H = Example 34 composition; I = Example 10 composition

Foaming tests after 10 minutes

Water in oil emulsions (0.5 wt% surfactant)

1.5 ml of vegetable oil, 0.5 mL of water

G = No surface-active composition; H = Example 4 composition;
I = Example 5 composition; J = Example 6 composition;
K = Example 7 composition; L = Dodecyl Glucoside.

Water in oil emulsions (0.5 wt% surfactant)
1.5 ml of vegetable oil, 0.5 mL of water

Left to right (in each image): Example 14 composition; Example 11 composition; Example 13 composition; Example 12 composition; Sodium dodecyl sulfate; dodecyl glucoside; xylose; No surface-active composition.

| Saccharide component of compound | Product Peak Area | Percentage of total area of selected compounds |
|---|---|---|
| Xylose/arabinose (monosaccharide) | 278818 | 1.8% |
| Glucose (monosaccharide) | 23714 | 0.2% |
| Xylobiose (DP 2) | 2507712 | 16.0% |
| Cellobiose (DP 2) | 199385 | 1.3% |
| Arabinofuranosyl-xylobiose (DP3) | 1888068 | 12.1% |
| Xylotriose (DP 3) | 3452033 | 22.1% |
| Xylotetraose | 4168003 | 26.5% |
| Xylopentaose | 3132721 | 20.0% |

A = No surface active composition; B = Sodium dodecyl sulfate;
C = Decyl glucoside; D = Cocamidopropyl betaine;
E = Example 10 composition; F = Example 11 composition;
G = Example 12 composition; H = Example 17 composition;

| Saccharide component of compound | Product Peak Area | Percentage of total area of selected compounds |
|---|---|---|
| Xylose/arabinose (monosaccharide) | 8842811 | 20.5% |
| Glucose (monosaccharide) | 6548424 | 15.2% |
| Xylobiose (DP 2) | 11413526 | 26.4% |
| Cellobiose (DP 2) | 5359280 | 12.4% |
| Arabinofuranosyl-xylobiose (DP3) | 3579309 | 8.3% |
| Xylotriose (DP 3) | 2882607 | 6.7% |
| Xylotetraose | 3379982 | 7.8% |
| Xylopentaose | 328511 | 0.8% |
| Xylohexaose | 804320 | 1.9% |

A =Example 10 Composition; B = Example 11 composition;
C = Decyl glucoside; D = Dodecyl glucoside;
E = Coco glucoside; F = Cocoamidopropyl betaine;
G = No additional surface active composition;
H = No additional surface-active composition, no sodium dodecyl sulfate and no sodium chloride

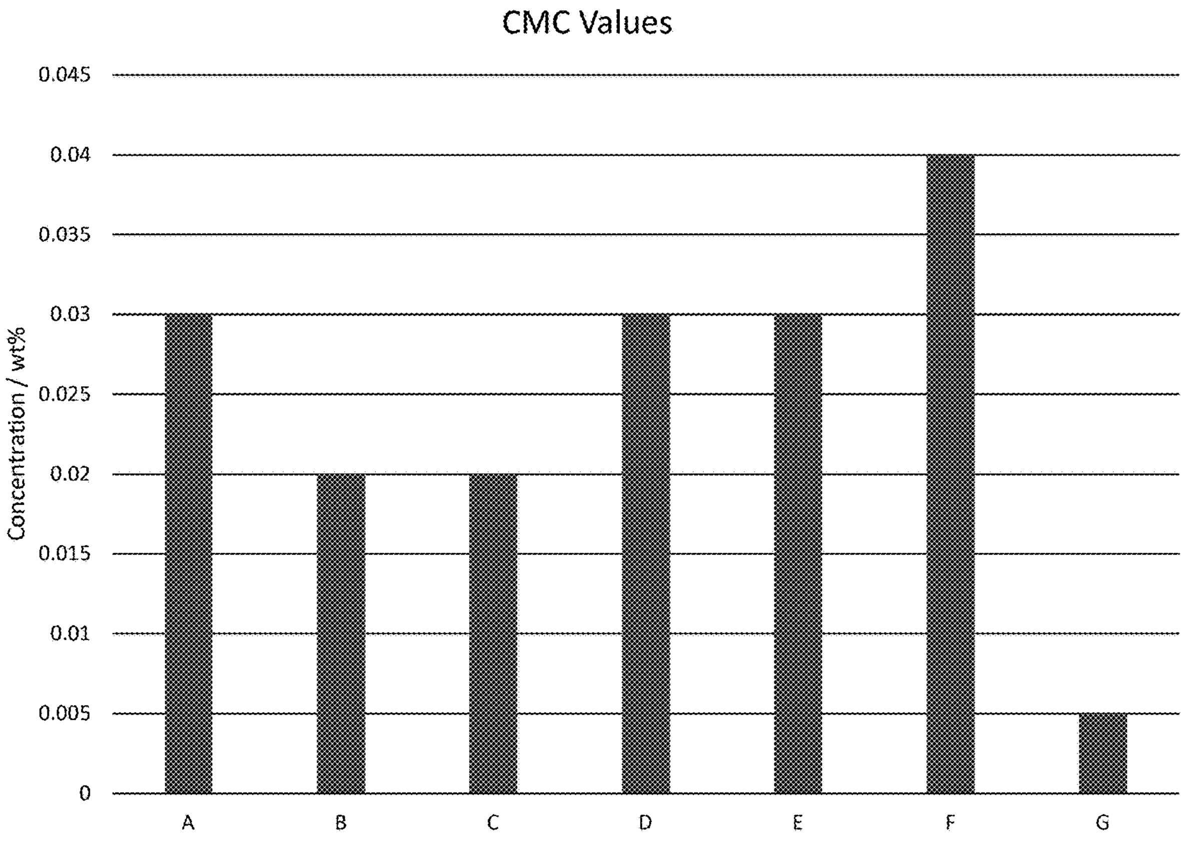

A = Example 5 composition (N-dodecyl-N-acetylxylo-oligosylamine);
B = Example 27 composition (N-dodecyl-N-acetyloligosylamine 75:25 (XOS:CB)-C12);
C = Example 26 composition (N-dodecyl-N-acetyloligosylamine 50:50 (XOS:CB)-C12);
D = Example 25 composition (N-dodecyl-N-acetyloligosylamine 25:75 (XOS:CB)-C12);
E = Example 23 composition (N-dodecyl-N-acetylcellobiosylamine) ;
F = Example 11 composition (N-decyl-N-acetylxylosylamine);
G = Example 17 composition (N-tetradecyl N-acetyl oligosylamine (XOS/COS = 3:1)).

*FIG. 22*

Contaminated object before application of Example 51 surface cleaner product

Contaminated object after application of Example 51 surface cleaner product

MS Peak areas for selected components of example 5 composition

| Saccharide component of selected compound | MS Peak Area / arbitrary units | Percentage of total area of selected compounds |
|---|---|---|
| Xylose (monosaccharide) | 6268797 | 10.1% |
| Xylobiose | 13000405 | 20.9% |
| Xylotriose | 12887835 | 20.7% |
| Xylotetraose | 22222562 | 35.8% |
| Xylopentaose | 5847922 | 9.4% |
| Xylohexaose | 1751832 | 2.8% |
| Xyloheptaose | 161883 | 0.3% |

*FIG. 28*

MS Peak areas for selected components of example 19 composition

| Saccharide component of selected compound | MS Peak Area / arbitrary units | Percentage of total area of selected compounds |
|---|---|---|
| Xylobiose | 746967 | 15.9% |
| Cellobiose | 1269747 | 27.0% |
| Xylotriose | 1149322 | 24.4% |
| Xylotetraose | 848545 | 18.0% |
| Xylopentaose | 477783 | 10.2% |
| Xylohexaose | 211759 | 4.5% |

*FIG. 29*

MS Peak areas for selected components of the product mixture of example 37, part iv)

| Saccharide component of selected compound | MS Peak Area / arbitrary units | Percentage of total area of selected compounds |
|---|---|---|
| Xylose (monosaccharide) | 5391950 | 26.2% |
| Xylobiose | 5879679 | 28.5% |
| Xylotriose | 2392279 | 11.6% |
| Xylotetraose | 2815032 | 13.6% |
| Xylopentaose | 2815373 | 13.7% |
| Xylohexaose | 1318641 | 6.4% |

*FIG. 30*

BIOMASS DERIVED SURFACE-ACTIVE COMPOSITIONS AND PRODUCTS

CROSS-REFERENCE

This application claims the benefit of International Application No. PCT/EP2022/087601 filed Dec. 22, 2022, which claims the benefit of U.S. Provisional Application Nos. 63/292,636 filed Dec. 22, 2021, and 63/292,642 filed Dec. 22, 2021, all of which are hereby incorporated by reference in their entirety.

BACKGROUND

Surface-active agents are widely utilized as detergents, emulsifiers, dispersants, filming or foam forming agents, and various other applications. Accordingly, new surface-active agents derived from abundant feedstocks are needed to meet the demands of these applications.

SUMMARY

In one aspect described herein, is a surface-active composition comprising a plurality of xylo-based surface-active agents, each of the plurality of xylo-based surface-active agents comprising (i) a xylo-component, and (ii) a fatty chain; each xylo-component independently being a xylose or xylo-oligosaccharide, and the xylo-component being covalently linked to the fatty chain through a linker bound to an anomeric carbon of the xylo-component, the linker comprising a nitrogen atom. In some embodiments, the xylo-oligosaccharide of the composition comprises an average of two to eight monomeric residues of xylose. In some embodiments, the xylo-component of each of the xylo-based surface-active agents independently comprises a xylo-oligosaccharide comprising two to eight monomeric residues of xylose. In some embodiments, the fatty chain is an alkyl chain, an alkenyl chain, an alkynyl chain, a heteroalkyl chain, an acyl chain, or an aryl substituted chain. In some embodiments, the fatty chain is linked through an amine, an imine, or an amide group.

In some embodiments, the fatty chain is a substituted or unsubstituted $C_4$-$C_{24}$ alkyl chain. In some embodiments, the fatty chain is a substituted or unsubstituted $C_4$-$C_{24}$ alkenyl chain. In some embodiments, the fatty chain is a substituted or unsubstituted $C_4$-$C_{24}$ alkynyl chain. In some embodiments, the fatty chain is a substituted or unsubstituted $C_4$-$C_{24}$ heteroalkyl chain. In some embodiments, the fatty chain is a substituted or unsubstituted $C_2$-$C_{24}$ acyl chain. In some embodiments, the fatty chain is an aryl substituted $C_4$-$C_{24}$ chain.

In some embodiments, the amine group is substituted by one of the following: a substituted or unsubstituted $C_5$-$C_{24}$ acyl, a formyl, an acetyl, a propionyl, or a butyryl group. In some embodiments, the amine group is substituted by one of the following: a methyl, an ethyl, a propyl, a butyl, or a pentyl group or a substituted or unsubstituted $C_6$-$C_{24}$ alkyl group. In some embodiments, the amine group is substituted by one of the following: a $C_4$-$C_{24}$ alkenyl chain, a $C_4$-$C_{24}$ alkynyl chain, a $C_4$-$C_{24}$ heteroalkyl chain, an aryl substituted $C_4$-$C_{24}$ chain.

In another aspect described herein, the surface-active composition comprises an alkyl xylo-oligosylamine, e.g., an octyl xylo-oligosylamine, or a decyl xylo-oligosylamine, or a dodecyl xylo-oligosylamine, or a tetradecyl xylo-oligosylamine, or hexadecyl xylo-oligosylamine, or an octadecyl xylo-oligosylamine or a combination thereof. In some embodiments, the surface-active composition comprises a N-alkyl N-acetyl xylo-oligosylamine, e.g., a N-octyl N-acetyl xylo-oligosylamine, or a N-decyl N-acetyl xylo-oligosylamine, or a N-dodecyl N-acetyl xylo-oligosylamine, or a N-tetradecyl N-acetyl xylo-oligosylamine, or a N-hexadecyl N-acetyl xylo-oligosylamine, or a N-octadecyl N-acetyl xylo-oligosylamine, or a combination thereof. In some embodiments, the surface-active composition comprises an alkenyl xylo-oligosylamine or an N-alkenyl N-acyl xylo-oligosylamine. In some embodiments, the surface-active composition comprises an alkynyl xylo-oligosylamine or an N-alkynyl N-acyl xylo-oligosylamine. In some embodiments, the surface-active composition comprises a heteroalkyl xylo-oligosylamine or an N-heteroalkyl N-acyl xylo-oligosylamine. In some embodiments, the surface-active agent comprises an aryl substituted chain xylo-oligosylamine or an N-aryl substituted chain N-acyl xylo-oligosylamine. In some embodiments, the surface-active composition comprises a N-alkyl N-acetyl xylosylamine, e.g., a N-octyl N-acetyl xylosylamine, or a N-decyl N-acetyl xylosylamine, or a N-dodecyl N-acetyl xylosylamine, or a N-tetradecyl N-acetyl xylosylamine, or a N-hexadecyl N-acetyl xylosylamine, or a N-octadecyl N-acetyl xylosylamine or a combination thereof.

In another aspect described herein, are surface-active compositions wherein at least one of the plurality of xylo-based surface-active agents is represented by the following structure:

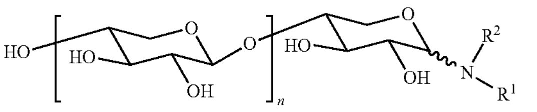

wherein n is integer from 0 to 7 and wherein $R^1$ and $R^2$ are each independently selected from the group: hydrogen, substituted or unsubstituted $C_4$-$C_{24}$ alkyl, substituted or unsubstituted $C_4$-$C_{24}$ alkenyl, substituted or unsubstituted $C_4$-$C_{24}$ alkynyl, substituted or unsubstituted $C_4$-$C_{24}$ heteroalkyl, substituted or unsubstituted $C_2$-$C_{24}$ acyl.

In another aspect described herein, are surface-active composition comprising two or more compounds of Formula (I): H—$(X)_n$—Y—R1, wherein: R1 is independently a substituted or unsubstituted $C_1$-$C_{18}$ alkyl, a substituted or unsubstituted $C_2$-$C_{18}$ alkenyl, or a substituted or unsubstituted $C_2$-$C_{18}$ heteroalkyl, Y is oxygen or N—R2, R2 is independently hydrogen or a substituted or unsubstituted —C(═O)—$C_1$-$C_{17}$ alkyl, X is independently a reducing saccharide residue comprising xylose and arabinose, n is an integer of 1 to 10, wherein at least one compound of the two or more compounds is different from another compound of the two or more compounds.

In some embodiments, the reducing saccharide residue further comprises glucose. In some embodiments, Y is bound to an anomeric carbon of a first reducing saccharide residue of $(X)_n$. In some embodiments, compounds of at least 60% of the surface-active composition have an n of 2 to 10. In some embodiments, a first plurality of compounds of the two or more compounds is H-$(xylose)_n$-Y—R1, and wherein a second plurality of compounds of the two or more compounds is H-$(glucose)_n$-Y—R1 In some embodiments, a ratio of the first plurality of compounds to the second plurality of compounds is at least 99:1. In some embodiments, a ratio of the first plurality of compounds to the second plurality of compounds is at least 95:5. In some embodiments, a ratio of the first plurality of compounds to the second plurality of compounds is at least 90:10. In some embodiments, a ratio of the first plurality of compounds to the second plurality of compounds is at least 80:20. In some embodiments, a ratio of the first plurality of compounds to the second plurality of compounds is at least 70:30. In some embodiments, a ratio of the first plurality of compounds to the second plurality of compounds is at least 60:40. In some embodiments, a ratio of the first plurality of compounds to the second plurality of compounds is at least 50:50. In some embodiments, a ratio of the first plurality of compounds to the second plurality of compounds is at least 40:60. In some embodiments, a ratio of the first plurality of compounds to the second plurality of compounds is at least 30:70. In some embodiments, a ratio of the first plurality of compounds to the second plurality of compounds is at least 20:80. In some embodiments, a ratio of the first plurality of compounds to the second plurality of compounds is at least 10:90. In some embodiments, a ratio of the first plurality of compounds to the second plurality of compounds is at least 5:95. In some embodiments, a ratio of the first plurality of compounds to the second plurality of compounds is at least 1:99. In some embodiments, Y is N—R2, and R2 is hydrogen or a substituted or unsubstituted —C(═O)—$C_1$-$C_{17}$ alkyl. In some embodiments, R1 is independently a substituted or unsubstituted $C_1$-$C_{18}$ alkyl, a substituted or unsubstituted $C_8$-$C_{18}$ alkenyl, or a substituted or unsubstituted $C_2$-$C_{15}$ heteroalkyl. In some embodiments, n is 1 to 6. In some embodiments, the first plurality of compounds comprises xylo-oligosaccharides (XOS). In some embodiments, the second plurality of compounds comprises cello-oligosaccharide (COS). In some embodiments, the surface-active composition comprises monosaccharide. In some embodiments, the surface-active composition is configured to generates foam when rinsed, agitated, or flushed with water.

In one aspect described herein, is a surface-active composition comprising a plurality of sugar moieties derived from biomass, the plurality of sugar moieties comprising at least one modified pentose residue and at least one modified hexose residue, wherein the at least one modified hexose residue is covalently linked to a first fatty chain by a first linker bound to the anomeric carbon of the at least one modified hexose residue, and wherein the at least one modified pentose residue is covalently linked to a second fatty chain by a second linker bound to the anomeric carbon of the at least one modified pentose residue. In some embodiments, each member of the plurality of sugar moieties is independently a monosaccharide, a disaccharide, or an oligosaccharide. In some embodiments, at least two members of the at least one modified pentose residues are independently selected from the group consisting of a modified xylose residue and a modified arabinose residue. In some embodiments, each member of the at least one modified pentose residues is independently a modified xylose residue or a modified arabinose residue. In some embodiments, at least two members of the at least one modified hexose residues are independently selected from the group consisting of a modified glucose residue, a modified mannose residue, a modified galactose residue, a modified fructose residue, and a modified deoxysugar residue. In some embodiments, each member of the at least one modified hexose residues is independently a modified glucose residue, a modified mannose residue, a modified galactose residue, a modified fructose residue, or a modified deoxysugar residue. In some embodiments, the first linker comprises an oxygen, a sulphur, a nitrogen, a carbon, a silicon, or a phosphorus, and wherein the second linker comprises an oxygen, a sulphur, a nitrogen, a carbon, a silicon, or a phosphorus. In some embodiments, the first linker is an ether, a thioether, an ester, an amide, a thioester, an amine, or a phosphate, wherein the second linker is an ether, a thioether, an ester, an amide, a thioester, an amine, or a phosphate.

In another aspect described herein, each of the first fatty chain and the second fatty chain is independently an alkyl chain, an alkenyl chain, an alkynyl chain, a heteroalkyl chain, an acyl chain, or an aryl substituted chain. In some embodiments, each of the first fatty chain and the second fatty chain is independently a substituted or unsubstituted $C_1$-$C_{24}$ alkyl chain. In some embodiments, each of the first fatty chain and the second fatty chain is independently a substituted or unsubstituted $C_4$-$C_{24}$ alkyl chain. In some embodiments, each of the first fatty chain and the second fatty chain is independently a substituted or unsubstituted $C_2$-$C_{24}$ alkenyl chain. In some embodiments, each of the first fatty chain and the second fatty chain is independently a substituted or unsubstituted $C_4$-$C_{24}$ alkenyl chain. In some embodiments, each of the first fatty chain and the second fatty chain is independently a substituted or unsubstituted $C_2$-$C_{24}$ alkynyl chain. In some embodiments, each of the first fatty chain and the second fatty chain is independently a substituted or unsubstituted $C_4$-$C_{24}$ alkynyl chain. In some embodiments, each of the first fatty chain and the second fatty chain is independently a substituted or unsubstituted $C_2$-$C_{24}$ heteroalkyl chain. In some embodiments, each of the first fatty chain and the second fatty chain is independently a substituted or unsubstituted $C_4$-$C_{24}$ heteroalkyl chain. In some embodiments, each of the first fatty chain and the second fatty chain is independently a substituted or unsubstituted $C_2$-$C_{24}$ acyl chain. In some embodiments, each of the first fatty chain and the second fatty chain is independently a $C_4$-$C_{24}$ aryl substituted chain.

In another aspect described herein, are personal care products comprising the surface-active composition described herein and a topically acceptable excipient. In some embodiments, the personal care product is an emulsion, a lotion, a gel, or a cream. In some embodiments, the personal care product is an emulsion of the surface-active composition in water. In some embodiments, the personal care product is an emulsion of the surface-active composition in oil.

In some embodiments, the surface-active composition comprises a xylo-oligosaccharide, or an arabinoxylo-oligosaccharide.

In another aspect described herein, is a compound represented by the following structure:

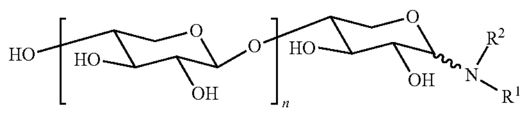

wherein n is an integer from 0 to 7 and wherein $R^1$ and $R^2$ are each independently selected from the group: hydrogen, substituted or unsubstituted $C_4$-$C_{24}$ alkyl, substituted or unsubstituted $C_4$-$C_{24}$ alkenyl, substituted or unsubstituted $C_4$-$C_{24}$ alkynyl, substituted or unsubstituted $C_4$-$C_{24}$ heteroalkyl, substituted or unsubstituted $C_2$-$C_{24}$ acyl. In some embodiments, n is 0 to 4. In some embodiments, n is 0 to 2. In some embodiments, n is 1.

In another aspect described herein, is a surface-active composition comprising a sugar moiety, the sugar moiety comprising one or more pentose residues, wherein a first pentose residue of the one or more pentose residues is covalently linked to a fatty chain through a nitrogen attached to an anomeric carbon of the first pentose residue. In some embodiments, the sugar moiety is an oligosaccharide. In some embodiments, the sugar moiety is a xylo-oligosaccharide. In some embodiments, wherein the sugar moiety is an arabinoxylo-oligosaccharide.

In another aspect described herein, is a personal care product comprising the surface-active composition and a topically acceptable excipient. In some embodiments, the surface-active composition comprises a mixture of alkyl xylo-oligosylamines and alkyl cello-oligosylamines. In some embodiments, the surface-active agent comprises a mixture of alkyl xylo-oligosides and alkyl cello-oligosides. In some embodiments, the personal care product is an emulsion, a lotion, a gel, or a cream. In some embodiments, the personal care product is an emulsion of the surface-active composition in water. In some embodiments, the personal care product is an emulsion of the surface-active composition in oil. In some embodiments, the surface-active agent comprises a cello-oligosaccharide or a xylo-oligosaccharide.

In another aspect described herein, is a composition comprising a plurality of compounds, each member of the plurality of compounds is independently selected from the group consisting of formula (II):

formula (II)

$$H—(X)_n—Y—R^1$$

wherein: X is a reducing D- or L-hexose or pentose, n is an integer from 2 to 8, Y is O, $NR^2$ (or nitrogen-R2), S, $CR^2R^3$, $PR^4$, $PR^5R^6$, $P(=O)R^5$, or $SiR^2R^3$, wherein Y is linked to the anomeric carbon of X.

$R^1$ is independently selected from the group consisting of: a $C_4$-$C_{24}$ alkyl chain, a $C_4$-$C_{24}$ alkenyl chain, a $C_4$-$C_{24}$ alkynyl chain, a $C_4$-$C_{24}$ heteroalkyl chain, a $C_2$-$C_{24}$ acyl chain, an aryl substituted $C_4$-$C_{24}$ chain, each of $R^2$ and $R^3$ is independently selected from the group consisting of: hydrogen, OH, a $C_4$-$C_{24}$ alkyl chain, a $C_4$-$C_{24}$ alkenyl chain, a $C_4$-$C_{24}$ alkynyl chain, a $C_4$-$C_{24}$ heteroalkyl chain, a $C_2$-$C_{24}$ acyl chain, a $C_4$-$C_{24}$ aryl substituted chain, $R^4$ is hydrogen, oxo, $R^1$, or $OR^1$, each of $R^5$ and $R^6$ is independently selected from $R^1$ or $OR^1$.

In some embodiments, n is from 2 to 6. In some embodiments, n is from 2 to 4. In some embodiments, n is 2.

In another aspect described herein, is a home care product comprising the surface-active composition. In some embodiments, the home care product is a cleaner solution. In some embodiments, the home care product is an emulsifying agent. In some embodiments, the home care product is a detergent.

In another aspect described herein, is a surface-active composition wherein:

the modified pentose residue is according to formula (IIIA) or formula (IIIB):

formula (IIIA)

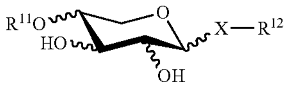

-continued formula (IIIB)

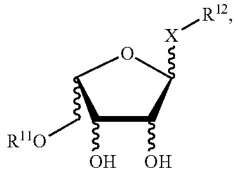

the modified hexose residue is according to formula (IV):

formula (IV)

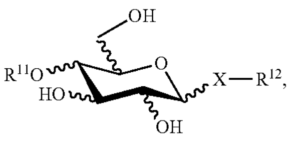

the modified xylose residue is according to formula (V):

formula (V)

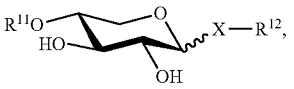

the modified arabinose residue is according to formula (VI):

formula (VI)

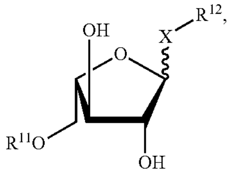

the modified glucose residue is according to formula (VII):

formula (VII)

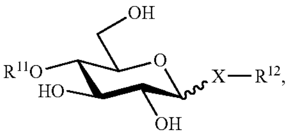

the modified mannose residue is according to formula (VIII):

formula (VIII)

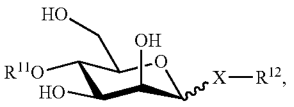

the modified galactose residue is according to formula (IX):

formula (IX)

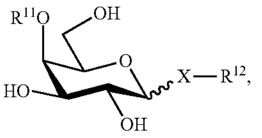

the modified fructose residue is according to formula (X):

formula (X)

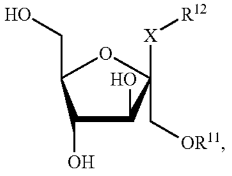

the modified xylo-oligosaccharide is according to formula (XI):

formula (XI)

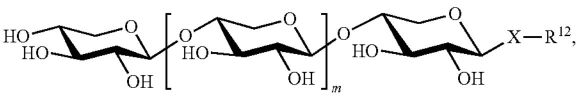

the modified cello-oligosaccharide is according to formula (XII):

formula (XII)

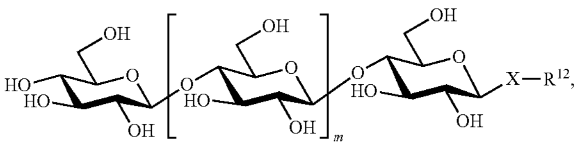

wherein:

m is independently an integer from 0 to 6,

X is independently O, $NR^{13}$, S, S(═O), $S(═O)_2$, $CR^{13}R^{14}$, $SiR^{13}R^{14}$, $PR^{15}$, $PR^{16}R^{17}$, or $P(═O)R^{16}$, $R^{11}$ is independently a hydrogen, a monosaccharide, a disaccharide, or an oligosaccharide, $R^{12}$ is independently $C_4$-$C_{24}$ alkyl chain, a $C_4$-$C_{24}$ alkenyl chain, a $C_4$-$C_{24}$ alkynyl chain, a $C_4$-$C_{24}$ heteroalkyl chain, a $C_2$-$C_{24}$ acyl chain, or an aryl substituted $C_4$-$C_{24}$ chain, each of $R^{13}$ and $R^{14}$ is independently hydrogen, OH, a $C_4$-$C_{24}$ alkyl chain, a $C_4$-$C_{24}$ alkenyl chain, a $C_4$-$C_{24}$ alkynyl chain, a $C_4$-$C_{24}$ heteroalkyl chain, a $C_2$-$C_{24}$ acyl chain, or an aryl substituted $C_4$-$C_{24}$ alkyl chain $R^{15}$ is hydrogen, oxo, $R^{12}$, or $OR^{12}$, $R^{16}$ is independently selected from OH, $R^{12}$ or $OR^{12}$, and $R^{17}$ is independently $R^{12}$ or $OR^{12}$.

In another aspect described herein, are home care products comprising the surface-active composition described herein. In some embodiments, the home care product is a cleaner solution. In some embodiments, the home care product is a detergent. In some embodiments, the home care product is an emulsifying agent.

In another aspect described herein, are methods of preparing the surface-active composition described herein, comprising: (a) providing a lignocellulosic biomass; (b) isolating a saccharide mixture from the lignocellulosic biomass, the saccharide mixture comprising oligosaccharides; and (c) reacting the saccharide mixture with one or more reagents comprising fatty acid chains.

In some embodiments, the method further comprises between (a) and (b), applying a treatment to the lignocellulosic biomass. In some embodiments, the treatment is a thermochemical treatment. In some embodiments, thermochemical treatment comprises at least one hot water treatment or a hot alkali treatment. In some embodiments, the treatment comprises contacting the lignocellulosic biomass with one or more enzymes. In some embodiments, the oligosaccharides comprise xylo-oligosaccharides. In some embodiments, the oligosaccharides comprise cello-oligosaccharides. In some embodiments, the oligosaccharides comprise xylo-oligosaccharides, cello-oligosaccharides, or a mixture thereof. In some embodiments, the saccharide mixture further comprises less than 15% monosaccharides. In some embodiments, the saccharide mixture further comprises disaccharides. In some embodiments, the saccharide mixture comprises no more than 33% monosaccharides and disaccharides. In some embodiments, the method further comprises after (c), (d) isolating a mixture of two or more surface-active compounds. In some embodiments, the isolating is precipitating or filtering. In some embodiments, the two or more surface-active compounds are solids. In some embodiments, the method further comprises between (c) and (d), treating a crude product after (c) with a solvent comprising a polar organic solvent and a non-polar organic solvent, thereby precipitating the mixture of two or more surface-active compounds. In some embodiments, the reacting in (c) comprising (i) treating with $H_2N$—R1. In some embodiments, the reacting in (c) further comprises after (i), (ii) treating with an acylating reagent comprising R2, wherein R2 is substituted or unsubstituted —C(═O)—$C_1$-$C_{17}$ alkyl. In some embodiments, the mixture of two or more surface-active compounds is soluble in water at a concentration of 30 wt % or more.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 21A shows water-in-oil (1:4) emulsion before centrifugation. FIG. 21B shows water-in-oil (1:4) emulsion after centrifugation. FIG. 21C shows oil-in-water (1:4) emulsion before centrifugation. FIG. 21D shows oil-in-water (1:4) emulsion after centrifugation.

FIG. 22 depicts graphical results for CMC determination experiments. A=Example 5 composition (N-dodecyl-N-acetylxylo-oligosylamine); B=Example 27 composition (N-dodecyl-N-acetyloligosylamine 75:25 (XOS:CB)—C12); C=Example 26 composition (N-dodecyl-N-acetyloligosylamine 50:50 (XOS:CB)—C12); D=Example 25 composition (N-dodecyl-N-acetyloligosylamine 25:75 (XOS:CB)—C12); E=Example 23 composition (N-dodecyl-N-acetylcellobiosylamine); F=Example 11 composition (N-decyl-N-acetylxylosylamine); G=Example 17 composition (N-tetradecyl N-acetyl oligosylamine (XOS/COS=3:1)).

[FIG. 23A glass mirror, FIG. 23B plastic box, FIG. 23C benchtop] and after: [FIG. 23D glass mirror, FIG. 23E plastic box, FIG. 23F benchtop] being treated with an example product containing inventive surface-active composition.

FIG. 27A shows Example 57 product: a gel product using xanthan gum base and Example 34 composition. FIG. 27B shows Example 63 product: Water-in-oil emulsion using Example 5 composition. FIG. 27C shows Example 64—Alternative water-in-oil emulsion using example 34 composition.

FIG. 28 depicts MS peak areas calculated for selected compounds from the UPLC chromatogram obtained from Example 5 composition, given as a percentage of the total area for all the selected products in the mixture.

FIG. 29 depicts MS peak areas calculated for selected compounds from the UPLC chromatogram obtained from Example 19 composition, given as a percentage of the total area for all the selected products in the mixture.

FIG. 30 depicts MS peak areas calculated for selected compounds from the UPLC chromatogram obtained from the product of Example 37, part (iv), given as a percentage of the total area for all the selected products in the mixture.

DETAILED DESCRIPTION

Figure 1:
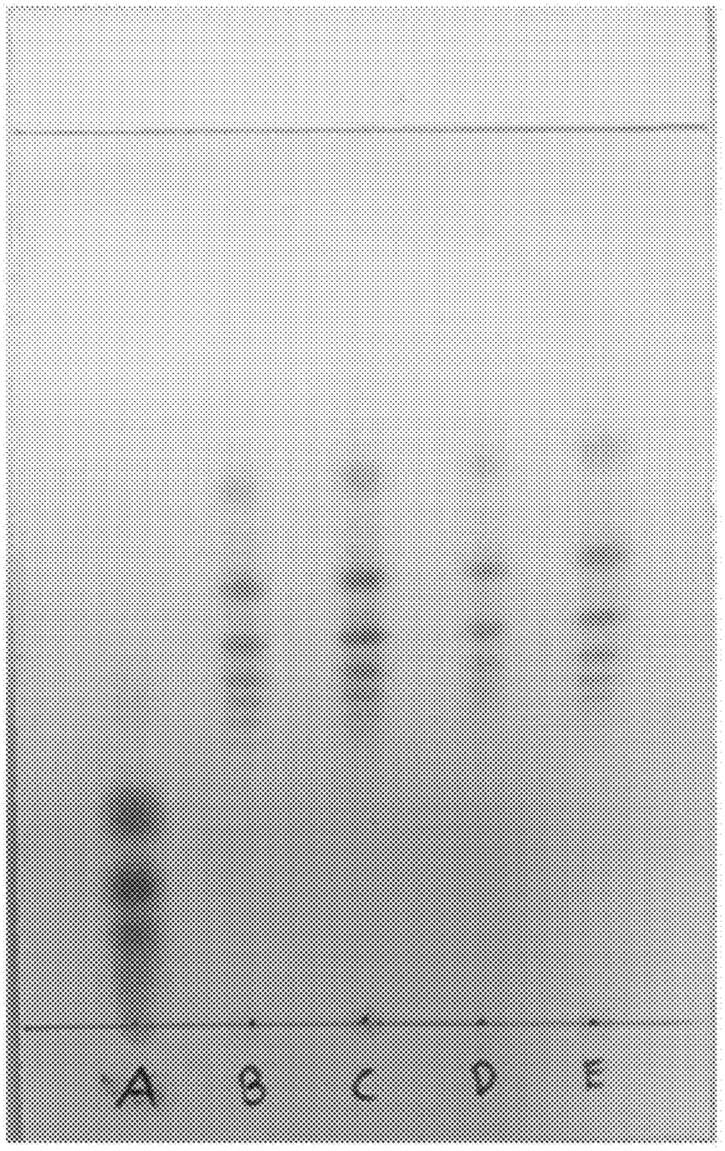
FIG. 1 illustrates the use of a TLC plate for monitoring the conversion of xylo-oligosaccharides mixture (A) to N-alkyl N-acetyl xylo-oligosylamine surface-active agents (B-E). For clarity, XOS: xylo-oligosaccharides; XOS—NAc—C10: N-decyl N-acetyl xylo-oligosylamines—example 4 composition (B); XOS—NAc—C12: N-dodecyl N-acetyl xylo-oligosylamines—example 5 composition (C); XOS—NAc—C14: N-tetradecyl N-acetyl xylo-oligosylamines—example 6 composition (D); XOS—NAc—C16: N-hexadecyl N-acetyl xylo-oligosylamines—example 7 composition I (E).

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Certain inventive embodiments herein contemplate numerical ranges. When ranges are present, the ranges include the range endpoints. Additionally, every sub range and value within the range is present as if explicitly written out. The term "about" or "approximately" may mean within an acceptable error range for the particular value, which depends in part on how the value is measured or determined, e.g., the limitations of the measurement system. For example, "about" may mean within 1 or more than 1 standard deviation, per the practice in the art. Alternatively, "about" may mean a range of up to 20%, up to 10%, up to 5%, or up to 1% of a given value. Where particular values are described in the application and claims, unless otherwise stated the term "about" meaning within an acceptable error range for the particular value may be assumed.

The abbreviations used herein have their conventional meaning within the chemical and biological arts, unless otherwise specified. The chemical structures and formulae set forth herein are constructed according to the standard rules of chemical valency known in the chemical arts.

Where substituent groups are specified by their conventional chemical formulae, written from left to right, they equally encompass the chemically identical substituents that would result from writing the structure from right to left, e.g., $—CH_2O—$ is equivalent to $—OCH_2—$.

The symbol "〰" denotes the point of attachment of a chemical moiety to the remainder of a molecule or chemical formula.

As used herein, the terms "halo" or "halogen" generally refer to bromo, chloro, fluoro or iodo.

As used herein, the term "haloalkyl" generally refers to an alkyl radical, as defined above, that is substituted by one or more halo radicals, as defined above, e.g., trifluoromethyl, difluoromethyl, fluoromethyl, trichloromethyl, 2,2,2-trifluoroethyl, 1,2-difluoroethyl, 3-bromo-2-fluoropropyl, 1,2-dibromoethyl, and the like. Unless stated otherwise specifically in the specification, a haloalkyl group may be optionally substituted.

As used herein, the term "heteroalkyl" generally refers to an alky radical, as defined above, that is substituted by one or more hetero atom group radicals, as defined above, e.g., octyl-2-thiol, propylene glycol, cetostearyl alcohol, lauric ester ethoxylate, 3-oxo-palmitic ester, and the like. Unless stated otherwise specifically in the specification, a heteroalkyl group may be optionally substituted.

As used herein, the term "substituted", unless otherwise indicated, refers to the replacement of one or more hydrogen radicals in a given structure with the radical of a specified substituent including, but not limited to: halo, alkyl, alkenyl, alkynyl, aryl, heterocyclyl, thiol, alkylthio, oxo, thioxy, arylthio, alkylthioalkyl, arylthioalkyl, alkylsulfonyl, alkylsulfonylalkyl, arylsulfonylalkyl, alkoxy, aryloxy, aralkoxy, aminocarbonyl, alkylaminocarbonyl, arylaminocarbonyl, alkoxycarbonyl, aryloxycarbonyl, haloalkyl, amino, trifluoromethyl, cyano, nitro, alkylamino, arylamino, alkylaminoalkyl, arylaminoalkyl, aminoalkylamino, hydroxy, alkoxyalkyl, carboxyalkyl, alkoxycarbonylalkyl, aminocarbonylalkyl, acyl, aralkoxycarbonyl, carboxylic acid, sulfonic acid, sulfonyl, phosphonic acid, aryl, heteroaryl, heterocyclic, and an aliphatic group. It is understood that the substituent may be further substituted. Example substituents include amino, alkylamino, and the like.

As used herein, the term "substituent" generally refers to positional variables on the atoms of a core molecule that are substituted at a designated atom position, replacing one or more hydrogens on the designated atom, provided that the designated atom's normal valency is not exceeded, and that the substitution results in a stable compound. Combinations of substituents and/or variables are permissible only if such combinations result in stable compounds. A person of ordinary skill in the art should note that any carbon as well as heteroatom with valences that appear to be unsatisfied as described or shown herein is assumed to have a sufficient number of hydrogen atom(s) to satisfy the valences described or shown. In certain instances, one or more substituents having a double bond (e.g., "oxo", or "═O") as the point of attachment may be described, shown, or listed herein within a substituent group, wherein the structure may only show a single bond as the point of attachment to the core structure of Formula (I). A person of ordinary skill in the art would understand that, while only a single bond is shown, a double bond is intended for those substituents.

As used herein, the term "alkyl" generally refers to a straight or branched hydrocarbon chain radical, having from one to twenty-four carbon atoms, and which is attached to the rest of the molecule by a single bond. An alkyl comprising up to 24 carbon atoms is referred to as a $C_1$-$C_{24}$ alkyl, likewise, for example, an alkyl comprising up to 6 carbon atoms is a $C_1$-$C_6$ alkyl.

Alkyls (and other moieties defined herein) comprising other numbers of carbon atoms are represented similarly. Alkyl groups include, but are not limited to $C_1$-$C_{24}$ alkyl, $C_1$-$C_{22}$ alkyl, $C_1$-$C_{20}$ alkyl, $C_1$-$C_{18}$ alkyl, $C_1$-$C_{16}$ alkyl, $C_1$-$C_{14}$ alkyl, $C_1$-$C_{12}$ alkyl, $C_1$-$C_{10}$ alkyl, $C_1$-$C_9$ alkyl, $C_1$-$C_8$ alkyl, $C_1$-$C_7$ alkyl, $C_1$-$C_6$ alkyl, $C_1$-$C_5$ alkyl, $C_1$-$C_4$ alkyl, $C_1$-$C_3$ alkyl, $C_1$-$C_2$ alkyl, $C_2$-$C_8$ alkyl, $C_3$-$C_8$ alkyl and $C_4$-$C_8$ alkyl. Representative alkyl groups include, but are not limited to, methyl, ethyl, n-propyl, 1-methylethyl (i-propyl), n-butyl, i-butyl, s-butyl, n-pentyl, 1,1-dimethylethyl (t-butyl), 3-methylhexyl, 2-methylhexyl, 1-ethyl-propyl, and the like. In some embodiments, alkyl is methyl or ethyl. In some embodiments, alkyl is $—CH(CH_3)_2$ or $—C(CH_3)_3$. Unless stated otherwise specifically in the specification, an alkyl group may be optionally substituted as described below. "Alkylene" or "alkylene chain" refers to a straight or branched divalent hydrocarbon chain linking the rest of the molecule to a radical group. In some embodiments, alkylene is $—CH_2—$, $—CH_2CH_2—$, or $—CH_2CH_2CH_2—$. In some embodiments, alkylene is $—CH_2—$. In some embodiments, alkylene is $—CH_2CH_2—$. In some embodiments, alkylene is $—CH_2CH_2CH_2—$.

As used herein, the term "aryl" refers to a radical derived from a hydrocarbon ring system comprising at least one aromatic ring. In some embodiments, an aryl comprises hydrogens and 6 to 30 carbon atoms. The aryl radical can be a monocyclic, bicyclic, tricyclic, or tetracyclic ring system, which may include fused (when fused with a cycloalkyl or heterocycloalkyl ring, the aryl is bonded through an aromatic ring atom) or bridged ring systems. In some embodiments, the aryl is a 6- to 10-membered aryl. In some embodiments, the aryl is a 6-membered aryl. Aryl radicals include, but are not limited to, aryl radicals derived from the hydrocarbon ring systems of anthrylene, naphthylene, phenanthrylene, anthracene, azulene, benzene, chrysene, fluoranthene, fluorene, indane, indene, naphthalene, phenalene, phenanthrene, pleiadene, pyrene, and triphenylene. In some embodiments, the aryl is phenyl. Unless stated otherwise specifically in the specification, an aryl can be optionally substituted, for example, with halogen, amino, alkylamino, aminoalkyl, nitrile, nitro, hydroxyl, alkyl, alkenyl, alkynyl, haloalkyl, heteroalkyl, alkoxy, aryl, cycloalkyl, heterocycloalkyl, heteroaryl, $—S(O)_2NH—C_1$-$C_6$ alkyl, and the like. In some embodiments, an aryl is optionally substituted with halogen, methyl, ethyl, —CN, $—CF_3$, —OH, —OMe, $—NH_2$, $—NO_2$, $—S(O)_2NH_2$, $—S(O)_2NHCH_3$, $—S(O)_2NHCH_2CH_3$, $—S(O)_2NHCH(CH_3)_2$, $—S(O)_2N(CH_3)_2$, or $—S(O)_2NHC(CH_3)_3$. In some embodiments, an aryl is optionally substituted with halogen, methyl, ethyl, —CN, $—CF_3$, —OH, or —OMe. In some embodiments, the aryl is optionally substituted with halogen. In some embodiments, the aryl is substituted with alkyl, alkenyl, alkynyl, haloalkyl, or heteroalkyl, wherein each alkyl, alkenyl, alkynyl, haloalkyl, heteroalkyl is independently unsubstituted, or substituted with halogen, methyl, ethyl, —CN, $—CF_3$, —OH, —OMe, $—NH_2$, or $—NO_2$.

As used herein, the term "alkenyl" generally refers to a type of alkyl group in which at least one carbon-carbon double bond is present. In one embodiment, an alkenyl group has the formula $—C(R^a)═CR^a_2$, wherein $R^a$ refers to the remaining portions of the alkenyl group, which may be the same or different. In some embodiments, $R^a$ is H or an alkyl. In some embodiments, an alkenyl is selected from ethenyl (i.e., vinyl), propenyl (i.e., allyl), butenyl, pentenyl, pentadienyl, and the like. Non-limiting examples of an alkenyl group include $—CH═CH_2$, $—C(CH_3)═CH_2$, $—CH═CHCH_3$, $—C(CH_3)═CHCH_3$, and $—CH_2CH═CH_2$. "Alkenylene" or "alkenylene chain" refers to an alkylene group in which at least one carbon-carbon double bond is present. In some embodiments, alkenylene is —CH═CH—, $—CH_2CH_2CH═CH—$, or $—CH═CHCH_2CH_2—$. In some embodiments, alkenylene is —CH═CH—. In some embodiments, alkenylene is $—CH_2CH_2CH═CH—$. In some embodiments, alkenylene is $—CH═CHCH_2CH_2—$.

As used herein, the term "alkynyl" generally refers to a type of alkyl group in which at least one carbon-carbon triple bond is present. In one embodiment, an alkynyl group has the formula $—C≡CR^a$, wherein $R^a$ refers to the remaining portions of the alkynyl group. In some embodiments, $R^a$ is H or an alkyl. In some embodiments, an alkynyl is selected from ethynyl (i.e., acetylenyl), propynyl (i.e., propargyl), butynyl, pentynyl, and the like. Non-limiting examples of an alkynyl group include —C≡CH, $—C≡CCH_3$, and $—CH_2C≡CH$. "Alkynylene" or "alkynylene chain" refers to an alkylene group in which at least one carbon-carbon triple bond is present. In some embodiments, alkynylene is —C≡C—, $—CH_2CH_2C≡C—$, or $—C≡CCH_2CH_2—$. In some embodiments, alkynylene is —C≡C—. In some embodiments, alkynylene is $—CH_2CH_2C≡C—$. In some embodiments, alkynylene is $—C≡CCH_2CH_2—$.

As used herein, the terms "heteroatom" or "ring heteroatom" generally refer to an atom including oxygen (O), nitrogen (N), sulfur (S), phosphorus (P), and silicon (Si), or any combination thereof.

As used herein, "surface-active" or "surface-active" generally refer to a compound or mixture of compounds which lower the interfacial tension between two or more discrete phases when the compound or mixture of compounds is present at the phase boundary compared to when the compound or mixture is not present at the phase boundary. For example, the two discrete phases may include but are not limited to a lipid phase and an aqueous phase, a lipid phase and a gas phase, an aqueous phase and a gas phase, a lipid phase and a solid phase, or an aqueous phase and a solid phase. Examples of surface-active compounds or mixtures may include but are not limited to: anionic surfactants (e.g. dioctyl sodium sulfosuccinate, perfluorooctanesulfonate, perfluorobutanesulfonate, alkyl-aryl ether phosphates, alkyl ether phosphates, sodium stearate, sodium lauroyl sarcosinate, perfluorononanoate, perfluorooctanoate, etc.); cationic surfactants (e.g. octenidine dihydrochloride, cetrimonium bromide, cetylpyridinium chloride, benzalkonium chloride, benzethonium chloride, dimethyldioctadecylammonium chloride, dioctadecyldimethylammonium bromide, etc.); zwitterionic surfactants (e.g. cocamidopropyl hydroxysultaine, cocamidopropyl betaine, phosphatidylserine, phosphatidylethanolamine, phosphatidylcholine, sphingomyelin, etc.); and non-ionic surfactants (e.g. octaethylene glycol monododecyl ether, pentaethylene glycol monododecyl ether, nonoxynols, Triton X-100, polyethoxylated tallow amine, cocamide monoethanolamine, cocamide diethanolamine, poloxamers, glycerol monostearate, glycerol monolaurate, sorbitan monolaurate, sorbitan monostearate, sorbitan tristearate, polysorbates, decyl glucoside, lauryl glucoside, octyl glucoside, etc.).

As used herein, the term "substituent group," refers to a group selected from the following moieties:

(A) oxo, halogen, $—CF_3$, —CN, —OH, $—NH_2$, —COOH, $—CONH_2$, $—NO_2$, —SH, $—SO_3H$, $—SO_4H$, $—SO_2NH_2$, $—NHNH_2$, $—ONH_2$, —NHC═(O)$NHNH_2$, —NHC═(O) $NH_2$, $—NHSO_2H$, —NHC═(O)H, —NHC(O)—OH, —NHOH, $—OCF_3$, $—OCHF_2$, unsubstituted alkyl, unsubstituted heteroalkyl, unsubstituted cycloalkyl, unsubstituted heterocycloalkyl, unsubstituted aryl, unsubstituted heteroaryl, and (B) alkyl, heteroalkyl, cycloalkyl, heterocycloalkyl, aryl, heteroaryl, substituted with at least one substituent selected from:

(i) oxo, halogen, $—CF_3$, —CN, —OH, $—NH_2$, —COOH, $—CONH_2$, $—NO_2$, —SH, $—SO_3H$, $—SO_4H$, $—SO_2NH_2$, $—NHNH_2$, $—ONH_2$, —NHC═(O)$NHNH_2$, —NHC═(O) $NH_2$, $—NHSO_2H$, —NHC═(O)H, —NHC(O)—OH, —NHOH, $—OCF_3$, $—OCHF_2$, unsubstituted alkyl, unsubstituted heteroalkyl, unsubstituted cycloalkyl, unsubstituted heterocycloalkyl, unsubstituted aryl, unsubstituted heteroaryl, and (ii) alkyl, heteroalkyl, cycloalkyl, heterocycloalkyl, aryl, heteroaryl, substituted with at least one substituent selected from:

(a) oxo, halogen, $—CF_3$, —CN, —OH, $—NH_2$, —COOH, $—CONH_2$, $—NO_2$, —SH, $—SO_3H$, $—SO_4H$, $—SO_2NH_2$, $—NHNH_2$, $—ONH_2$, —NHC═(O)$NHNH_2$, —NHC═(O) $NH_2$, $—NHSO_2H$, —NHC═(O)H, —NHC(O)—OH, —NHOH, $—OCF_3$, $—OCHF_2$, unsubstituted alkyl, unsubstituted heteroalkyl, unsubstituted cycloalkyl, unsubstituted heterocycloalkyl, unsubstituted aryl, unsubstituted heteroaryl, and (b) alkyl, heteroalkyl, cycloalkyl, heterocycloalkyl, aryl, heteroaryl, substituted with at least one substituent selected from: oxo, halogen, $—CF_3$, —CN, —OH, $—NH_2$, —COOH, $—CONH_2$, $—NO_2$, —SH, $—SO_3H$, $—SO_4H$, $—SO_2NH_2$, $—NHNH_2$, $—ONH_2$, —NHC═(O)$NHNH_2$, —NHC═(O) $NH_2$, $—NHSO_2H$, —NHC═(O)H, —NHC(O)—OH, —NHOH, $—OCF_3$, $—OCHF_2$, unsubstituted alkyl, unsubstituted heteroalkyl, unsubstituted cycloalkyl, unsubstituted heterocycloalkyl, unsubstituted aryl, unsubstituted heteroaryl.

In some embodiments, each substituted group described in the compounds herein is substituted with at least one substituent group. More specifically, in some embodiments, each substituted alkyl, substituted heteroalkyl, substituted cycloalkyl, substituted heterocycloalkyl, substituted aryl, substituted heteroaryl, substituted alkylene, substituted heteroalkylene, substituted cycloalkylene, substituted heterocycloalkylene, substituted arylene, and/or substituted heteroarylene described in the compounds herein are substituted with at least one substituent group. In other embodiments, at least one or all of these groups are substituted with at least one size-limited substituent group. In other embodiments, at least one or all of these groups are substituted with at least one lower substituent group.

As used herein, "fatty chain" or "fatty acid chain" refers to a linear or branched, saturated or unsaturated hydrocarbon-based chain comprising from 6 to 30 carbon atoms, from 8 to 30 carbon atoms, from 8 to 24 carbon atoms.

As used herein, "hexose" refers to a monosaccharide with six carbon atoms. Hexoses are compounds such as glucose, mannose, galactose, allose, altrose, gulose, idose, talose or fructose, psicose, sorbose, tagatose or a deoxysugar, fucose, rhamnose, quinovose.

As used herein, "pentose" refers to refers to a monosaccharide with five carbon atoms. Pentoses are compounds such as xylose, arabinose, lyxose, ribose, ribulose, xylulose, deoxyribose.

As used herein, "reducing saccharide residue" refers to the residue of any saccharide that is capable of acting as a reducing agent. Examples of reducing saccharide residues may include but are not limited to: xylose, arabinose, glucose, mannose, galactose, or fructose.

As used herein, "oligosaccharide" refers to saccharide polymers having chain lengths less than or equal to about 20 saccharide residues. Oligosaccharides may be highly branched, lightly branched, or unbranched, may comprise glycosidic bonds in any combination, any number of alpha or beta linkages, and any combination of monomer types, such as glucose, glucosamine, mannose, xylose, galactose, fucose, fructose, glucuronic acid, arabinose, or derivatives thereof. Suitable derivatives include the above monomers comprising acetyl or other groups.

As used herein, "oligosylamine" or "oligoglycosylamine" refers to any compound formed by the replacement of the anomeric (i.e., glycosidic) hydroxyl group of a cyclic form of a monosaccharide or monosaccharide derivative within an oligosaccharide by an amino group or a substituted amine.

As used herein, "monosaccharide" and "disaccharide" refer to saccharide compounds consisting respectively of one or two residues. Monosaccharides are compounds such as glucose, glucosamine, xylose, galactose, fucose, fructose, glucuronic acid, arabinose, galacturonic acid; or epimers or other derivatives thereof. Suitable derivatives include acetyl or other groups. Disaccharides are compounds consisting of two monosaccharides joined via any glycosidic bond.

As used herein, "cello-oligosaccharides" refers to oligosaccharides composed of one or more glucose residues linked by beta-1,4-glycosidic bonds, and may be chemically related to that by oxidation, reduction, esterification, epimerization, or another chemical modification.

As used herein, "xylo-oligosaccharides" refers to oligosaccharides composed primarily of xylose residues (typically linked by beta-1,4-glycosidic bonds) and may also contain glucuronic acid residues and/or arabinose residues and/or acetyl groups and/or any other modification, and may be chemically related to that by oxidation, reduction, esterification, epimerization, or another chemical modification.

As used herein, "manno-oligosaccharides" refers to oligosaccharides composed of one or more mannose residues and may also contain glucose residues and/or galactose residues, and may be chemically related to that by oxidation, reduction, esterification, epimerization, or another chemical modification.

As used herein, "saccharide" generally refers to any polysaccharide and/or oligosaccharide and/or a monosaccharide and/or a disaccharide.

Described herein are chemical methods of producing biomass derived surface-active agents.

As used herein, "cosmetic" refers to any composition which is intended for use on humans or other animals to increase their aesthetic appeal or prevent future loss of aesthetic appeal, as well as any other compositions known in general parlance as cosmetics. Aesthetic appeal is not limited to visual aesthetics but applies as well to textural or any other appeal. The cosmetic may be mascara, foundation, lip gloss, eyeshadow, eyeliner, primer, lipstick blush, nail polish, bronzer, or any other makeup; shampoo, conditioner, styling mousse, styling gel, hairspray, hair dye, hair wax, or any other hair product, moisturizer, exfoliant, sun screen (or sun block, sun cream), cleanser, toothpaste, or a cream, a lotion, ointment, or any other composition effective in modifying teeth, skin, hair or other parts of the body in some aesthetic way. Or it may be a composition used as a component of a face mask, brush, hair roller, other styling device, or other solid structure, or any other suitable composition.

Once a composition of the biomass derived surface-active agent products suitable for the application being considered is obtained, and further treatment and/or isolation is optionally carried out, the derivation of a personal care product, cosmetic, or a home care product from the composition furnishes a very broad array of potential uses. The ingredients of the current invention are useful in applications in which food-grade or non-food grade surface-active agents are conventionally used.

The invention may include a personal care product, cosmetic, or a home care product comprising or produced from the surface-active agent compositions described herein.

Described herein are biomass derived surface-active agent compositions. In some embodiments, the composition may comprise a compound of Formula (I):

Formula (I)

$$H—(X)_n—Y—R^1$$

wherein: X is independently a reducing D- or L-hexose or pentose, n is an integer from 1 to 12, Y is O or $NR^2$, wherein Y is linked to the anomeric carbon of X.

$R^1$ is independently selected from the group consisting of: a $C_1$-$C_{20}$ alkyl chain, a $C_2$-$C_{20}$ alkenyl chain, a $C_2$-$C_{24}$ alkynyl chain, a $C_2$-$C_{24}$ heteroalkyl chain, or a $C_2$-$C_{24}$ acyl chain, and $R^2$ is independently selected from the group consisting of: hydrogen, OH, a $C_1$-$C_{24}$ alkyl chain, a $C_2$-$C_{24}$ alkenyl chain, a $C_2$-$C_{24}$ alkynyl chain, a $C_2$-$C_{24}$ heteroalkyl chain, or a $C_2$-$C_{24}$ acyl chain.

In some embodiments of a compound of formula (I), $R^1$, $R^2$, and $R^3$ may each be independently selected from the group consisting of:

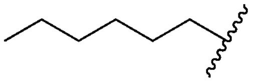,
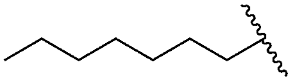,
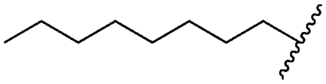,
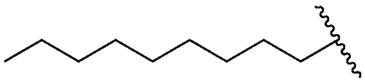,
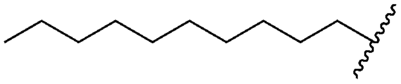,
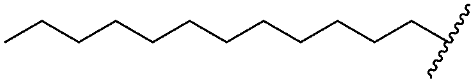,
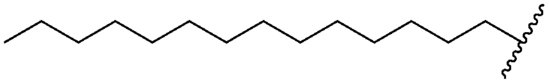,
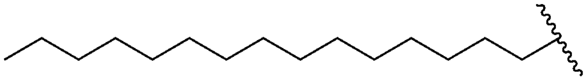,
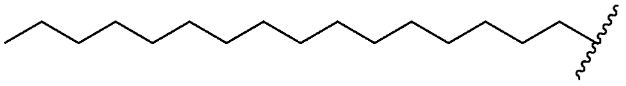,
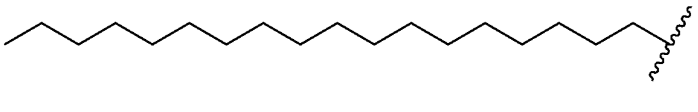, -continued
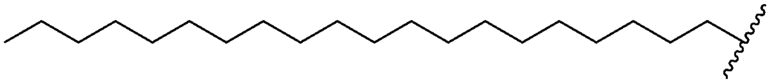,
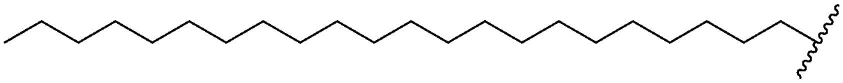,
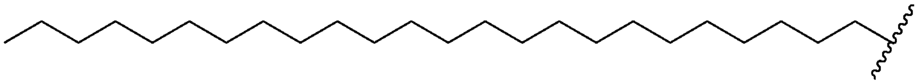,
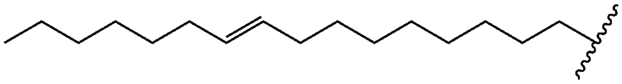,
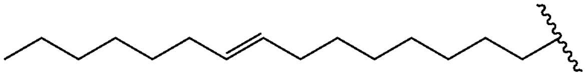,
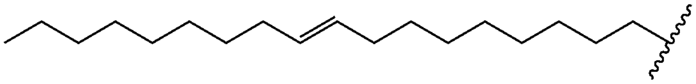,
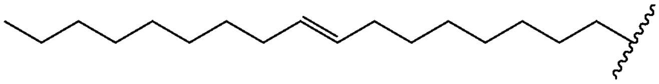,
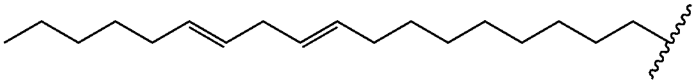,
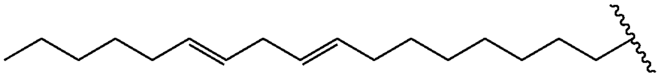,
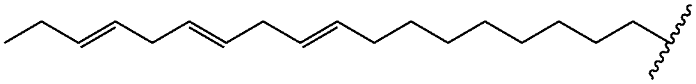
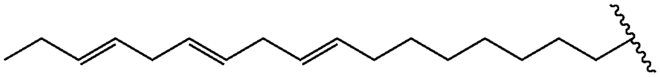,
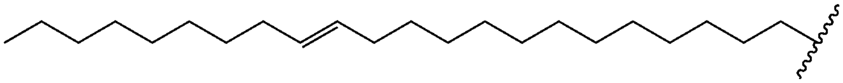,
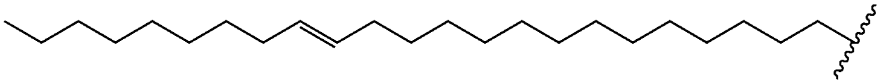,
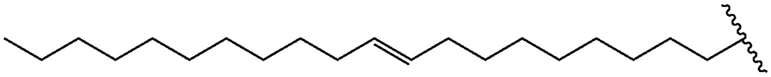,
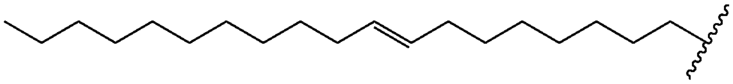,
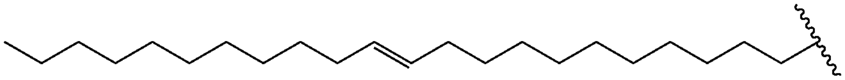,
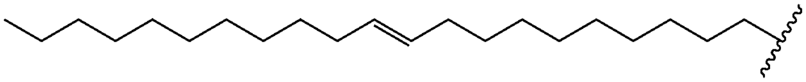,
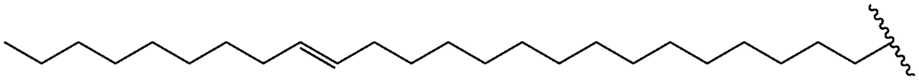,
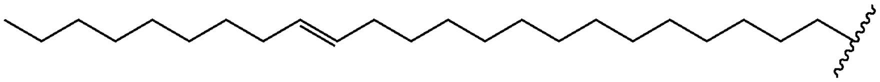,
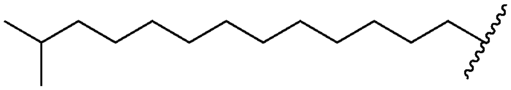, -continued

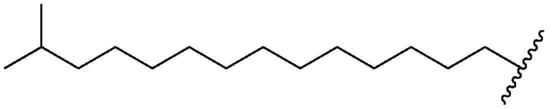 [SMILES: *CCCCCCCCCCCCC(C)C]

hexyl, heptyl, octyl, caprylyl, nonyl, decyl, capryl, dodecyl, lauryl, tetradecyl, myristyl, pentadecyl, hexadecyl, palmityl, octadecyl, stearyl, eicosyl, arachidyl, docosyl, behenyl, tetracosyl, lignoceryl, 9-hexadecenyl, hexadeca-9-enyl, palmitoleyl, 8-pentadecenyl, pentadeca-8-enyl, 9-octadecenyl, octadeca-9-enyl, 8-heptadecenyl, heptadeca-8-enyl, octadeca-9,12-dienyl, heptadeca-8,11-dienyl, octadeca-9,12,15-trienyl, heptadeca-8,11,14-trienyl, docos-13-enyl, henicos-12-enyl, 9-eicosenyl, 8-nonadecenyl, 11-docosenyl, 10-henicosenyl, and 15-tetracosenyl, 14-tricosenyl, 13-methyltetradecyl, 12-methyltridecyl.

In some embodiments of a compounds of Formula (I), n is 0 to 8. In some embodiments of a compound of Formula (I), n is 0 to 8. In some embodiments of a compound of Formula (I), n is 0 to 1, 0 to 2, 0 to 3, 0 to 4, 0 to 5, 0 to 6, 0 to 7, 0 to 8, 1 to 2, 1 to 3, 1 to 4, 1 to 5, 1 to 6, 1 to 7, 1 to 8, 2 to 3, 2 to 4, 2 to 5, 2 to 6, 2 to 7, 2 to 8, 3 to 4, 3 to 5, 3 to 6, 3 to 7, 3 to 8, 4 to 5, 4 to 6, 4 to 7, 4 to 8, 5 to 6, 5 to 7, 5 to 8, 6 to 7, 6 to 8, or 7 to 8. In some embodiments of a compound of Formula (I), n is 0, 1, 2, 3, 4, 5, 6, 7, or 8. In some embodiments of a compound of Formula (I), n is at least 0, 1, 2, 3, 4, 5, 6, or 7. In some embodiments of a compound of Formula (I), n is at most 1, 2, 3, 4, 5, 6, 7, or 8.

In some embodiments of a compound of Formula (I), n is 9 to 20. In some embodiments of a compound of Formula (I), n is 9 to 10, 9 to 11, 9 to 12, 9 to 13, 9 to 14, 9 to 15, 9 to 16, 9 to 17, 9 to 18, 9 to 19, 9 to 20, 10 to 11, 10 to 12, 10 to 13, 10 to 14, 10 to 15, 10 to 16, 10 to 17, 10 to 18, 10 to 19, 10 to 20, 11 to 12, 11 to 13, 11 to 14, 11 to 15, 11 to 16, 11 to 17, 11 to 18, 11 to 19, 11 to 20, 12 to 13, 12 to 14, 12 to 15, 12 to 16, 12 to 17, 12 to 18, 12 to 19, 12 to 20, 13 to 14, 13 to 15, 13 to 16, 13 to 17, 13 to 18, 13 to 19, 13 to 20, 14 to 15, 14 to 16, 14 to 17, 14 to 18, 14 to 19, 14 to 20, 15 to 16, 15 to 17, 15 to 18, 15 to 19, 15 to 20, 16 to 17, 16 to 18, 16 to 19, 16 to 20, 17 to 18, 17 to 19, 17 to 20, 18 to 19, 18 to 20, or 19 to 20. In some embodiments of a compound of Formula (I), n is 9, 10, 11, 12, 13, 14, 15, 16, 17, 18, 19, or 20. In some embodiments of a compound of Formula (I), n is at least 9, 10, 11, 12, 13, 14, 15, 16, 17, 18, or 19. In some embodiments of a compound of Formula (I), n is at most 10, 11, 12, 13, 14, 15, 16, 17, 18, 19, or 20.

In some embodiments, a biomass derived surface-active composition may be a mixture comprising at least two compounds of Formula (I).

In some embodiments, a biomass derived surface-active composition may comprise a mixture of xylo-oligosaccharide covalently linked to a fatty chain and cello-oligosaccharide covalently linked to a fatty chain. In some embodiments, a biomass derived surface-active composition may comprise a mixture of at least two oligosaccharides wherein at least one oligosaccharide is selected from the group of: xylo-oligosaccharide and cello-oligosaccharide.

In some embodiments, the mixture may be defined in weight % of a selected oligosaccharide component. In some embodiments, the mixture may be defined as a relative percentage of one selected oligosaccharide to one or more other oligosaccharides each independently selected from the group of: xylo-oligosaccharide, cello-oligosaccharide, arabinoxylo-oligosaccharide, and manno-oligosaccharide.

In some embodiments, the mixture may be about 1% xylo-oligosaccharide covalently linked to a fatty chain to about 99% xylo-oligosaccharide covalently linked to a fatty chain. In some embodiments, the mixture may be about 1% xylo-oligosaccharide covalently linked to a fatty chain to about 5% xylo-oligosaccharide covalently linked to a fatty chain, about 1% xylo-oligosaccharide covalently linked to a fatty chain to about 10% xylo-oligosaccharide covalently linked to a fatty chain, about 1% xylo-oligosaccharide covalently linked to a fatty chain to about 20% xylo-oligosaccharide covalently linked to a fatty chain, about 1% xylo-oligosaccharide covalently linked to a fatty chain to about 30% xylo-oligosaccharide covalently linked to a fatty chain, about 1% xylo-oligosaccharide covalently linked to a fatty chain to about 40% xylo-oligosaccharide covalently linked to a fatty chain, about 1% xylo-oligosaccharide covalently linked to a fatty chain to about 50% xylo-oligosaccharide covalently linked to a fatty chain, about 1% xylo-oligosaccharide covalently linked to a fatty chain to about 60% xylo-oligosaccharide covalently linked to a fatty chain, about 1% xylo-oligosaccharide covalently linked to a fatty chain to about 70% xylo-oligosaccharide covalently linked to a fatty chain, about 1% xylo-oligosaccharide covalently linked to a fatty chain to about 80% xylo-oligosaccharide covalently linked to a fatty chain, about 1% xylo-oligosaccharide covalently linked to a fatty chain to about 90% xylo-oligosaccharide covalently linked to a fatty chain, about 1% xylo-oligosaccharide covalently linked to a fatty chain to about 95% xylo-oligosaccharide covalently linked to a fatty chain, about 1% xylo-oligosaccharide covalently linked to a fatty chain to about 99% xylo-oligosaccharide covalently linked to a fatty chain, about 5% xylo-oligosaccharide covalently linked to a fatty chain to about 10% xylo-oligosaccharide covalently linked to a fatty chain, about 5% xylo-oligosaccharide covalently linked to a fatty chain to about 20% xylo-oligosaccharide covalently linked to a fatty chain, about 5% xylo-oligosaccharide covalently linked to a fatty chain to about 30% xylo-oligosaccharide covalently linked to a fatty chain, about 5% xylo-oligosaccharide covalently linked to a fatty chain to about 40% xylo-oligosaccharide covalently linked to a fatty chain, about 5% xylo-oligosaccharide covalently linked to a fatty chain to about 50% xylo-oligosaccharide covalently linked to a fatty chain, about 5% xylo-oligosaccharide covalently linked to a fatty chain to about 60% xylo-oligosaccharide covalently linked to a fatty chain, about 5% xylo-oligosaccharide covalently linked to a fatty chain to about 70% xylo-oligosaccharide covalently linked to a fatty chain, about 5% xylo-oligosaccharide covalently linked to a fatty chain to about 80% xylo-oligosaccharide covalently linked to a fatty chain, about 5% xylo-oligosaccharide covalently linked to a fatty chain to about 90% xylo-oligosaccharide covalently linked to a fatty chain, about 5% xylo-oligosaccharide covalently linked to a fatty chain to about 95% xylo-oligosaccharide covalently linked to a fatty chain, about 5% xylo-oligosaccharide covalently linked to a fatty chain to about 99% xylo-oligosaccharide covalently linked to a fatty chain, about 10% xylo-oligosaccharide covalently linked to a fatty chain to about 20% xylo-oligosaccharide covalently linked to a fatty chain, about 10% xylo-oligosaccharide covalently linked to a fatty chain to about 30% xylo-oligosaccharide covalently linked to a fatty chain, about 10% xylo-oligosaccharide covalently linked to a fatty chain to about 40% xylo-oligosaccharide covalently linked to a fatty chain, about 10% xylo-oligosaccharide covalently linked to a fatty chain to about 50% xylo-oligosaccharide covalently linked to a fatty chain, about 10% xylo-oligosaccharide covalently linked to a fatty chain to about 60% xylo-oligosaccharide covalently linked to a fatty chain, about 10% xylo-oligosaccharide covalently linked to a fatty chain to about 70% xylo-oligosaccharide covalently linked to a fatty chain, about 10% xylo-oligosaccharide covalently linked to a fatty chain to about 80% xylo-oligosaccharide covalently linked to a fatty chain, about 10% xylo-oligosaccharide covalently linked to a fatty chain to about 90% xylo-oligosaccharide covalently linked to a fatty chain, about 10% xylo-oligosaccharide covalently linked to a fatty chain to about 95% xylo-oligosaccharide covalently linked to a fatty chain, about 10% xylo-oligosaccharide covalently linked to a fatty chain to about 99% xylo-oligosaccharide covalently linked to a fatty chain, about 20% xylo-oligosaccharide covalently linked to a fatty chain to about 30% xylo-oligosaccharide covalently linked to a fatty chain, about 20% xylo-oligosaccharide covalently linked to a fatty chain to about 40% xylo-oligosaccharide covalently linked to a fatty chain, about 20% xylo-oligosaccharide covalently linked to a fatty chain to about 50% xylo-oligosaccharide covalently linked to a fatty chain, about 20% xylo-oligosaccharide covalently linked to a fatty chain to about 60% xylo-oligosaccharide covalently linked to a fatty chain, about 20% xylo-oligosaccharide covalently linked to a fatty chain to about 70% xylo-oligosaccharide covalently linked to a fatty chain, about 20% xylo-oligosaccharide covalently linked to a fatty chain to about 80% xylo-oligosaccharide covalently linked to a fatty chain, about 20% xylo-oligosaccharide covalently linked to a fatty chain to about 90% xylo-oligosaccharide covalently linked to a fatty chain, about 20% xylo-oligosaccharide covalently linked to a fatty chain to about 95% xylo-oligosaccharide covalently linked to a fatty chain, about 20% xylo-oligosaccharide covalently linked to a fatty chain to about 99% xylo-oligosaccharide covalently linked to a fatty chain, about 30% xylo-oligosaccharide covalently linked to a fatty chain to about 40% xylo-oligosaccharide covalently linked to a fatty chain, about 30% xylo-oligosaccharide covalently linked to a fatty chain to about 50% xylo-oligosaccharide covalently linked to a fatty chain, about 30% xylo-oligosaccharide covalently linked to a fatty chain to about 60% xylo-oligosaccharide covalently linked to a fatty chain, about 30% xylo-oligosaccharide covalently linked to a fatty chain to about 70% xylo-oligosaccharide covalently linked to a fatty chain, about 30% xylo-oligosaccharide covalently linked to a fatty chain to about 80% xylo-oligosaccharide covalently linked to a fatty chain, about 30% xylo-oligosaccharide covalently linked to a fatty chain to about 90% xylo-oligosaccharide covalently linked to a fatty chain, about 30% xylo-oligosaccharide covalently linked to a fatty chain to about 95% xylo-oligosaccharide covalently linked to a fatty chain, about 30% xylo-oligosaccharide covalently linked to a fatty chain to about 99% xylo-oligosaccharide covalently linked to a fatty chain, about 40% xylo-oligosaccharide covalently linked to a fatty chain to about 50% xylo-oligosaccharide covalently linked to a fatty chain, about 40% xylo-oligosaccharide covalently linked to a fatty chain to about 60% xylo-oligosaccharide covalently linked to a fatty chain, about 40% xylo-oligosaccharide covalently linked to a fatty chain to about 70% xylo-oligosaccharide covalently linked to a fatty chain, about 40% xylo-oligosaccharide covalently linked to a fatty chain to about 80% xylo-oligosaccharide covalently linked to a fatty chain, about 40% xylo-oligosaccharide covalently linked to a fatty chain to about 90% xylo-oligosaccharide covalently linked to a fatty chain, about 40% xylo-oligosaccharide covalently linked to a fatty chain to about 95% xylo-oligosaccharide covalently linked to a fatty chain, about 40% xylo-oligosaccharide covalently linked to a fatty chain to about 99% xylo-oligosaccharide covalently linked to a fatty chain, about 50% xylo-oligosaccharide covalently linked to a fatty chain to about 60% xylo-oligosaccharide covalently linked to a fatty chain, about 50% xylo-oligosaccharide covalently linked to a fatty chain to about 70% xylo-oligosaccharide covalently linked to a fatty chain, about 50% xylo-oligosaccharide covalently linked to a fatty chain to about 80% xylo-oligosaccharide covalently linked to a fatty chain, about 50% xylo-oligosaccharide covalently linked to a fatty chain to about 90% xylo-oligosaccharide covalently linked to a fatty chain, about 50% xylo-oligosaccharide covalently linked to a fatty chain to about 95% xylo-oligosaccharide covalently linked to a fatty chain, about 50% xylo-oligosaccharide covalently linked to a fatty chain to about 99% xylo-oligosaccharide covalently linked to a fatty chain, about 60% xylo-oligosaccharide covalently linked to a fatty chain to about 70% xylo-oligosaccharide covalently linked to a fatty chain, about 60% xylo-oligosaccharide covalently linked to a fatty chain to about 80% xylo-oligosaccharide covalently linked to a fatty chain, about 60% xylo-oligosaccharide covalently linked to a fatty chain to about 90% xylo-oligosaccharide covalently linked to a fatty chain, about 60% xylo-oligosaccharide covalently linked to a fatty chain to about 95% xylo-oligosaccharide covalently linked to a fatty chain, about 60% xylo-oligosaccharide covalently linked to a fatty chain to about 99% xylo-oligosaccharide covalently linked to a fatty chain, about 70% xylo-oligosaccharide covalently linked to a fatty chain to about 80% xylo-oligosaccharide covalently linked to a fatty chain, about 70% xylo-oligosaccharide covalently linked to a fatty chain to about 90% xylo-oligosaccharide covalently linked to a fatty chain, about 70% xylo-oligosaccharide covalently linked to a fatty chain to about 95% xylo-oligosaccharide covalently linked to a fatty chain, about 70% xylo-oligosaccharide covalently linked to a fatty chain to about 99% xylo-oligosaccharide covalently linked to a fatty chain, about 80% xylo-oligosaccharide covalently linked to a fatty chain to about 90% xylo-oligosaccharide covalently linked to a fatty chain, about 80% xylo-oligosaccharide covalently linked to a fatty chain to about 95% xylo-oligosaccharide covalently linked to a fatty chain, about 80% xylo-oligosaccharide covalently linked to a fatty chain to about 99% xylo-oligosaccharide covalently linked to a fatty chain, about 90% xylo-oligosaccharide covalently linked to a fatty chain to about 95% xylo-oligosaccharide covalently linked to a fatty chain, about 90% xylo-oligosaccharide covalently linked to a fatty chain to about 99% xylo-oligosaccharide covalently linked to a fatty chain, or about 95% xylo-oligosaccharide covalently linked to a fatty chain to about 99% xylo-oligosaccharide covalently linked to a fatty chain. In some embodiments, the mixture may be about 1% xylo-oligosaccharide covalently linked to a fatty chain, about 5% xylo-oligosaccharide covalently linked to a fatty chain, about 10% xylo-oligosaccharide covalently linked to a fatty chain, about 20% xylo-oligosaccharide covalently linked to a fatty chain, about 30% xylo-oligosaccharide covalently linked to a fatty chain, about 40% xylo-oligosaccharide covalently linked to a fatty chain, about 50% xylo-oligosaccharide covalently linked to a fatty chain, about 60% xylo-oligosaccharide covalently linked to a fatty chain, about 70% xylo-oligosaccharide covalently linked to a fatty chain, about 80% xylo-oligosaccharide covalently linked to a fatty chain, about 90% xylo-oligosaccharide covalently linked to a fatty chain, about 95% xylo-oligosaccharide covalently linked to a fatty chain, or about 99% xylo-oligosaccharide covalently linked to a fatty chain. In some embodiments, the mixture may be at least about 1% xylo-oligosaccharide covalently linked to a fatty chain, about 5% xylo-oligosaccharide covalently linked to a fatty chain, about 10% xylo-oligosaccharide covalently linked to a fatty chain, about 20% xylo-oligosaccharide covalently linked to a fatty chain, about 30% xylo-oligosaccharide covalently linked to a fatty chain, about 40% xylo-oligosaccharide covalently linked to a fatty chain, about 50% xylo-oligosaccharide covalently linked to a fatty chain, about 60% xylo-oligosaccharide covalently linked to a fatty chain, about 70% xylo-oligosaccharide covalently linked to a fatty chain, about 80% xylo-oligosaccharide covalently linked to a fatty chain, about 90% xylo-oligosaccharide covalently linked to a fatty chain, or about 95% xylo-oligosaccharide covalently linked to a fatty chain. In some embodiments, the mixture may be at most about 5% xylo-oligosaccharide covalently linked to a fatty chain, about 10% xylo-oligosaccharide covalently linked to a fatty chain, about 20% xylo-oligosaccharide covalently linked to a fatty chain, about 30% xylo-oligosaccharide covalently linked to a fatty chain, about 40% xylo-oligosaccharide covalently linked to a fatty chain, about 50% xylo-oligosaccharide covalently linked to a fatty chain, about 60% xylo-oligosaccharide covalently linked to a fatty chain, about 70% xylo-oligosaccharide covalently linked to a fatty chain, about 80% xylo-oligosaccharide covalently linked to a fatty chain, about 90% xylo-oligosaccharide covalently linked to a fatty chain, about 95% xylo-oligosaccharide covalently linked to a fatty chain, or about 99% xylo-oligosaccharide covalently linked to a fatty chain.

In some embodiments, the mixture may be about 1% cello-oligosaccharide covalently linked to a fatty chain to about 99% cello-oligosaccharide covalently linked to a fatty chain. In some embodiments, the mixture may be about 1% cello-oligosaccharide covalently linked to a fatty chain to about 5% cello-oligosaccharide covalently linked to a fatty chain, about 1% cello-oligosaccharide covalently linked to a fatty chain to about 10% cello-oligosaccharide covalently linked to a fatty chain, about 1% cello-oligosaccharide covalently linked to a fatty chain to about 20% cello-oligosaccharide covalently linked to a fatty chain, about 1% cello-oligosaccharide covalently linked to a fatty chain to about 30% cello-oligosaccharide covalently linked to a fatty chain, about 1% cello-oligosaccharide covalently linked to a fatty chain to about 40% cello-oligosaccharide covalently linked to a fatty chain, about 1% cello-oligosaccharide covalently linked to a fatty chain to about 50% cello-oligosaccharide covalently linked to a fatty chain, about 1% cello-oligosaccharide covalently linked to a fatty chain to about 60% cello-oligosaccharide covalently linked to a fatty chain, about 1% cello-oligosaccharide covalently linked to a fatty chain to about 70% cello-oligosaccharide covalently linked to a fatty chain, about 1% cello-oligosaccharide covalently linked to a fatty chain to about 80% cello-oligosaccharide covalently linked to a fatty chain, about 1% cello-oligosaccharide covalently linked to a fatty chain to about 90% cello-oligosaccharide covalently linked to a fatty chain, about 1% cello-oligosaccharide covalently linked to a fatty chain to about 95% cello-oligosaccharide covalently linked to a fatty chain, about 1% cello-oligosaccharide covalently linked to a fatty chain to about 99% cello-oligosaccharide covalently linked to a fatty chain, about 5% cello-oligosaccharide covalently linked to a fatty chain to about 10% cello-oligosaccharide covalently linked to a fatty chain, about 5% cello-oligosaccharide covalently linked to a fatty chain to about 20% cello-oligosaccharide covalently linked to a fatty chain, about 5% cello-oligosaccharide covalently linked to a fatty chain to about 30% cello-oligosaccharide covalently linked to a fatty chain, about 5% cello-oligosaccharide covalently linked to a fatty chain to about 40% cello-oligosaccharide covalently linked to a fatty chain, about 5% cello-oligosaccharide covalently linked to a fatty chain to about 50% cello-oligosaccharide covalently linked to a fatty chain, about 5% cello-oligosaccharide covalently linked to a fatty chain to about 60% cello-oligosaccharide covalently linked to a fatty chain, about 5% cello-oligosaccharide covalently linked to a fatty chain to about 70% cello-oligosaccharide covalently linked to a fatty chain, about 5% cello-oligosaccharide covalently linked to a fatty chain to about 80% cello-oligosaccharide covalently linked to a fatty chain, about 5% cello-oligosaccharide covalently linked to a fatty chain to about 90% cello-oligosaccharide covalently linked to a fatty chain, about 5% cello-oligosaccharide covalently linked to a fatty chain to about 95% cello-oligosaccharide covalently linked to a fatty chain, about 5% cello-oligosaccharide covalently linked to a fatty chain to about 99% cello-oligosaccharide covalently linked to a fatty chain, about 10% cello-oligosaccharide covalently linked to a fatty chain to about 20% cello-oligosaccharide covalently linked to a fatty chain, about 10% cello-oligosaccharide covalently linked to a fatty chain to about 30% cello-oligosaccharide covalently linked to a fatty chain, about 10% cello-oligosaccharide covalently linked to a fatty chain to about 40% cello-oligosaccharide covalently linked to a fatty chain, about 10% cello-oligosaccharide covalently linked to a fatty chain to about 50% cello-oligosaccharide covalently linked to a fatty chain, about 10% cello-oligosaccharide covalently linked to a fatty chain to about 60% cello-oligosaccharide covalently linked to a fatty chain, about 10% cello-oligosaccharide covalently linked to a fatty chain to about 70% cello-oligosaccharide covalently linked to a fatty chain, about 10% cello-oligosaccharide covalently linked to a fatty chain to about 80% cello-oligosaccharide covalently linked to a fatty chain, about 10% cello-oligosaccharide covalently linked to a fatty chain to about 90% cello-oligosaccharide covalently linked to a fatty chain, about 10% cello-oligosaccharide covalently linked to a fatty chain to about 95% cello-oligosaccharide covalently linked to a fatty chain, about 10% cello-oligosaccharide covalently linked to a fatty chain to about 99% cello-oligosaccharide covalently linked to a fatty chain, about 20% cello-oligosaccharide covalently linked to a fatty chain to about 30% cello-oligosaccharide covalently linked to a fatty chain, about 20% cello-oligosaccharide covalently linked to a fatty chain to about 40% cello-oligosaccharide covalently linked to a fatty chain, about 20% cello-oligosaccharide covalently linked to a fatty chain to about 50% cello-oligosaccharide covalently linked to a fatty chain, about 20% cello-oligosaccharide covalently linked to a fatty chain to about 60% cello-oligosaccharide covalently linked to a fatty chain, about 20% cello-oligosaccharide covalently linked to a fatty chain to about 70% cello-oligosaccharide covalently linked to a fatty chain, about 20% cello-oligosaccharide covalently linked to a fatty chain to about 80% cello-oligosaccharide covalently linked to a fatty chain, about 20% cello-oligosaccharide covalently linked to a fatty chain to about 90% cello-oligosaccharide covalently linked to a fatty chain, about 20% cello-oligosaccharide covalently linked to a fatty chain to about 95% cello-oligosaccharide covalently linked to a fatty chain, about 20% cello-oligosaccharide covalently linked to a fatty chain to about 99% cello-oligosaccharide covalently linked to a fatty chain, about 30% cello-oligosaccharide covalently linked to a fatty chain to about 40% cello-oligosaccharide covalently linked to a fatty chain, about 30% cello-oligosaccharide covalently linked to a fatty chain to about 50% cello-oligosaccharide covalently linked to a fatty chain, about 30% cello-oligosaccharide covalently linked to a fatty chain to about 60% cello-oligosaccharide covalently linked to a fatty chain, about 30% cello-oligosaccharide covalently linked to a fatty chain to about 70% cello-oligosaccharide covalently linked to a fatty chain, about 30% cello-oligosaccharide covalently linked to a fatty chain to about 80% cello-oligosaccharide covalently linked to a fatty chain, about 30% cello-oligosaccharide covalently linked to a fatty chain to about 90% cello-oligosaccharide covalently linked to a fatty chain, about 30% cello-oligosaccharide covalently linked to a fatty chain to about 95% cello-oligosaccharide covalently linked to a fatty chain, about 30% cello-oligosaccharide covalently linked to a fatty chain to about 99% cello-oligosaccharide covalently linked to a fatty chain, about 40% cello-oligosaccharide covalently linked to a fatty chain to about 50% cello-oligosaccharide covalently linked to a fatty chain, about 40% cello-oligosaccharide covalently linked to a fatty chain to about 60% cello-oligosaccharide covalently linked to a fatty chain, about 40% cello-oligosaccharide covalently linked to a fatty chain to about 70% cello-oligosaccharide covalently linked to a fatty chain, about 40% cello-oligosaccharide covalently linked to a fatty chain to about 80% cello-oligosaccharide covalently linked to a fatty chain, about 40% cello-oligosaccharide covalently linked to a fatty chain to about 90% cello-oligosaccharide covalently linked to a fatty chain, about 40% cello-oligosaccharide covalently linked to a fatty chain to about 95% cello-oligosaccharide covalently linked to a fatty chain, about 40% cello-oligosaccharide covalently linked to a fatty chain to about 99% cello-oligosaccharide covalently linked to a fatty chain, about 50% cello-oligosaccharide covalently linked to a fatty chain to about 60% cello-oligosaccharide covalently linked to a fatty chain, about 50% cello-oligosaccharide covalently linked to a fatty chain to about 70% cello-oligosaccharide covalently linked to a fatty chain, about 50% cello-oligosaccharide covalently linked to a fatty chain to about 80% cello-oligosaccharide covalently linked to a fatty chain, about 50% cello-oligosaccharide covalently linked to a fatty chain to about 90% cello-oligosaccharide covalently linked to a fatty chain, about 50% cello-oligosaccharide covalently linked to a fatty chain to about 95% cello-oligosaccharide covalently linked to a fatty chain, about 50% cello-oligosaccharide covalently linked to a fatty chain to about 99% cello-oligosaccharide covalently linked to a fatty chain, about 60% cello-oligosaccharide covalently linked to a fatty chain to about 70% cello-oligosaccharide covalently linked to a fatty chain, about 60% cello-oligosaccharide covalently linked to a fatty chain to about 80% cello-oligosaccharide covalently linked to a fatty chain, about 60% cello-oligosaccharide covalently linked to a fatty chain to about 90% cello-oligosaccharide covalently linked to a fatty chain, about 60% cello-oligosaccharide covalently linked to a fatty chain to about 95% cello-oligosaccharide covalently linked to a fatty chain, about 60% cello-oligosaccharide covalently linked to a fatty chain to about 99% cello-oligosaccharide covalently linked to a fatty chain, about 70% cello-oligosaccharide covalently linked to a fatty chain to about 80% cello-oligosaccharide covalently linked to a fatty chain, about 70% cello-oligosaccharide covalently linked to a fatty chain to about 90% cello-oligosaccharide covalently linked to a fatty chain, about 70% cello-oligosaccharide covalently linked to a fatty chain to about 95% cello-oligosaccharide covalently linked to a fatty chain, about 70% cello-oligosaccharide covalently linked to a fatty chain to about 99% cello-oligosaccharide covalently linked to a fatty chain, about 80% cello-oligosaccharide covalently linked to a fatty chain to about 90% cello-oligosaccharide covalently linked to a fatty chain, about 80% cello-oligosaccharide covalently linked to a fatty chain to about 95% cello-oligosaccharide covalently linked to a fatty chain, about 80% cello-oligosaccharide covalently linked to a fatty chain to about 99% cello-oligosaccharide covalently linked to a fatty chain, about 90% cello-oligosaccharide covalently linked to a fatty chain to about 95% cello-oligosaccharide covalently linked to a fatty chain, about 90% cello-oligosaccharide covalently linked to a fatty chain to about 99% cello-oligosaccharide covalently linked to a fatty chain, or about 95% cello-oligosaccharide covalently linked to a fatty chain to about 99% cello-oligosaccharide covalently linked to a fatty chain. In some embodiments, the mixture may be about 1% cello-oligosaccharide covalently linked to a fatty chain, about 5% cello-oligosaccharide covalently linked to a fatty chain, about 10% cello-oligosaccharide covalently linked to a fatty chain, about 20% cello-oligosaccharide covalently linked to a fatty chain, about 30% cello-oligosaccharide covalently linked to a fatty chain, about 40% cello-oligosaccharide covalently linked to a fatty chain, about 50% cello-oligosaccharide covalently linked to a fatty chain, about 60% cello-oligosaccharide covalently linked to a fatty chain, about 70% cello-oligosaccharide covalently linked to a fatty chain, about 80% cello-oligosaccharide covalently linked to a fatty chain, about 90% cello-oligosaccharide covalently linked to a fatty chain, about 95% cello-oligosaccharide covalently linked to a fatty chain, or about 99% cello-oligosaccharide covalently linked to a fatty chain. In some embodiments, the mixture may be at least about 1% cello-oligosaccharide covalently linked to a fatty chain, about 5% cello-oligosaccharide covalently linked to a fatty chain, about 10% cello-oligosaccharide covalently linked to a fatty chain, about 20% cello-oligosaccharide covalently linked to a fatty chain, about 30% cello-oligosaccharide covalently linked to a fatty chain, about 40% cello-oligosaccharide covalently linked to a fatty chain, about 50% cello-oligosaccharide covalently linked to a fatty chain, about 60% cello-oligosaccharide covalently linked to a fatty chain, about 70% cello-oligosaccharide covalently linked to a fatty chain, about 80% cello-oligosaccharide covalently linked to a fatty chain, about 90% cello-oligosaccharide covalently linked to a fatty chain, or about 95% cello-oligosaccharide covalently linked to a fatty chain. In some embodiments, the mixture may be at most about 5% cello-oligosaccharide covalently linked to a fatty chain, about 10% cello-oligosaccharide covalently linked to a fatty chain, about 20% cello-oligosaccharide covalently linked to a fatty chain, about 30% cello-oligosaccharide covalently linked to a fatty chain, about 40% cello-oligosaccharide covalently linked to a fatty chain, about 50% cello-oligosaccharide covalently linked to a fatty chain, about 60% cello-oligosaccharide covalently linked to a fatty chain, about 70% cello-oligosaccharide covalently linked to a fatty chain, about 80% cello-oligosaccharide covalently linked to a fatty chain, about 90% cello-oligosaccharide covalently linked to a fatty chain, about 95% cello-oligosaccharide covalently linked to a fatty chain, or about 99% cello-oligosaccharide covalently linked to a fatty chain.

Methods of Producing a Biomass Derived Surface-Active Compositions.

Described herein are methods of producing biomass derived surface-active compositions A method of producing a biomass derived surface-active composition may comprise: (a) providing a lignocellulosic biomass, (b) isolating a saccharide mixture from the lignocellulosic biomass, the saccharide mixture comprising oligosaccharides; and (c) reacting the saccharide mixture with one or more fatty chain compounds in one of a plurality of steps.

The lignocellulosic biomass may comprise grain, grain chaff, oat, oat hulls, oat husks, bean pods, seed coats, seed materials, seaweeds, corn cob, corn stover, corn leaves, corn stalks, straw, wheat, wheat straw, wheat bran, wheat middlings, rice straw, soy stalk, bagasse, sugar cane, sugar beet, sugar cane bagasse, miscanthus, sorghum residue, switchgrass, bamboo, monocotyledonous tissue, dicotyledonous tissue, fern tissue, water hyacinth, leaf tissue, roots, vegetative matter, vegetable material, vegetable waste, hardwood, hardwood stem, hardwood chips, hardwood pulp, softwood, softwood stem, softwood chips, softwood pulp, paper, paper pulp, cardboard, wood-based feedstocks, grass, nut shell, poplar, willow, sweet potato, cotton, hemp, jute, flax, ramie, sisal, or cocoa.

The saccharide mixture may be obtained from the lignocellulosic biomass by hydrolysis, including by partial hydrolysis.

Hydrolyzing the lignocellulosic biomass may comprise using enzymes from a fungus. In some cases, hydrolyzing the lignocellulosic biomass may comprise converting the polysaccharides in the lignocellulosic biomass into one or more other forms of saccharides. For example, a higher order form of polysaccharide may be converted to a lower order form of oligosaccharide. The polysaccharides present in the lignocellulosic biomass, may comprise hemicellulose, cellulose, xylan (e.g., glucuronoxylan, arabinoxylan, or glucuronoarabinoxylan), mannan (e.g., glucomannan, galactomannan, or galactoglucomannan), mixed-linkage glucan, xyloglucan, chitin, chitosan, or lignocellulose and may be cleaved into monosaccharides, disaccharides, or other forms of lower forms of oligosaccharides. The resulting higher forms of oligosaccharides in the hydrolyzed lignocellulosic biomass may comprise any soluble saccharides described herein. In certain cases, the enzyme may convert the biomass into any soluble saccharides described herein. In addition, as many appropriate feedstocks are recalcitrant, pre-treatment of the feedstock prior to enzyme activity is also envisaged.

In some cases, the enzyme may be a crude enzyme. In a crude enzyme, the enzyme molecules may comprise at least 5% w/w, 10% w/w, 20% w/w, 30% w/w, 40% w/w, 45% w/w, 49% w/w, or 49.5% w/w of the molecules present in the crude enzyme. The crude enzyme may comprise substances other than the enzyme molecules. The substances other than the enzyme molecules may comprise 50.5% w/w, 51% w/w, 55% w/w, 60% w/w, 70% w/w, 80% w/w, 90% w/w, or 95% w/w of the crude enzyme. In some cases, the crude enzyme may be obtained as a lysate of a fungus. The crude enzyme may comprise a lysate of a fungus. In some cases, the crude enzyme may have a comparable enzymatic activity level of a purified enzyme as described herein. In some cases, the crude enzyme may have an enzymatic activity level of at least 50%, 60%, 70%, 80%, 90%, 95%, 99%, or 99.5% of the purified enzyme. In some cases, the crude enzyme may have an enzymatic activity level of at least 100%, 150%, 200%, 250%, 500%, 750%, 1000%, or 10000% of the purified enzyme.

A purified enzyme may have less than 0.5% w/w, 0.3% w/w, or 0.1% w/w of other substances. In some cases, the enzyme may be a purified enzyme. In a purified enzyme, the enzyme molecules may comprise at least 50% w/w, 60% w/w, 70% w/w, 80% w/w, 90% w/w, 95% w/w, 99% w/w, or 99.5% w/w of the molecules present in the purified enzyme. The purified enzyme may consist essentially of enzyme molecules. For example, the purified enzyme may have less than 0.5% w/w, 0.3% w/w, or 0.1% w/w of other substances.

The enzyme in the crude enzyme or the purified enzyme may comprise a cellulase or a hemicellulase. The enzyme in the crude enzyme or the purified enzyme may comprise a cellulase. The enzyme in the crude enzyme or the purified enzyme may comprise a hemicellulase. The enzyme in the crude enzyme or the purified enzyme may comprise an enzyme that can hydrolyze hemicellulose, cellulose, xylan (e.g., glucuronoxylan, arabinoxylan, or glucuronoarabinoxylan), mannan (e.g., glucomannan, galactomannan, or galactoglucomannan), mixed-linkage glucan, xyloglucan, chitin, chitosan, or lignocellulose.

The fungus may comprise a filamentous fungus. The filamentous fungus may synthesize an enzyme that can hydrolyze or at least partially hydrolyze the biomass. The filamentous fungus may secrete the enzyme that can hydrolyze the biomass. The filamentous fungus may synthesize an enzyme that can partially hydrolyze the biomass. The fungus may be a teleomorph. In other cases, the fungus may be an anamorph. In some cases, the fungus may comprise a non-filamentous fungus. In some cases, the fungus may be a yeast. The fungus may be a mold. In some cases, the fungus may be isolated from the environment. In other cases, the fungus may be cultured in a laboratory environment.

The method may comprise a *Trichoderma* species. The fungus may be *Trichoderma reesei*. The fungus may also be *Trichoderma reesei* RUT-C30. The fungus may be *Aspergillus niger*. In some cases, the fungus may also be a *Pachybasium* species, a *Longibrachiatum* species, a *Saturnisporum* species, or a *Hypocreanum* species. In some cases, the *Trichoderma* species may synthesize a cellulase or a hemicellulase. In some cases, the *Trichoderma* species may secrete a cellulase or a hemicellulase. In some cases, *Trichoderma reesei* may synthesize a cellulase or a hemicellulase. In some cases, *Trichoderma reesei* may secrete a cellulase or a hemicellulase. In some cases, the *Trichoderma* species may be isolated from the environment. In some cases, the *Trichoderma* species may be cultured in a laboratory environment. In some cases, *Trichoderma reesei* may be isolated from the environment. In some cases, *Trichoderma reesei* may be cultured in a laboratory environment. In some cases, the *Trichoderma* species may be obtained from a frozen stock. In other cases, the *Trichoderma* species may be lyophilized. The *Trichoderma* species may be in a powder form. In some cases, *Trichoderma reesei* may be cultured in a laboratory environment. In some cases, *Trichoderma reesei* may be obtained from a frozen stock. In other cases, *Trichoderma reesei* may be lyophilized. In other cases, *Trichoderma reesei* may be in a powder form.

Production of biomass derived surface-active composition may include a thermochemical treatment step. In some embodiments, the thermochemical treatment step may occur at a temperature of about 5° C. to about 150° C. In some embodiments, the thermochemical treatment step may occur at a temperature of about 5° C. to about 10° C., about 5° C. to about 15° C., about 5° C. to about 20° C., about 5° C. to about 25° C., about 5° C. to about 30° C., about 5° C. to about 35° C., about 5° C. to about 40° C., about 5° C. to about 50° C., about 5° C. to about 75° C., about 5° C. to about 100° C., about 5° C. to about 150° C., about 10° C. to about 15° C., about 10° C. to about 20° C., about 10° C. to about 25° C., about 10° C. to about 30° C., about 10° C. to about 35° C., about 10° C. to about 40° C., about 10° C. to about 50° C., about 10° C. to about 75° C., about 10° C. to about 100° C., about 10° C. to about 150° C., about 15° C. to about 20° C., about 15° C. to about 25° C., about 15° C. to about 30° C., about 15° C. to about 35° C., about 15° C. to about 40° C., about 15° C. to about 50° C., about 15° C. to about 75° C., about 15° C. to about 100° C., about 15° C. to about 150° C., about 20° C. to about 25° C., about 20° C. to about 30° C., about 20° C. to about 35° C., about 20° C. to about 40° C., about 20° C. to about 50° C., about 20° C. to about 75° C., about 20° C. to about 100° C., about 20° C. to about 150° C., about 25° C. to about 30° C., about 25° C. to about 35° C., about 25° C. to about 40° C., about 25° C. to about 50° C., about 25° C. to about 75° C., about 25° C. to about 100° C., about 25° C. to about 150° C., about 30° C. to about 35° C., about 30° C. to about 40° C., about 30° C. to about 50° C., about 30° C. to about 75° C., about 30° C. to about 100° C., about 30° C. to about 150° C., about 35° C. to about 40° C., about 35° C. to about 50° C., about 35° C. to about 75° C., about 35° C. to about 100° C., about 35° C. to about 150° C., about 40° C. to about 50° C., about 40° C. to about 75° C., about 40° C. to about 100° C., about 40° C. to about 150° C., about 50° C. to about 75° C., about 50° C. to about 100° C., about 50° C. to about 150° C., about 75° C. to about 100° C., about 75° C. to about 150° C., or about 100° C. to about 150° C. In some embodiments, the thermochemical treatment step may occur at a temperature of about 5° C., about 10° C., about 15° C., about 20° C., about 25° C., about 30° C., about 35° C., about 40° C., about 50° C., about 75° C., about 100° C., or about 150° C. In some embodiments, the thermochemical treatment step may occur at a temperature of at least about 5° C., about 10° C., about 15° C., about 20° C., about 25° C., about 30° C., about 35° C., about 40° C., about 50° C., about 75° C., or about 100° C. In some embodiments, the thermochemical treatment step may occur at a temperature of at most about 10° C., about 15° C., about 20° C., about 25° C., about 30° C., about 35° C., about 40° C., about 50° C., about 75° C., about 100° C., or about 150° C.

In some embodiments, production of the biomass surface-active composition may comprise a thermochemical treatment step. The thermochemical treatment step may comprise a treatment in an alkali solution.

In some embodiments, the pH of the alkali solution may be about 8 to about 14. In some embodiments, the pH of the alkali solution may be about 8 to about 9, about 8 to about 10, about 8 to about 11, about 8 to about 12, about 8 to about 13, about 8 to about 14, about 9 to about 10, about 9 to about 11, about 9 to about 12, about 9 to about 13, about 9 to about 14, about 10 to about 11, about 10 to about 12, about 10 to about 13, about 10 to about 14, about 11 to about 12, about 11 to about 13, about 11 to about 14, about 12 to about 13, about 12 to about 14, or about 13 to about 14. In some embodiments, the pH of the alkali solution may be about 8, about 9, about 10, about 11, about 12, about 13, or about 14. In some embodiments, the pH of the alkali solution may be at least about 8, about 9, about 10, about 11, about 12, or about 13. In some embodiments, the pH of the alkali solution may be at most about 9, about 10, about 11, about 12, about 13, or about 14.

In some embodiments, the temperature of the thermochemical treatment may be about 40° C. to about 200° C. In some embodiments, the temperature of the thermochemical treatment may be about 40° C. to about 50° C., about 40° C. to about 60° C., about 40° C. to about 70° C., about 40° C. to about 80° C., about 40° C. to about 90° C., about 40° C. to about 100° C., about 40° C. to about 110° C., about 40° C. to about 120° C., about 40° C. to about 130° C., about 40° C. to about 140° C., about 40° C. to about 150° C., about 40° C. to about 200° C., about 50° C. to about 60° C., about 50° C. to about 70° C., about 50° C. to about 80° C., about 50° C. to about 90° C., about 50° C. to about 100° C., about 50° C. to about 110° C., about 50° C. to about 120° C., about 50° C. to about 130° C., about 50° C. to about 140° C., about 50° C. to about 150° C., about 50° C. to about 200° C., about 60° C. to about 70° C., about 60° C. to about 80° C., about 60° C. to about 90° C., about 60° C. to about 100° C., about 60° C. to about 110° C., about 60° C. to about 120° C., about 60° C. to about 130° C., about 60° C. to about 140° C., about 60° C. to about 150° C., about 60° C. to about 200° C., about 70° C. to about 80° C., about 70° C. to about 90° C., about 70° C. to about 100° C., about 70° C. to about 110° C., about 70° C. to about 120° C., about 70° C. to about 130° C., about 70° C. to about 140° C., about 70° C. to about 150° C., about 70° C. to about 200° C., about 80° C. to about 90° C., about 80° C. to about 100° C., about 80° C. to about 110° C., about 80° C. to about 120° C., about 80° C. to about 130° C., about 80° C. to about 140° C., about 80° C. to about 150° C., about 80° C. to about 200° C., about 90° C. to about 100° C., about 90° C. to about 110° C., about 90° C. to about 120° C., about 90° C. to about 130° C., about 90° C. to about 140° C., about 90° C. to about 150° C., about 90° C. to about 200° C., about 100° C. to about 110° C., about 100° C. to about 120° C., about 100° C. to about 130° C., about 100° C. to about 140° C., about 100° C. to about 150° C., about 100° C. to about 200° C., about 110° C. to about 120° C., about 110° C. to about 130° C., about 110° C. to about 140° C., about 110° C. to about 150° C., about 110° C. to about 200° C., about 120° C. to about 130° C., about 120° C. to about 140° C., about 120° C. to about 150° C., about 120° C. to about 200° C., about 130° C. to about 140° C., about 130° C. to about 150° C., about 130° C. to about 200° C., about 140° C. to about 150° C., about 140° C. to about 200° C., or about 150° C. to about 200° C. In some embodiments, the temperature of the thermochemical treatment may be about 40° C., about 50° C., about 60° C., about 70° C., about 80° C., about 90° C., about 100° C., about 110° C., about 120° C., about 130° C., about 140° C., about 150° C., or about 200° C. In some embodiments, the temperature of the thermochemical treatment may be at least about 40° C., about 50° C., about 60° C., about 70° C., about 80° C., about 90° C., about 100° C., about 110° C., about 120° C., about 130° C., about 140° C., or about 150° C. In some embodiments, the temperature of the thermochemical treatment may be at most about 50° C., about 60° C., about 70° C., about 80° C., about 90° C., about 100° C., about 110° C., about 120° C., about 130° C., about 140° C., about 150° C., or about 200° C.

In some embodiments, the thermochemical treatment may be conducted from about 1 minute to about 180 minutes. In some embodiments, the thermochemical treatment may be conducted from about 1 minute to about 5 minutes, about 1 minute to about 10 minutes, about 1 minute to about 15 minutes, about 1 minute to about 20 minutes, about 1 minute to about 30 minutes, about 1 minute to about 45 minutes, about 1 minute to about 60 minutes, about 1 minute to about 80 minutes, about 1 minute to about 90 minutes, about 1 minute to about 120 minutes, about 1 minute to about 180 minutes, about 5 minutes to about 10 minutes, about 5 minutes to about 15 minutes, about 5 minutes to about 20 minutes, about 5 minutes to about 30 minutes, about 5 minutes to about 45 minutes, about 5 minutes to about 60 minutes, about 5 minutes to about 80 minutes, about 5 minutes to about 90 minutes, about 5 minutes to about 120 minutes, about 5 minutes to about 180 minutes, about 10 minutes to about 15 minutes, about 10 minutes to about 20 minutes, about 10 minutes to about 30 minutes, about 10 minutes to about 45 minutes, about 10 minutes to about 60 minutes, about 10 minutes to about 80 minutes, about 10 minutes to about 90 minutes, about 10 minutes to about 120 minutes, about 10 minutes to about 180 minutes, about 15 minutes to about 20 minutes, about 15 minutes to about 30 minutes, about 15 minutes to about 45 minutes, about 15 minutes to about 60 minutes, about 15 minutes to about 80 minutes, about 15 minutes to about 90 minutes, about 15 minutes to about 120 minutes, about 15 minutes to about 180 minutes, about 20 minutes to about 30 minutes, about 20 minutes to about 45 minutes, about 20 minutes to about 60 minutes, about 20 minutes to about 80 minutes, about 20 minutes to about 90 minutes, about 20 minutes to about 120 minutes, about 20 minutes to about 180 minutes, about 30 minutes to about 45 minutes, about 30 minutes to about 60 minutes, about 30 minutes to about 80 minutes, about 30 minutes to about 90 minutes, about 30 minutes to about 120 minutes, about 30 minutes to about 180 minutes, about 45 minutes to about 60 minutes, about 45 minutes to about 80 minutes, about 45 minutes to about 90 minutes, about 45 minutes to about 120 minutes, about 45 minutes to about 180 minutes, about 60 minutes to about 80 minutes, about 60 minutes to about 90 minutes, about 60 minutes to about 120 minutes, about 60 minutes to about 180 minutes, about 80 minutes to about 90 minutes, about 80 minutes to about 120 minutes, about 80 minutes to about 180 minutes, about 90 minutes to about 120 minutes, about 90 minutes to about 180 minutes, or about 120 minutes to about 180 minutes. In some embodiments, the thermochemical treatment may be conducted from about 1 minute, about 5 minutes, about 10 minutes, about 15 minutes, about 20 minutes, about 30 minutes, about 45 minutes, about 60 minutes, about 80 minutes, about 90 minutes, about 120 minutes, or about 180 minutes. In some embodiments, the thermochemical treatment may be conducted from at least about 1 minute, about 5 minutes, about 10 minutes, about 15 minutes, about 20 minutes, about 30 minutes, about 45 minutes, about 60 minutes, about 80 minutes, about 90 minutes, or about 120 minutes. In some embodiments, the thermochemical treatment may be conducted from at most about 5 minutes, about 10 minutes, about 15 minutes, about 20 minutes, about 30 minutes, about 45 minutes, about 60 minutes, about 80 minutes, about 90 minutes, about 120 minutes, or about 180 minutes.

In some embodiments, the thermochemical treatment may be conducted from about 1 hour to about 96 hours. In some embodiments, the thermochemical treatment may be conducted from about 1 hour to about 3 hours, about 1 hour to about 4 hours, about 1 hour to about 8 hours, about 1 hour to about 12 hours, about 1 hour to about 16 hours, about 1 hour to about 20 hours, about 1 hour to about 24 hours, about 1 hour to about 36 hours, about 1 hour to about 48 hours, about 1 hour to about 72 hours, about 1 hour to about 96 hours, about 3 hours to about 4 hours, about 3 hours to about 8 hours, about 3 hours to about 12 hours, about 3 hours to about 16 hours, about 3 hours to about 20 hours, about 3 hours to about 24 hours, about 3 hours to about 36 hours, about 3 hours to about 48 hours, about 3 hours to about 72 hours, about 3 hours to about 96 hours, about 4 hours to about 8 hours, about 4 hours to about 12 hours, about 4 hours to about 16 hours, about 4 hours to about 20 hours, about 4 hours to about 24 hours, about 4 hours to about 36 hours, about 4 hours to about 48 hours, about 4 hours to about 72 hours, about 4 hours to about 96 hours, about 8 hours to about 12 hours, about 8 hours to about 16 hours, about 8 hours to about 20 hours, about 8 hours to about 24 hours, about 8 hours to about 36 hours, about 8 hours to about 48 hours, about 8 hours to about 72 hours, about 8 hours to about 96 hours, about 12 hours to about 16 hours, about 12 hours to about 20 hours, about 12 hours to about 24 hours, about 12 hours to about 36 hours, about 12 hours to about 48 hours, about 12 hours to about 72 hours, about 12 hours to about 96 hours, about 16 hours to about 20 hours, about 16 hours to about 24 hours, about 16 hours to about 36 hours, about 16 hours to about 48 hours, about 16 hours to about 72 hours, about 16 hours to about 96 hours, about 20 hours to about 24 hours, about 20 hours to about 36 hours, about 20 hours to about 48 hours, about 20 hours to about 72 hours, about 20 hours to about 96 hours, about 24 hours to about 36 hours, about 24 hours to about 48 hours, about 24 hours to about 72 hours, about 24 hours to about 96 hours, about 36 hours to about 48 hours, about 36 hours to about 72 hours, about 36 hours to about 96 hours, about 48 hours to about 72 hours, about 48 hours to about 96 hours, or about 72 hours to about 96 hours. In some embodiments, the thermochemical treatment may be conducted from about 1 hour, about 3 hours, about 4 hours, about 8 hours, about 12 hours, about 16 hours, about 20 hours, about 24 hours, about 36 hours, about 48 hours, about 72 hours, or about 96 hours. In some embodiments, the thermochemical treatment may be conducted from at least about 1 hour, about 3 hours, about 4 hours, about 8 hours, about 12 hours, about 16 hours, about 20 hours, about 24 hours, about 36 hours, about 48 hours, or about 72 hours. In some embodiments, the thermochemical treatment may be conducted from at most about 3 hours, about 4 hours, about 8 hours, about 12 hours, about 16 hours, about 20 hours, about 24 hours, about 36 hours, about 48 hours, about 72 hours, or about 96 hours.

In some embodiments wherein the linker (X) is a nitrogen atom, the thermochemical process involves a reaction between oligosaccharides and a fatty amine reagent. In some embodiments wherein the linker (X) is a nitrogen atom, the thermochemical process involves a reaction with a fatty acid-anhydride. In some embodiments wherein the linker (X) is a nitrogen atom, the thermochemical process involves a reaction with a fatty acid. In some embodiments wherein the linker (X) is a nitrogen atom, the thermochemical process involves a reaction with a fatty ester. In some embodiments wherein the linker (X) is a nitrogen atom, the thermochemical process involves a reaction with a fatty-mixed anhydride. In some embodiments wherein the linker (X) is a nitrogen atom, the thermochemical process involves use of a basic catalyst. In some embodiments wherein the linker (X) is an oxygen atom, the thermochemical process involves a reaction with an acid catalyst. In some embodiments wherein the linker (X) is a nitrogen atom, the thermochemical process involves a reaction with an amide coupling reagent.

In some embodiments, the thermochemical process involves a reaction taking place in presence of an alcoholic solvent, an aqueous solvent, an alternative organic solvent or a combination of all or some of the above. A person skilled in the art may make use of UPLC with Amide HILIC stationary phases to resolve the individual components of the product mixtures and develop ESI-MS methodology to identify the components by the masses of the ions formed in the instrument.

EMBODIMENTS

Embodiment 1: A surface-active composition comprising two or more compounds of Formula (I): H—$(X)_n$—Y—R1, wherein: R1 is independently a substituted or unsubstituted $C_1$-$C_{18}$ alkyl, a substituted or unsubstituted $C_2$-$C_{18}$ alkenyl, or a substituted or unsubstituted $C_2$-$C_{18}$ heteroalkyl, Y is oxygen or N—R2, R2 is independently hydrogen or a substituted or unsubstituted —C(═O)—$C_1$-$C_{17}$ alkyl, X is independently a reducing saccharide residue comprising xylose and arabinose, n is an integer of 1 to 10, wherein at least one compound of the two or more compounds is different from another compound of the two or more compounds.

Embodiment 2: The surface-active composition of embodiment 1, wherein the reducing saccharide residue further comprises glucose.

Embodiment 3: The surface-active composition of embodiments 1-2, wherein Y is bound to an anomeric carbon of a first reducing saccharide residue of $(X)_n$.

Embodiment 4: The surface-active composition of embodiments 1-3, wherein compounds of at least 70% of the surface-active composition have an n of 2 to 10

Embodiment 5: The surface-active composition of embodiments 2-4, wherein a first plurality of compounds of the two or more compounds is H-$(xylose)_n$-Y—R1 and wherein a second plurality of compounds of the two or more compounds is H-$(glucose)_n$-Y—R1

Embodiment 6: The surface-active composition of embodiment 5, wherein a ratio of the first plurality of compounds to the second plurality of compounds is at least 99:1.

Embodiment 7: The surface-active composition of embodiment 5, a ratio of the first plurality of compounds to the second plurality of compounds is at least 95:5.

Embodiment 8: The surface-active composition of embodiment 5, a ratio of the first plurality of compounds to the second plurality of compounds is at least 90:10.

Embodiment 9: The surface-active composition of embodiment 5, a ratio of the first plurality of compounds to the second plurality of compounds is at least 80:10.

Embodiment 10: The surface-active composition of embodiment 5, a ratio of the first plurality of compounds to the second plurality of compounds is at least 70:30.

Embodiment 11: The surface-active composition of embodiment 5, a ratio of the first plurality of compounds to the second plurality of compounds is at least 60:40.

Embodiment 12: The surface-active composition of embodiment 5, a ratio of the first plurality of compounds to the second plurality of compounds is at least 50:50.

Embodiment 13: The surface-active composition of embodiment 5, a ratio of the first plurality of compounds to the second plurality of compounds is at least 40:60.

Embodiment 14: The surface-active composition of embodiment 5, a ratio of the first plurality of compounds to the second plurality of compounds is at least 30:70.

Embodiment 15: The surface-active composition of embodiment 5, a ratio of the first plurality of compounds to the second plurality of compounds is at least 20:80.

Embodiment 16: The surface-active composition of embodiment 5, a ratio of the first plurality of compounds to the second plurality of compounds is at least 10:90.

Embodiment 17: The surface-active composition of embodiment 5, a ratio of the first plurality of compounds to the second plurality of compounds is at least 5:95.

Embodiment 18: The surface-active composition of embodiment 5, a ratio of the first plurality of compounds to the second plurality of compounds is at least 1:99.

Embodiment 19: The surface-active composition of any one of embodiments 1-18, wherein Y is N—R2, and R2 is hydrogen or a substituted or unsubstituted —C(═O)—$C_1$-$C_{17}$ alkyl Embodiment 20: The surface-active composition of any one of embodiments 1-19, wherein $R^1$ is independently a substituted or unsubstituted $C_1$-$C_{18}$ alkyl, a substituted or unsubstituted $C_8$-$C_{18}$ alkenyl, or a substituted or unsubstituted $C_2$-$C_{18}$ heteroalkyl.

Embodiment 21: The surface-active composition of any one of embodiments 1-20, wherein n is 1 to 6.

Embodiment 22: The surface-active composition of any one of embodiments 5-21, wherein the first plurality of compounds comprises xylo-oligosaccharides (XOS).

Embodiment 23: The surface-active composition of any one of embodiments 5-22, wherein the second plurality of compounds comprises cello-oligosaccharide (COS).

Embodiment 24: The surface-active composition of any one of embodiments 1-23, wherein the surface-active composition comprises monosaccharide.

Embodiment 25: The surface-active composition of any one of embodiments 1-24, wherein the surface-active composition is configured to generate foam when rinsed, agitated, or flushed with water.

Embodiment 26: A personal care product comprising the surface-active composition of any one of embodiments 1-25 and a topically acceptable excipient.

Embodiment 27: The personal care product of embodiment 26, wherein the personal care product is an emulsion, a lotion, a gel, or a cream.

Embodiment 28: The personal care product of embodiment 26, wherein the personal care product is an emulsion of the surface-active composition in water.

Embodiment 29: The personal care product of embodiment 26, wherein the personal care product is an emulsion of the surface-active composition in oil, Embodiment 30: A home care product comprising the surface-active composition of any one of embodiments 1-25.

Embodiment 31: The home care product of embodiment 30, wherein the home care product is a cleaner solution.

Embodiment 32: The home care product of embodiment 30, wherein the home care product is a detergent.

Embodiment 33: The home care product of embodiment 30, wherein the home care product is an emulsifying agent.

Embodiment 34: A method of preparing a composition according to embodiment 1, comprising: (a) providing a lignocellulosic biomass; (b) isolating a saccharide mixture from the lignocellulosic biomass, the saccharide mixture comprising oligosaccharides; and (c) reacting the saccharide mixture with one or more reagents comprising fatty acid chains.

Embodiment 35: The method of embodiment 34, further comprising: between (a) and (b), applying a treatment to the lignocellulosic biomass.

Embodiment 36: The method of embodiment 35, wherein the treatment is a thermochemical treatment.

Embodiment 37: The method of embodiment 36, wherein the thermochemical treatment comprises at least one hot water treatment or a hot alkali treatment.

Embodiment 38: The method of embodiment 35, wherein the treatment comprises contacting the lignocellulosic biomass with one or more enzymes, Embodiment 39: The method of any one of embodiments 34-38, wherein the oligosaccharides comprise xylo-oligosaccharides.

Embodiment 40: The method of any one of embodiments 34-39, wherein the oligosaccharides comprise cello-oligosaccharides.

Embodiment 41: The method of any one of embodiments 34-40, wherein the oligosaccharides comprise xylo-oligosaccharides, cello-oligosaccharides, or a mixture thereof.

Embodiment 42: The method of any one of embodiments 34-41, wherein the saccharide mixture further comprises less than 15% monosaccharides.

Embodiment 43: The method of any one of embodiments 34-42, wherein the saccharide mixture further comprises disaccharides.

Embodiment 44: The method of any one of embodiments 34-43, wherein the saccharide mixture comprises no more than 33% monosaccharides and disaccharides.

Embodiment 45: The method of any one of embodiments 34-44, further comprising: after (c), (d) isolating a mixture of two or more surface-active compounds.

Embodiment 46: The method of embodiment 45, wherein the isolating is precipitating or filtering.

Embodiment 47: The method of embodiment 45 or embodiment 46, wherein the two or more surface-active compounds are solids.

Embodiment 48: The method of any one of embodiments 45-47, further comprising: between (c) and (d), treating a crude product after (c) with a solvent comprising a polar organic solvent and a non-polar organic solvent, thereby precipitating the mixture of two or more surface-active compounds.

Embodiment 49: The method of any one of embodiments 34-48, wherein the reacting in (c) comprising (i) treating with $H_2N—R1$, wherein R1 is independently a substituted or unsubstituted $C_1$-$C_{18}$ alkyl, a substituted or unsubstituted $C_2$-$C_{18}$ alkenyl, or a substituted or unsubstituted $C_2$-$C_{18}$ heteroalkyl.

Embodiment 50: The method of embodiment 49, wherein the reacting in (c) further comprising: after (i), (ii) treating with an acylating reagent comprising R2, wherein R2 is substituted or unsubstituted —C(=O)—$C_1$-$C_{17}$ alkyl.

Embodiment 51: The method of any one of embodiments 45-50, wherein the mixture of two or more surface-active compounds is soluble in water at a concentration of 30 wt % or more.

Embodiment 52: A method of preparing a carbohydrate composition, comprising: (a) reacting a carbohydrate starting material with one or more reagents comprising a fatty chain.

Embodiment 53: The method of embodiment 52, wherein the carbohydrate starting material comprises xylo-oligosaccharides.

Embodiment 54: The method of embodiment 52 or embodiment 53, wherein the carbohydrate starting material comprises cello-oligosaccharides.

Embodiment 55: The method of any one of embodiments 52-54, wherein the carbohydrate starting material comprises xylo-oligosaccharides, cello-oligosaccharides, or a mixture thereof.

Embodiment 56: The method of any one of embodiments 52-55, wherein the carbohydrate starting material comprises monosaccharide.

Embodiment 57: The method of any one of embodiments 52-56, wherein the carbohydrate starting material comprises xylose.

Embodiment 58: The method of any one of embodiments 52-57, wherein the carbohydrate starting material comprises no more than 33% monosaccharides and disaccharides.

Embodiment 59: The method of any one of embodiments 52-58, further comprising: after (a), (b) isolating one or more surface-active compounds.

Embodiment 60: The method of embodiment 59, wherein the isolating is precipitating or filtering.

Embodiment 61: The method of embodiment 59 or embodiment 60, wherein the one or more surface-active compounds are solids.

Embodiment 62: The method of any one of embodiments 59-61, further comprising: between (a) and (b), treating a crude product after (a) with a solvent comprising a polar organic solvent and a non-polar organic solvent, thereby precipitating the one or more surface-active compounds.

Embodiment 63: The method of any one of embodiments 52-62, wherein the reacting in (a) comprising (i) treating with $H_2N—R^1$, wherein R1 is a substituted or unsubstituted $C_1$-$C_{18}$ alkyl, a substituted or unsubstituted $C_2$-$C_{18}$ alkenyl, or a substituted or unsubstituted $C_2$-$C_{18}$ heteroalkyl.

Embodiment 64: The method of embodiment 63, wherein the reacting in (a) further comprising: after (i), (ii) treating with an acylating reagent comprising R2, wherein R2 is substituted or unsubstituted —C(=O)—$C_1$-$C_{17}$ alkyl.

Embodiment 65: The method of any one of embodiments 52-64, wherein the one or more surface-active compounds is soluble in water at a concentration of 30 wt % or more.

Method of Synthesis

Embodiments of a compound of Formula (I) may be synthesized by the method described in Scheme 1:

Scheme 1

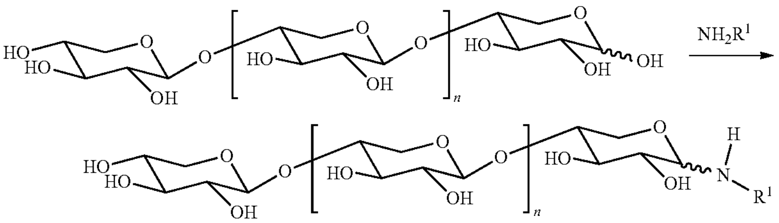

Other embodiments of a compound of Formula (I) may be synthesized by the methods described in Scheme 2:

Scheme 2

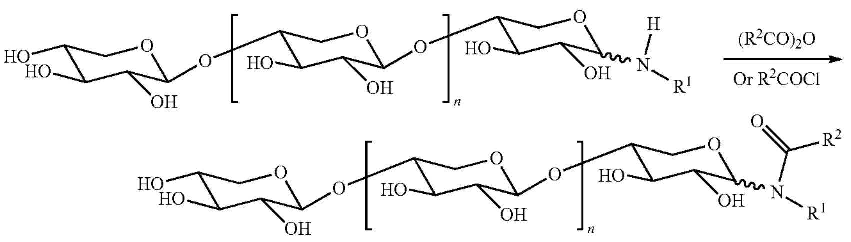

EXAMPLES

Solvents, reagents and starting materials were purchased from commercial vendors and used as received unless otherwise described. All reactions were performed at room temperature unless otherwise stated. Starting materials were purchased from commercial sources or synthesized according to the methods described herein or using literature procedures or the present disclosure. In some embodiments, the inventive compositions refer to a single chemical compound in high-purity. In other embodiments, the inventive compositions refer to a complex mixture of chemical compounds, wherein some chemical compounds, but not necessarily all chemical compounds, within the composition are identified by analytical methods.

Abbreviations

The following abbreviations are used in the Examples and other parts of the description AcOH: Acetic acid
COS: Cello-OligoSaccharides
CMC: Critical Micellular Concentration.
CV: Column Volume
DCM: Dichloromethane
DMSO: dimethyl sulfoxide
EtOAc: Ethyl acetate
h: Hour(s)
HCl: Hydrochloric acid
HILIC: Hydrophilic Interaction Liquid Chromatography
LC-MS: Liquid Chromatography-Mass Spectrometry
M: Molar
MeCN: Acetonitrile
MeOH: Methanol
$MgSO_4$: Magnesium sulfate
min: Minute(s)
r.t.: Room temperature
Rt: Retention time
sat.: Saturated
TEA: Triethylamine
THF: Tetrahydrofuran
UPLC: Ultra performance liquid chromatography
vac: Vacuum
XOS: Xylo-OligoSaccharides Analytical Methods LC-MS spectra and results were obtained using a Waters Acquity™ UPLC H-Class system with an Acquity™ TQD detector. The following LC columns, gradients and flow-rates were used: Method A: Waters Acquity™ UPLC BEH C18 1.7 μm 2.1×50 mm; A=water+10 mM ammonium bicarbonate; B=MeCN; 40° C.; % B: 0.0 min 5% 0.60 m/min; 1.6 min 70%, 0.60 mL/min; 2.5 min 75% 0.6 mL/min; 2.70 min 95% 0.60 mL/min; 3.00 min 5% 0.60 mL/min [end].

Method B: Waters Acquity™ UPLC BEH C18 1.7 μm 2.1×50 mm; A=water+10 mM ammonium bicarbonate; B=MeCN; 40° C.; % B: 0.0 min 50% 0.60 mL/min; 2.0 min 75%, 0.60 mL/min; 4.40 min 75% 0.60 mL/min; 5.00 min 50% 0.60 mL/min [end]

Method C: Waters Acquity™ UPLC BEH PREMIER Amide 1.7 μm 2.1×50 mm (HILIC); A=water+10 mM ammonium bicarbonate; B=MeCN; 40° C.; % B: 0.0 min 90% 0.60 mL/min; 2.50 min 70%, 0.60 mL/min; 2.55 min 70% 0.60 mL/min; 3.00 min 90% 0.60 m/min [end].

Method D: Waters Acquity™ UPLC BEH PREMIER Amide 1.7 μm 2.1×50 mm (HILIC); A=water+10 mM ammonium bicarbonate; B=MeCN; 40° C.; % B: 0.0 min 80% 0.60 mL/min; 2.50 min 60%, 0.60 mL/min; 2.55 min 60% 0.60 mL/min; 3.00 min 80% 0.60 m/min [end].

Method E: Waters Acquity™ UPLC BEH PREMIER Amide 1.7 μm 2.1×150 mm (HILIC); A=water+10 mM ammonium bicarbonate; B=MeCN; 40° C.; % B: 0.0 min 90% 0.15 mL/min; 0.50 min 90%, 0.30 mL/min; 11.00 min 70% 0.30 mL/min; 12.00 min 70% 0.30 m/min [end].

Method F: Waters Acquity™ UPLC BEH PREMIER Amide 1.7 μm 2.1×150 mm (HILIC); A=water+10 mM ammonium bicarbonate; B=MeCN; 40° C.; % B: 0.0 min 85% 0.15 mL/min; 0.50 min 85%, 0.30 mL/min; 11.00 min 65% 0.30 mL/min; 12.00 min 65% 0.30 m/min [end].

Method G: Waters Acquity™ UPLC BEH PREMIER Amide 1.7 μm 2.1×150 mm (HILIC); A=water+10 mM ammonium bicarbonate; B=MeCN; 40° C.; % B: 0.0 min 80% 0.15 mL/min; 0.50 min 80%, 0.30 mL/min; 11.00 min 60% 0.30 mL/min; 12.00 min 60% 0.30 m/min [end].

Method H: The analyte was infused directly into the MS system, without liquid chromatography.

Mass spectra were obtained using the aforementioned Waters Acquity™ TQD system, using continuum data acquisition. The instrument parameters were generally tuned for low-resolution for mass.

A. Preparation of N-Acetyl Xylo-Oligosylamines a) Example 1—Preparation of N-methyl-N-xylo-oligosylamine Step (i) Preparation of N-methyl xylo-oligosylamine XOS (0.45 g) was suspended in Methanol (40 mL) in a flask. Methylamine solution (40 wt in ethanol, 0.1 mL) was then added, and the mixture stirred for 2 days at room temperature. The crude product was evaporated to dryness to give a cream solid (0.49 g), from which the following products were identified in various quantities:

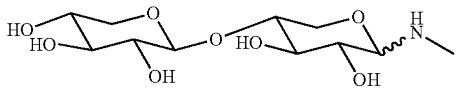

LC-MS Method G. Rt = 3.84 min,
[M - H]⁻ = 294.2

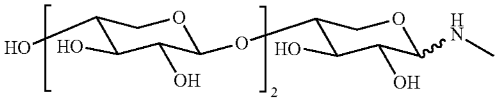

LC-MS Method G. Rt = 5.06 min,
[M - H]⁻ = 426.0

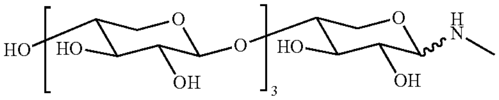

LC-MS Method G. Rt =6.27 min,
[M - H]⁻ = 558.1

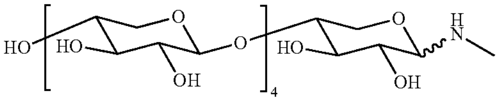

LC-MS Method G. Rt = 7.44 min,
[M - H]⁻ = 690.3

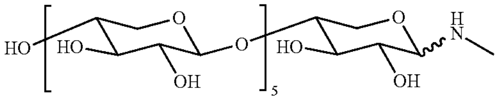

LC-MS Method G. Rt = 8.56 min,
[M - H]⁻ = 822.3

Step (ii) Preparation of N-methyl-N-acetyl xylo-oligosylamine

Mixed solid N-methyl-N-xylo-oligosylamine (500 mg) was suspended in MeOH (4 mL). Acetic anhydride (0.204 g, 1.19 mol) was added dropwise. The mixture was then stirred overnight. The following products were detected in the product mixture in various quantity:

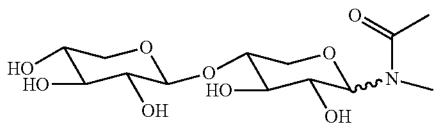

LC-MS Method D. Rt = 0.69 min,
[M - H]⁻ = 336.1

-continued

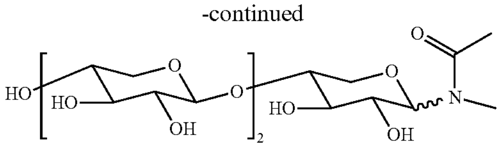

LC-MS Method D. Rt = 1.01 min,
[M - H]⁻ = 468.5

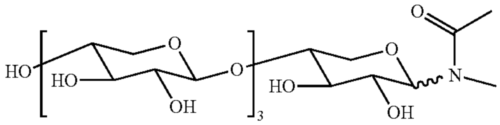

LC-MS Method D. Rt = 1.41 min,
[M - H]⁻ = 599.8

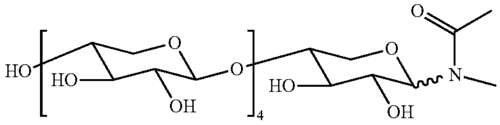

LC-MS Method D. Rt = 1.55 min,
[M - H]⁻ = 732.1 b) Example 2—Preparation of N-butyl-N-xylo-oligosylamine

Step (i) Preparation of N-butyl xylo-oligosylamine

A XOS mixture (2.5 g, 6.0 mmol) was suspended in Methanol (40 mL) in a flask. n-butylamine (16.7 mmol, 1.0 equiv.) was then added, and the mixture stirred for 2 days at room temperature. The crude product was evaporated to dryness to give a cream solid, from which the following products were identified in various quantities.

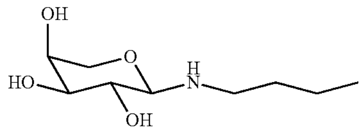

LC-MS Method D. Rt = 0.40 min,
[M - H]⁻ = 204.0

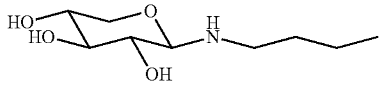

LC-MS Method D. Rt = 0.42 min,
[M - H]⁻ = 203.9

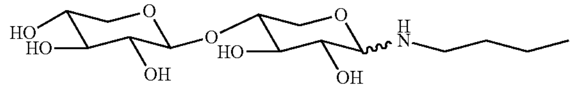

LC-MS Method D. Rt = 0.51 min,
[M - H]⁻ = 336.2

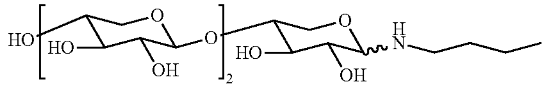

LC-MS Method D. Rt = 0.70 min,
[M - H]⁻ = 468.2

-continued

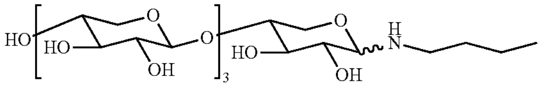

LC-MS Method D. Rt = 1.03 min, [M - H]⁻ = 600.2

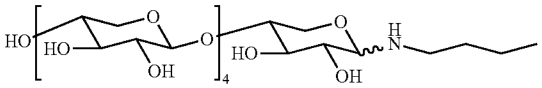

LC-MS Method D. Rt = 1.37 min, [M - H]$^-$ = 732.5

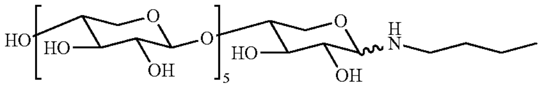

LC-MS Method D. Rt = 1.73 min, [M - H]$^-$ = 864.9

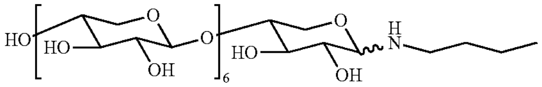

LC-MS Method D. Rt = 2.06 min, [M - H]$^-$ = 995.7

Step (ii) Preparation of N-butyl-N-acetyl xylo-oligosylamine

Mixed solid N-butyl-N-xylo-oligosylamine (500 mg) was suspended in MeOH (4 mL). Acetic anhydride (0.204 g) was added dropwise. The mixture was then stirred overnight. The mixture was evaporated to dryness to give an orange substance. The following products were detected in the product mixture in various quantity:

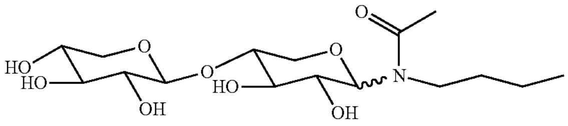

LC-MS Method D. Rt = 0.50 min, [M - H]$^-$ = 378.1

-continued

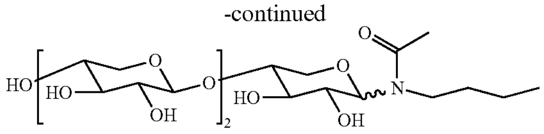

LC-MS Method D. Rt = 0.69 min, [M - H]$^-$ = 510.4

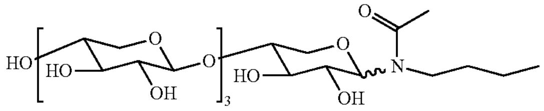

LC-MS Method D. Rt = 1.00 min, [M - H]$^-$ = 642.4

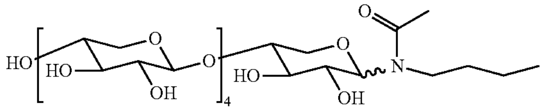

LC-MS Method D. Rt = 1.34 min, [M - H]$^-$ = 774.9

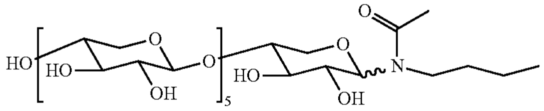

LC-MS Method D. Rt = 1.72 min, [M - H]$^-$ = 906.6

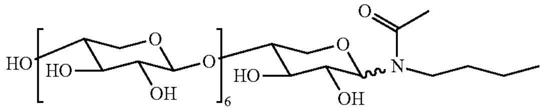

LC-MS Method D. Rt = 2.02 min, [M - H]$^-$ = 1038.4 c) Example 3—Preparation of N-octyl-N-xylo-oligosylamine

Step (i) Preparation of N-octyl-xylo-oligosylamine

A solution of 830 mg of n-octylamine in 20 mL 2-propanol was added to a stirred solution of 2 g of XOS in 10 mL of water. The reaction mixture was stirred at room temperature for 3 days and then heated at 50 degrees centigrade for 30 minutes. The solvent was removed under reduced pressure, followed by co-evaporation with ethanol, to give an orange substance.

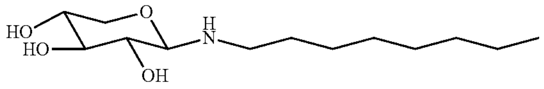

LC-MS Method D. Rt = 0.41 min, [M - H]$^-$ = 260.3

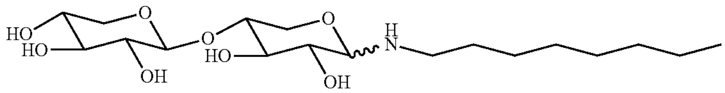

LC-MS Method D. Rt = 2.21 min, [M - H]$^-$ = 392.2

-continued

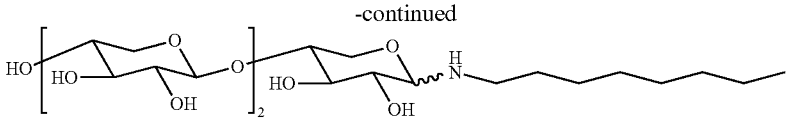

LC-MS Method D. Rt = 3.34 min, $[M - H]^- = 524.1$

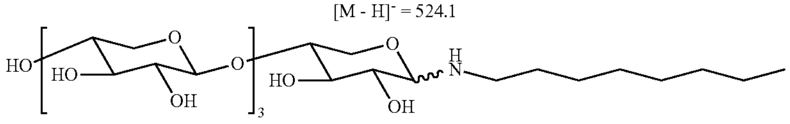

LC-MS Method D. Rt = 4.46 min, $[M - H]^- = 656.2$

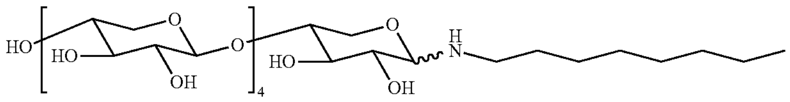

LC-MS Method D. Rt = 5.60 min, $[M - H]^- = 788.4$

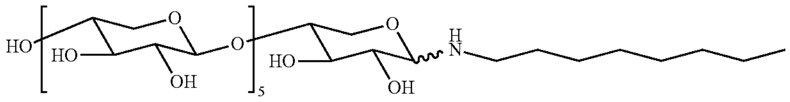

LC-MS Method D. Rt = 6.67 min, $[M - H]^- = 920.3$

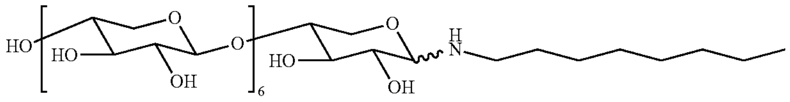

LC-MS Method D. Rt = 7.76 min, $[M - H]^- = 1053.9$ d) Example 4—Preparation of N-decyl-N-xylo-oligosylamine

Step (i) Preparation of N-decyl xylo-oligosylamine

A solution of 830 mg of n-decylamine in 20 mL 2-propanol was added to a stirred solution of 2 g of xylo-oligosaccharides mixture in 10 mL of water. The reaction mixture was stirred at room temperature for 3 days and then heated at 50 degrees centigrade for 30 minutes. The solvent was removed under reduced pressure, followed by co-evaporation with ethanol, to give a brown substance. The crude product was not isolated, but was used directly in reaction d)-ii)

Step (ii) Preparation of N-decyl N-acetyl xylo-oligosylamine 10 mL of acetic anhydride was added at ambient temperature to a stirred solution of 2.7 g of N-decyl xylo-oligosylamine in 40 mL of MeOH. The mixture was then stirred overnight. This type of reactions can be monitored by thin-layer chromatography (TLC). See FIG. 1. The solvent was evaporated under vacuum and co-evaporated with toluene. There were obtained 3.4 g of crude solid yellow product. It was unexpected being able to generate the desired N-acetylated structures as the major products, with increasingly bulky substituents in place, due to the tendency for O-acetylation to occur. The following products were detected in the sample in various quantity:

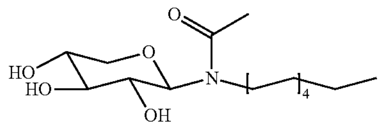

LC-MS Method A. Rt = 1.69 min, $[M + H]^+ = 322.2$

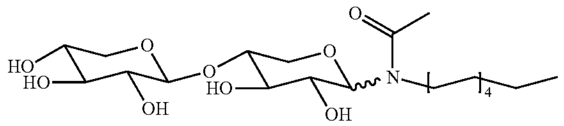

LC-MS Method G. Rt = 1.66 min, $[M - H]^- = 462.1$

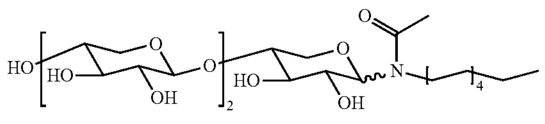

LC-MS Method G. Rt = 2.19 min, $[M - H]^- = 594.4$

-continued

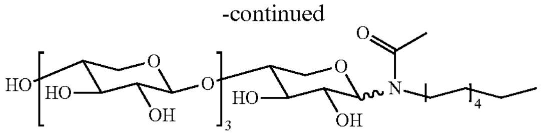

LC-MS Method G. Rt = 2.92 min,
$[M - H]^- = 726.5$

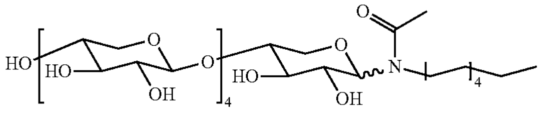

LC-MS Method G. Rt = 3.77 min,
$[M - H]^- = 858.6$

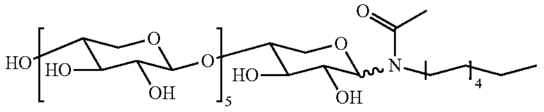

LC-MS Method G. Rt = 4.59 min,
$[M - H]^- = 990.3$

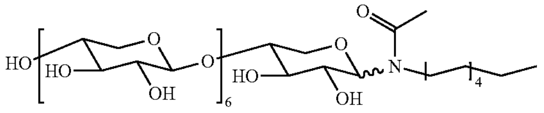

LC-MS Method G. Rt = 5.42 min,
$[M - H]^- = 1122.8$

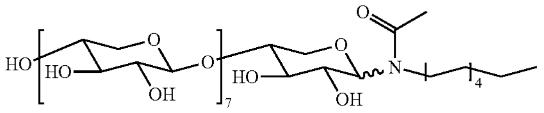

LC-MS Method G. Rt = 6.22 min,
$[M - H]^- = 1255.1$ e) Example 5—Preparation of N-dodecyl N-acetyl xylo-oligosylamine

Step (i) Preparation of N-dodecyl xylo-oligosylamine

The process was carried out in essentially the same manner as in Example 1 (i) but using 980 mg of n-dodecylamine and 2 g of xylo-oligosaccharide mixture. The crude product was not isolated, aside from a small sample taken for analysis, but was used directly in reaction e)-ii). The following products were detected in the sample in various quantity:

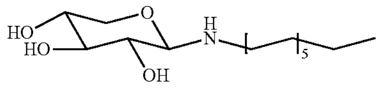

LC-MS Method A. Rt = 1.91 min,
$[M + H]^+ = 318.1$

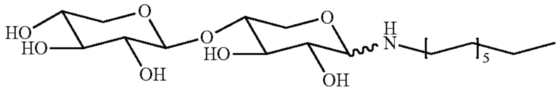

LC-MS Method D. Rt = 0.55 min,
$[M + H]^+ = 450.6$

-continued

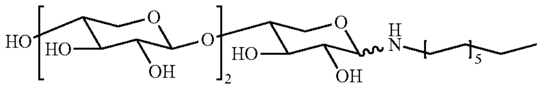

LC-MS Method D. Rt = 0.95 min,
$[M + H]^+ = 582.6$

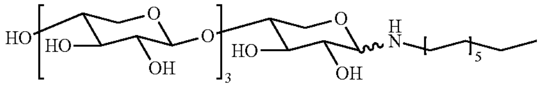

LC-MS Method D. Rt = 1.47 min,
$[M + H]^+ = 714.5$

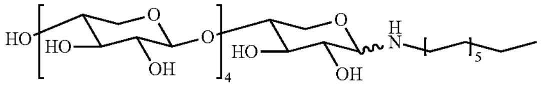

LC-MS Method D. Rt = 1.87 min,
$[M + H]^+ = 847.8$

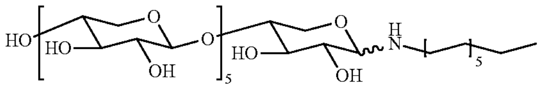

LC-MS Method D. Rt = 2.24 min,
$[M + H]^+ = 978.7$

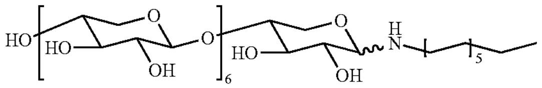

LC-MS Method D. Rt = 2.55 min,
$[M + H]^+ = 1110.3$

Information about the relative proportions of components within the composition can be obtained from the 'integrate' function (Waters, MassLynx). The results are depicted in FIG. 28 and show that the peak area was highest for the compound containing a xylotetraose saccharide component (35.8% of the total peak area for all selected compounds) and that the total peak area for compounds of formula 1 wherein n=1 was 10.1% of the total peak area for all selected compounds (FIG. 28).

Step (ii) Preparation of N-dodecyl N-acetyl xylo-oligosylamine

Figure 2:
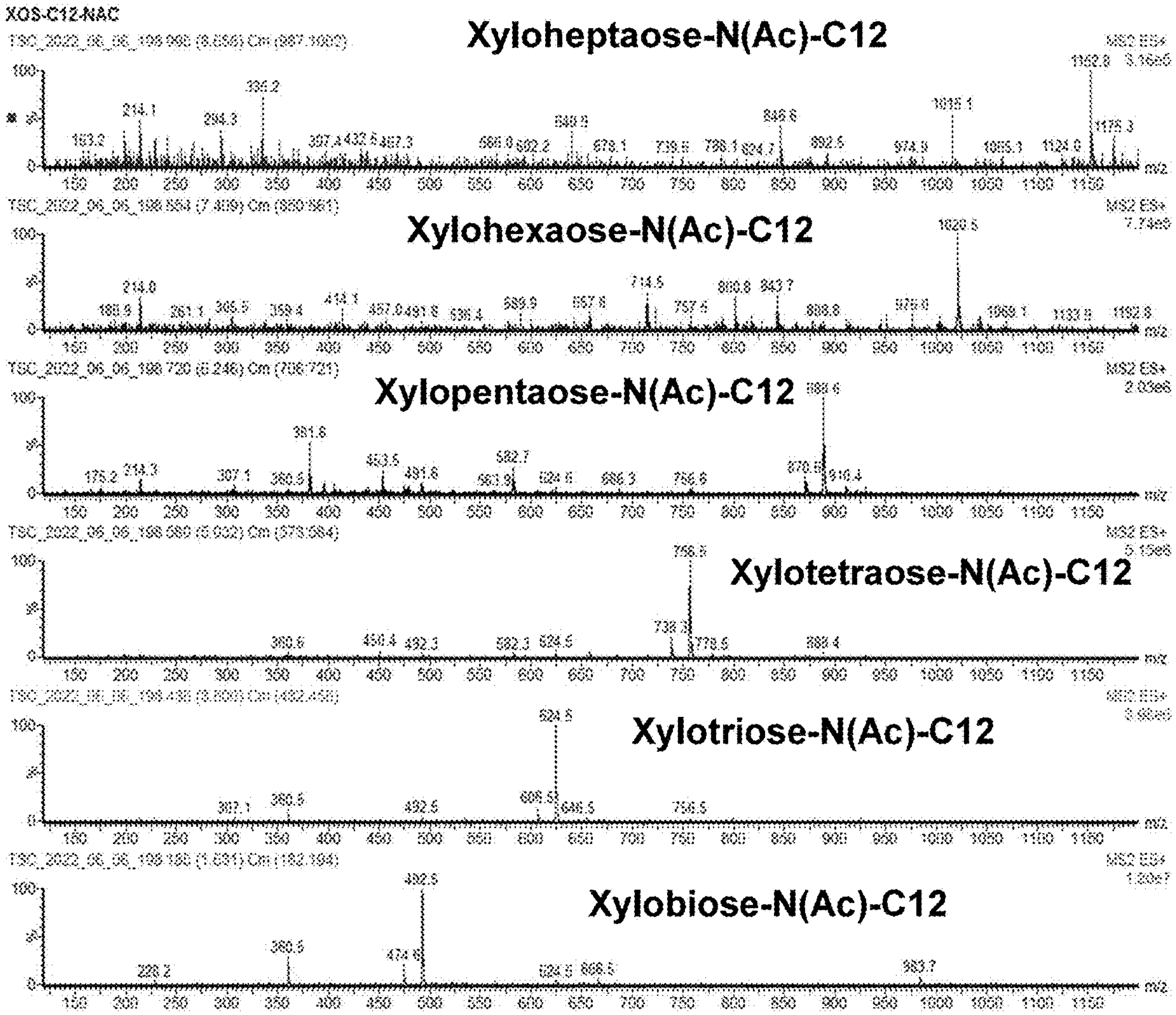
FIG. 2 illustrates the MS spectra obtained at different retention times from a particular example of the active composition of the invention, specifically N-dodecyl-N-acetyl xylo-oligosaccharides. The major peaks visible in the spectra are assigned to the detected substances stated on the individual spectra.

The process was carried out in essentially the same manner as in Example 1 a) Step (ii) but using the crude product of Example 5 reaction e) Step (i) and 10 mL of acetic anhydride. There were recovered 3.4 g of crude off-white product. The following major products were detected by UPLC-MS and these results are additionally shown in in FIG. 2:

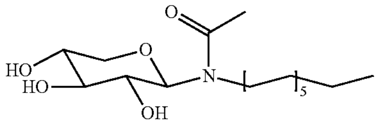

LC-MS Method E. Rt = 1.39 min,
$[M + H]^+ = 360.4$

-continued

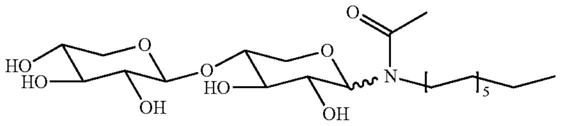

LC-MS Method E. Rt = 1.64 min, [M + H]+ = 492.5.

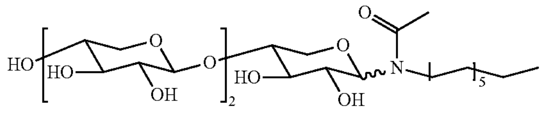

LC-MS Method E. Rt = 3.80 min, [M + H]+ = 624.4

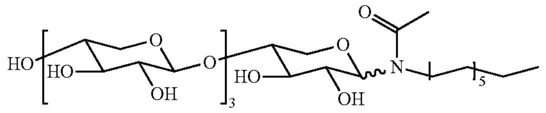

LC-MS Method E. Rt = 5.03 min, [M + H]+ = 756.5.

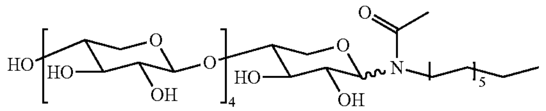

LC-MS Method E. Rt = 6.25 min, [M + H]+ = 888.6.

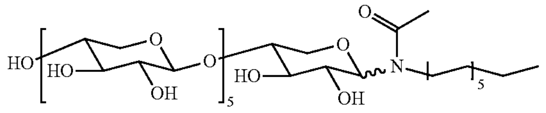

LC-MS Method E. Rt = 7.41 min, [M + H]+ = 1020.8

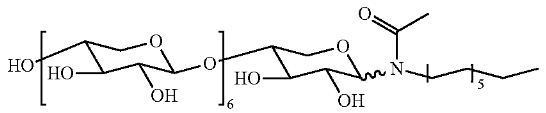

LC-MS Method E. Rt = 8.66 min, [M + H]+ = 1152.8 f) Example 6—Preparation of N-tetradecyl N-acetyl xylo-oligosylamine

Step (i) Preparation of N-tetradecyl xylo-oligosylamine

The process was carried out in essentially the same manner as in Example 1 (i) but using 1.1 g of n-tetradecylamine and 2 g of xylo-oligosaccharide mixture (containing arabinose as well as xylose and xylo-oligosaccharides). The crude product was not isolated, aside from a small sample taken for analysis, but was used directly in reaction f)-ii). The following products were detected in the sample in various quantity:

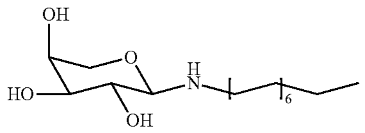

LC-MS Method F. Rt = 1.52 min, [M - H]- = 344.1

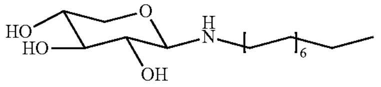

LC-MS Method F. Rt = 1.55 min, [M - H]- = 343.9

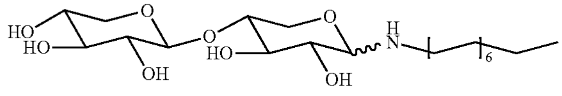

LC-MS Method F. Rt = 1.66 min, [M - H]- = 476.3

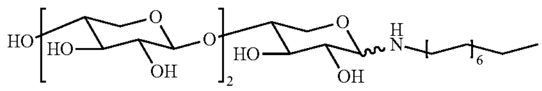

LC-MS Method FD. Rt = 2.74 min, [M - H]- = 608.2

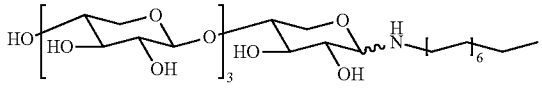

LC-MS Method F. Rt = 3.78 min, [M - H]- = 740.5

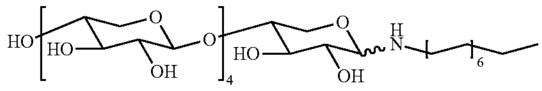

LC-MS Method F. Rt = 4.76 min, [M - H]- = 872.7

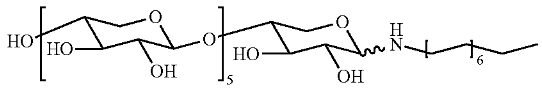

LC-MS Method F. Rt = 5.67 min, [M - H]- = 1004.4

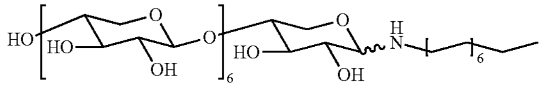

LC-MS Method F. Rt = 6.62 min, [M - H]- = 1136.7

Step (ii) Preparation of N-tetradecyl N-acetyl xylo-oligosylamine

The process was carried out in essentially the same manner as in Example 1 ii) but using the crude product of Example 6 reaction f) Step (i) and 10 mL of acetic anhydride. There were obtained 2.8 g of off-white crude product. The following products were detected in the sample in various quantity:

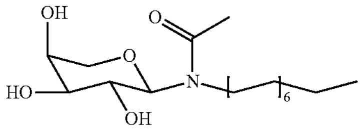

LC-MS Method G. Rt = 0.34 min, $[M - H]^-$ = 386.3

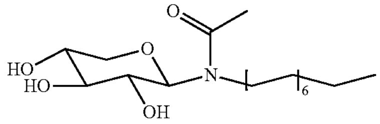

LC-MS Method GD. Rt = 2.17 min, $[M + H]^+$ = 388.3

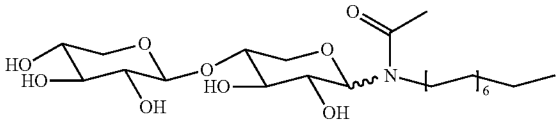

LC-MS Method G. Rt = 1.62 min, $[M - H]^-$ = 518.3

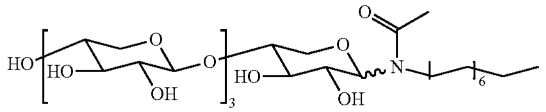

LC-MS Method G. Rt = 1.70 min, $[M - H]^-$ = 650.3

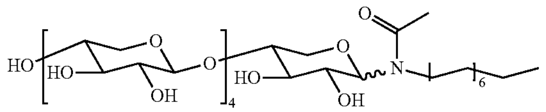

LC-MS Method G. Rt = 2.66 min, $[M - H]^-$ = 782.4

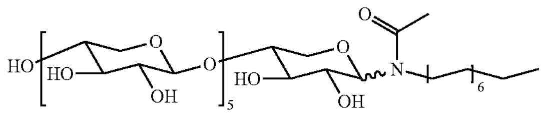

LC-MS Method G. Rt = 3.38 min, $[M - H]^-$ = 914.6

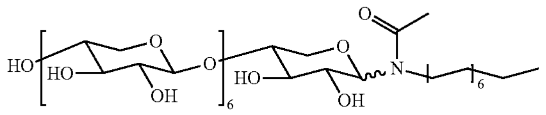

LC-MS Method G. Rt = 4.12 min, $[M - H]^-$ = 1046.7

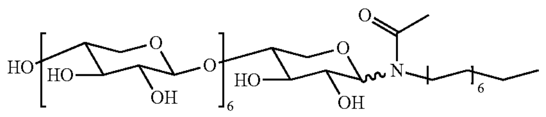

LC-MS Method G. Rt = 4.90 min, $[M - H]^-$ = 1178.7

-continued

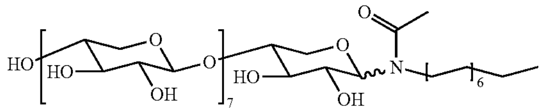

LC-MS Method G. Rt = 5.64 min, $[M - H]^-$ = 1310.9 g) Example 7—Preparation of N-hexadecyl N-acetyl xylo-oligosylamine

Step (i) Preparation of N-hexadecyl xylo-oligosylamine

The process was carried out in essentially the same manner as in Example 1 (i) but using 1.3 g of n-hexadecylamine and 2 g of XOS mixture. The crude product was not isolated, aside from a small sample taken for analysis, but was used directly in reaction g)-ii).

Step (ii) Preparation of N-hexadecyl N-acetyl xylo-oligosylamine

The process was carried out in essentially the same manner as in Example 1 ii) but using the crude product of Example 7 reaction g) Step (i) and 10 mL of acetic anhydride. There were recovered 2 g of off-white crude product. The following products were detected in the sample in various quantity:

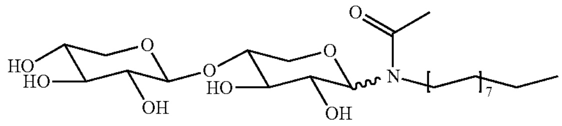

LC-MS Method G. Rt = 1.56 min, $[M - H]^-$ = 546.1

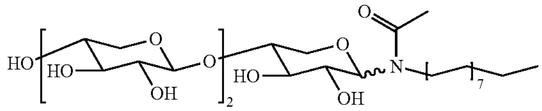

LC-MS Method G. Rt = 1.69 min, $[M - H]^-$ = 678.4

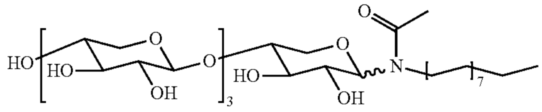

LC-MS Method G. Rt = 2.49 min, $[M - H]^-$ = 810.5

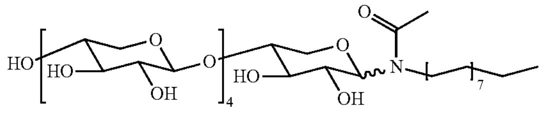

LC-MS Method G. Rt = 3.27 min, $[M - H]^-$ = 942.9

-continued

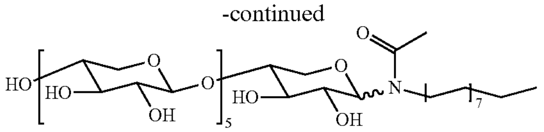

LC-MS Method G. Rt = 3.99 min, [M - H]$^-$ = 1074.6

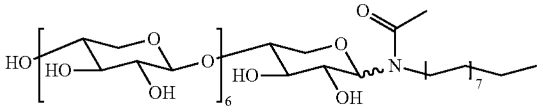

LC-MS Method G. Rt = 4.70 min, [M - H]$^-$ = 1206.7 h) Example 8—Preparation of N-(2-heptanyl)-N-acetyl xylo-oligosylamine

Step (i) Preparation of N-(2-heptanyl)-xylo-oligosylamine

The process was carried out in essentially the same manner as in Example 1 (i) but using 0.9 g of 2-aminoheptane and 2.0 g of xylo-oligosaccharide mixture. The crude product was not isolated, aside from a small sample taken for analysis, but was used directly in reaction h)-ii).

The following products were detected in the sample in various quantity:

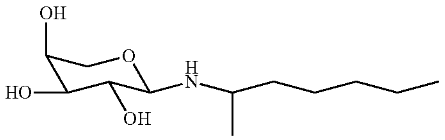

LC-MS Method A. Rt = 1.21 min, [M + H]$^+$ = 248.0

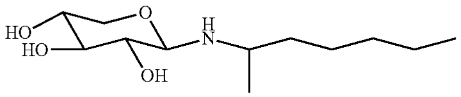

LC-MS Method A. Rt = 1.25 min, [M + H]$^+$ = 248.3

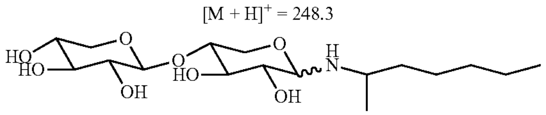

LC-MS Method F. Rt = 1.93 min, [M - H]$^-$ = 379.2

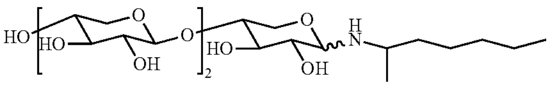

LC-MS Method F. Rt = 2.62 min, [M - H]$^-$ = 511.3

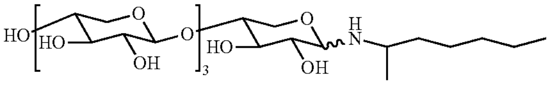

LC-MS Method F. Rt = 3.48 min, [M - H]$^-$ = 642.3

-continued

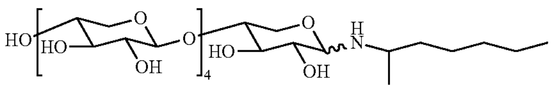

LC-MS Method F. Rt = 4.41 min, [M - H]$^-$ = 774.3

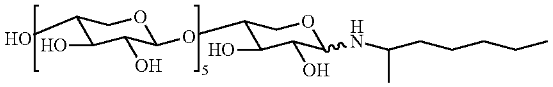

LC-MS Method F. Rt = 5.33 min, [M - H]$^-$ = 906.5

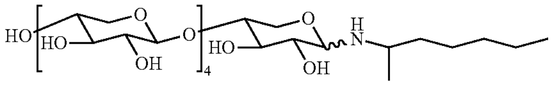

LC-MS Method F. Rt = 6.24 min, [M - H]$^-$ = 1038.8

Step (ii) Preparation of N-(2-heptanyl)-N-acetyl xylo-oligosylamine

The process was carried out in essentially the same manner as in Example 1 (i) but using the crude product of Example 8 reaction h) Step (i) and 10 mL of acetic anhydride. There were recovered 2 g of off-white crude product. The following products were detected in the sample in various quantity and some of these results are shown in in FIG. 3:

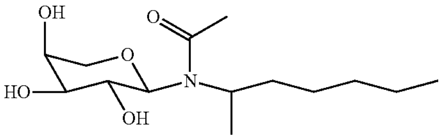

LC-MS Method A. Rt = 1.19 min, [M + H]$^+$ = 290.5

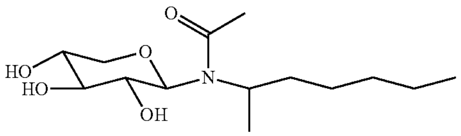

LC-MS Method C. Rt = 1.56 min, [M + H]$^+$ = 290.3

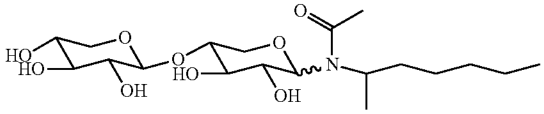

LC-MS Method F. Rt = 1.92 min, [M - H]$^-$ = 420.6

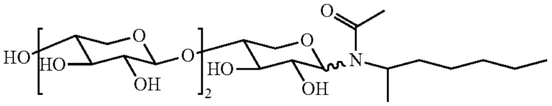

LC-MS Method F. Rt = 2.62 min, [M - H]$^-$ = 552.1

-continued

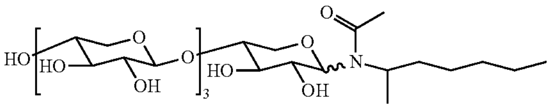

LC-MS Method F. Rt = 3.42 min,
[M - H]$^-$ = 684.1

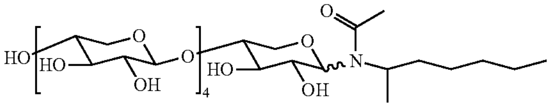

LC-MS Method F. Rt = 4.34 min,
[M - H]$^-$ = 816.6

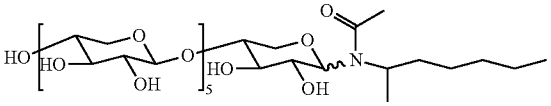

LC-MS Method F. Rt = 5.28 min,
[M - H]$^-$ = 948.0 i) Example 9—Preparation of N-(2-aminobutan-1-ol)-xylo-oligosylamine

Step (i) Preparation of N-(2-aminobutan-1-ol)-xylo-oligosylamine

The process was carried out in essentially the same manner as in Example 1 (i) but using 0.1 g of 2-aminobutan-1-ol and 0.45 g of XOS. The following products were detected in the sample in various quantity:

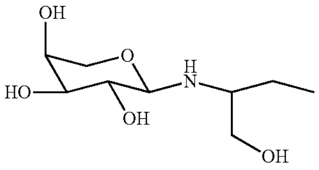

LC-MS Method D. Rt = 0.51 min,
[M + H]$^+$ = 220.1

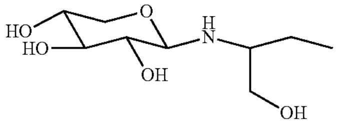

LC-MS Method D. Rt = 0.53 min,
[M + H]$^+$ = 220.2.

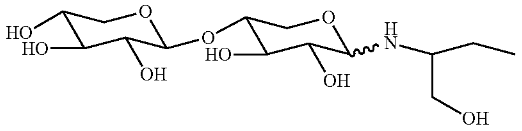

LC-MS Method D. Rt = 0.68 min,
[M + H]$^+$ = 352.6.

-continued

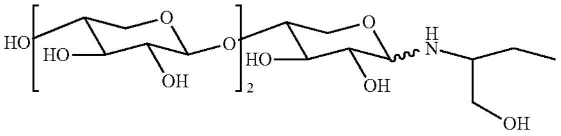

LC-MS Method D. Rt = 0.97 min,
[M + H]$^+$ = 484.1.

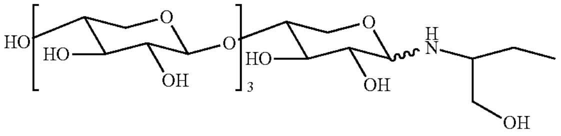

LC-MS Method D. Rt = 1.33 min,
[M + H]$^+$ = 616.3.

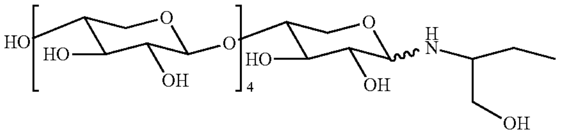

LC-MS Method D. Rt = 1.69 min,
[M + H]$^+$ = 747.9 j) Example 10—Preparation of N-oleyl N-acetyl xylo-oligosylamine

Figure 7:
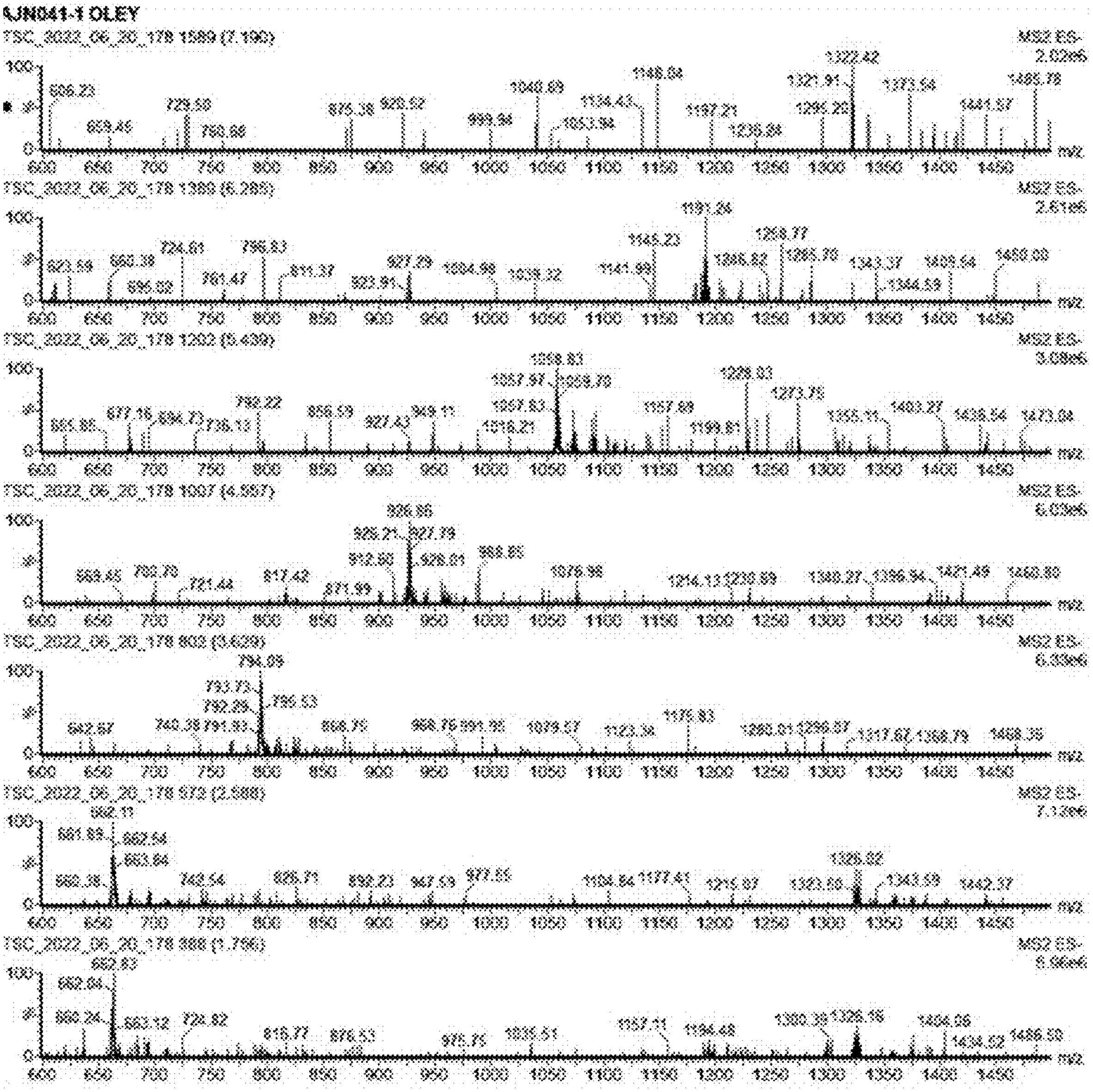
FIG. 7 illustrates the MS spectra obtained from another particular example of the active composition of the invention, specifically N-oleyl-N-acetyl xylo-oligosaccharides.

Step (i) Preparation of N-(oleyl)-xylo-oligosylamine and N-(linoleyl)-xylo-oligosylamine The process was carried out in essentially the same manner as in Example 1 (i) but using 1.5 mL technical grade oleylamine (with high linoleylamine content) and 1 g of XOS mixture. The crude product was not isolated, aside from a small sample taken for analysis, but was used directly in reaction j)-ii). It was somewhat surprising that products with higher DP (>6) can be generated and detected, despite the steric congestion caused by the oleyl group and the expected lower reactivity of such xylo-oligosaccharides. The following products were detected in the sample in various quantity with some of the spectra shown in FIG. 7:

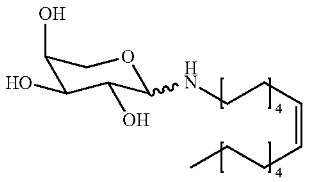

LC-MS Method F. Rt = 1.49 min,
[M - H]$^-$ = 398.7

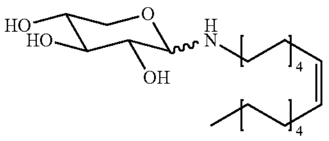

LC-MS Method F. Rt = 1.47 min,
[M - H]$^-$ = 398.7

-continued

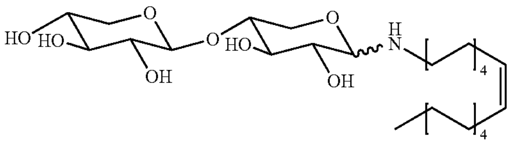

LC-MS Method F. Rt = 1.66 min, [M - H]⁻ = 530.2

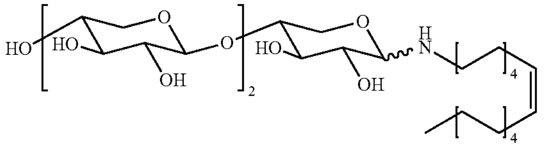

LC-MS Method F. Rt = 2.59 min, [M - H]⁻ = 662.1

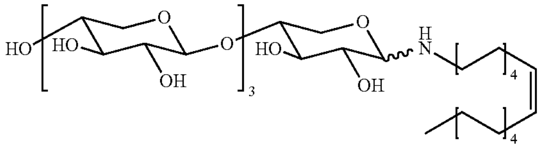

LC-MS Method F. Rt = 3.63 min, [M - H]⁻ = 794.1

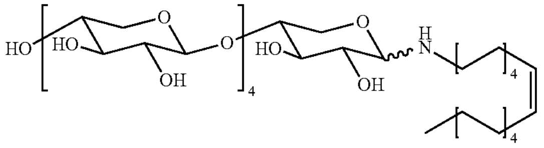

LC-MS Method F. Rt = 4.56 min, [M - H]⁻ = 926.9

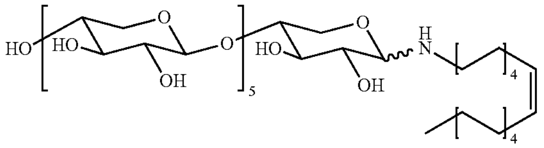

LC-MS Method F. Rt = 5.43 min, [M - H]⁻ = 1059.9

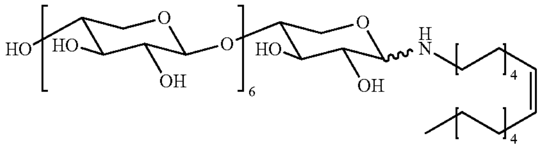

LC-MS Method F. Rt = 6.28 min, [M - H]⁻ = 1190.8

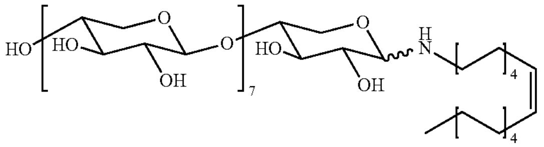

LC-MS Method F. Rt = 7.14 min, [M - H]⁻ = 1323.4

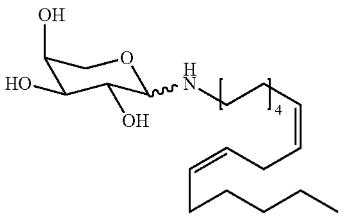

LC-MS Method F. Rt = 1.51 min, [M - H]⁻ = 396.4

-continued

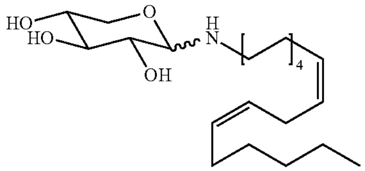

LC-MS Method F. Rt = 1.49 min, [M - H]⁻ = 396.4

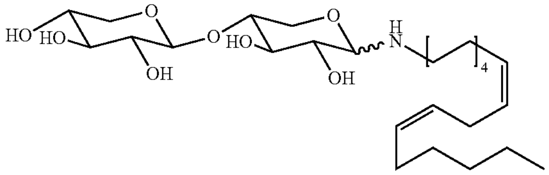

LC-MS Method F. Rt = 1.68 min, [M - H]⁻ = 528.4

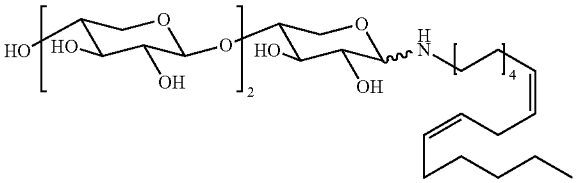

LC-MS Method F. Rt = 2.57 min, [M - H]⁻ = 660.2

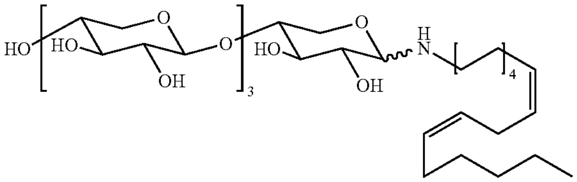

LC-MS Method F. Rt = 3.63 min, [M - H]⁻ = 792.0

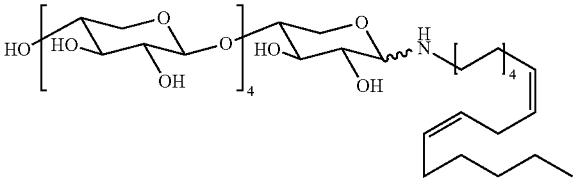

LC-MS Method F. Rt = 4.56 min, [M - H]⁻ = 926.9

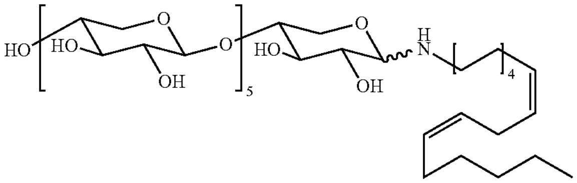

LC-MS Method F. Rt = 5.44 min, [M - H]⁻ = 1058.1

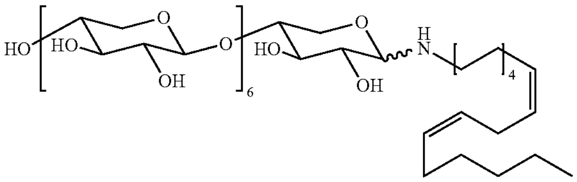

LC-MS Method F. Rt = 6.34 min, [M - H]⁻ = 1188.3

Step (ii) Preparation of N-oleyl N-acetyl xylo-oligosylamine and N-linoleyl N-acetyl xylo-oligosylamine The process was carried out in essentially the same manner as in Example 1 ii) but using the crude product of Example 10 reaction j) Step (i) and 3 mL of acetic anhydride. There were recovered 2.7 g of brown crude product. The following products were detected in the sample in various quantity:

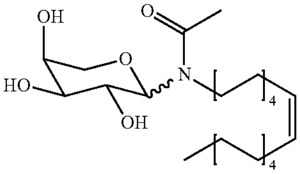

LC-MS Method D. Rt = 0.34 min, [M - H]⁻ = 440.3

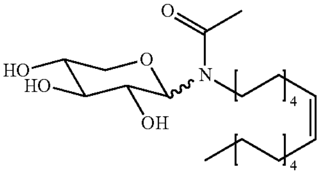

LC-MS Method D. Rt = 0.35 min, [M - H]⁻ = 440.3

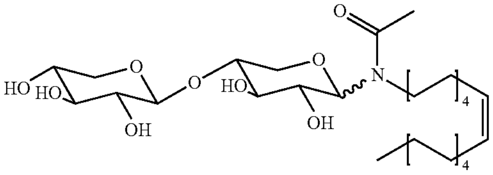

LC-MS Method D. Rt = 0.35 min, [M - H]⁻ = 572.0

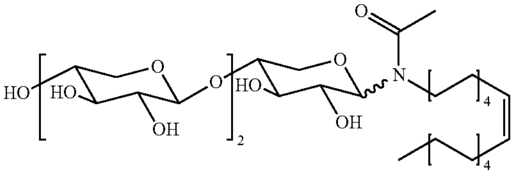

LC-MS Method D. Rt = 0.49 min, [M - H]⁻ = 704.5

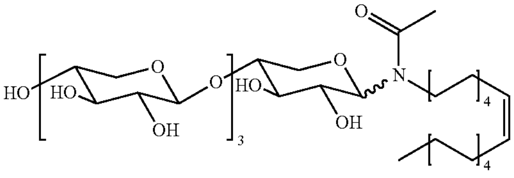

LC-MS Method D. Rt = 0.50 min, [M - H]⁻ = 836.7

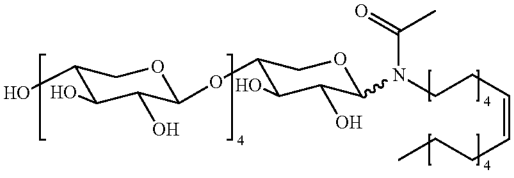

LC-MS Method D. Rt = 0.69 min, [M - H]⁻ = 968.6

-continued

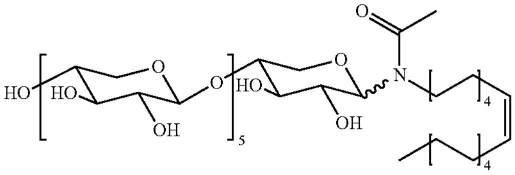

LC-MS Method D. Rt = 0.92 min, [M - H]⁻ = 1100.9

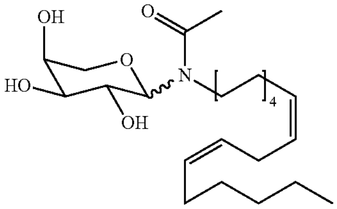

LC-MS Method D. Rt = 0.34 min, [M - H]⁻ = 438.6

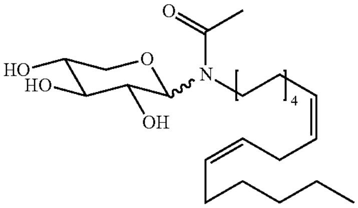

LC-MS Method D. Rt = 0.35 min, [M - H]⁻ = 438.3

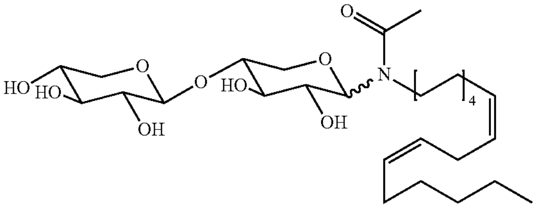

LC-MS Method D. Rt = 0.35 min, [M - H]⁻ = 573.0

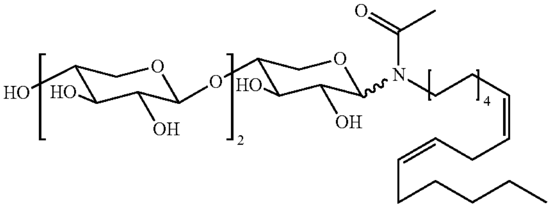

LC-MS Method D. Rt = 0.49 min, [M - H]⁻ = 702.7

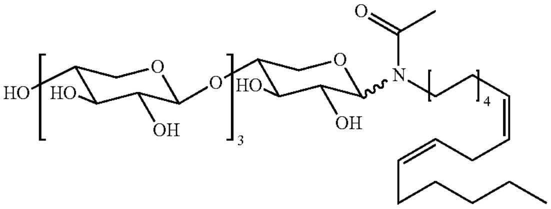

LC-MS Method D. Rt = 0.50 min, [M - H]⁻ = 834.9

-continued

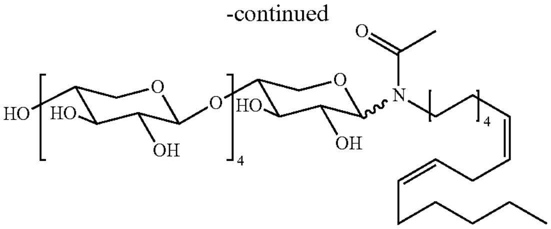

LC-MS Method D. Rt = 0.68 min,
[M - H]⁻ = 966.7

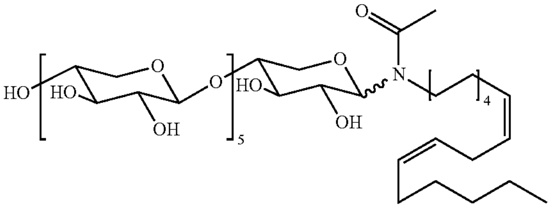

LC-MS Method D. Rt = 0.91 min,
[M - H]⁻ = 1099.1

B. Preparation of N-acetyl xylosylamines a) Example 11—Preparation of N-decyl N-acetyl xylosylamine

Step (i) Preparation of N-decyl xylosylamine

Xylose (8.0 g) suspended of 2-propanol (60 mL) in a flask, n-decylamine (8.4 g) added to the xylose solution flask. The resulting mixture was stirred for 2 days. The solid was filtered and washed with 2-propanol (40 mL), then dried vigorously to give the product as a white solid 12.4 g, 80%. LC-MS (Method A), Rt=1.67 min, $[M+H]^+$=290.2.

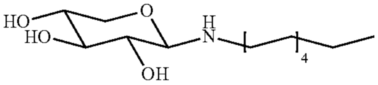

Step (ii) Preparation of N-decyl N-acetyl xylosylamine

Solid N-decyl xylosylamine (7.6 g) was suspended in 2-propanol (60 mL) and triethylamine (2 equiv.) then acetic anhydride (1.6 equiv.) was added slowly. Stirring continued at ambient temperature for 10 h. Water (50 mL) was added, and the mixture stirred for 5 min. Dichloromethane (50 mL) was added and the phases separated. The aqueous phase was extracted with additional DCM. The combined organic phase washed with saturated aqueous $NH_4Cl$ solution, then the aqueous phase extracted with additional DCM. The combined organic phases were dried over anhydrous magnesium sulfate, filtered, then concentrated under reduced pressure to give a yellow oil. The oil was purified by FCC eluting with MeOH (2-15%) in DCM (120 g normal phase silica cartridge with wet loading). Fractions containing the product were combined and evaporated to dryness to give the desired product (4.1 g, 49%) as a yellow gum. LC-MS (Method A), Rt=1.69 min, [M+H]+=332.2. The gum product can be dissolved in water to form solutions of 50 wt % or greater.

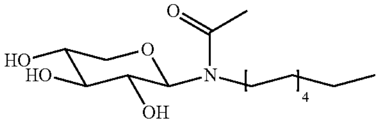

b) Example 12—N-tetradecyl N-acetyl xylosylamine

Step (i) Preparation of N-tetradecyl xylosylamine

The process was carried out in essentially the same manner as in Example 11 a) Step (i) but using 9.7 g of n-tetradecylamine and 6.8 g of xylose to give N-tetradecyl xylosylamine as a cream solid. LC-MS (Method F), Rt=1.55 min, $[M-H]^-$=343.9.

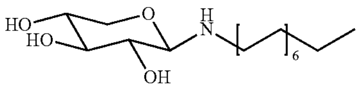

Step (ii) Preparation of N-tetradecyl N-acetyl xylosylamine

The process was carried out in essentially the same manner as in Example 11 a) step (ii) but using the solid product of reaction example 12 b) Step (i) and the crude product was instead purified by FCC eluting with MeOH (1-12%) in DCM). There were obtained 1.7 g of orange solid product. LC-MS (Method A), Rt=2.17 min, $[M+H]^+$=388.3.

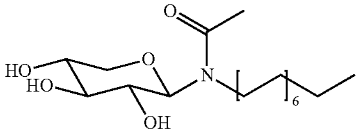

c) Example 13—N-dodecyl N-acetyl xylosylamine

Step (i) Preparation of N-dodecyl xylosylamine

The process was carried out in essentially the same manner as in Example 11 a) (i) but using 8.9 g of n-dodecylamine and 7.2 g of xylose to give N-dodecyl xylosylamine as a pale-yellow solid. LC-MS (Method A), Rt=1.91 min, $[M+H]^+$=318.1.

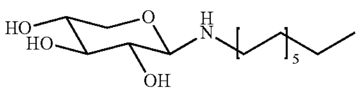

Step (ii) Preparation of N-dodecyl N-acetyl xylosylamine

The process was carried out in essentially the same manner as in Example 11 a) step (ii) but using the solid product of Example 11 reaction c) step (i) and the crude product was instead purified by FCC eluting with MeOH (2-13%) in DCM. There were obtained 1.4 g of cream gum product. LC-MS (Method A), Rt=1.87 min, $[M+H]^+$=360.5.

The solid product was only sparingly soluble in water at room temperature, which was surprising given the excellent aqueous solubility of example 11 composition.

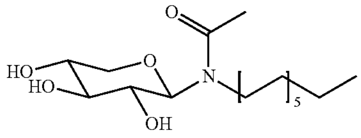

d) Example 14—N-octyl N-acetyl xylosylamine

Step (i) Preparation of N-octyl xylosylamine

The process was carried out in essentially the same manner as in Example 11 a) Step (i) but using 9.7 g of n-tetradecylamine and 6.8 g of xylose to give wet N-tetradecyl xylosylamine as a cream solid. LC-MS (Method C), Rt=0.41 min, $[M-H]^-$=343.9.

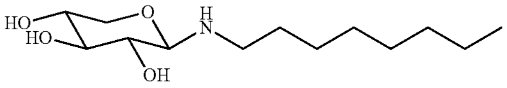 [SMILES: CCCCCCCCNC1OCC(O)C(O)C1O]

Step (ii) Preparation of N-octyl N-acetyl xylosylamine

The process was carried out in essentially the same manner as in Example 11 a) step (ii) but using the wet solid product of Example 14 reaction d) (i) and the crude product was instead purified by FCC eluting with MeOH (4-18%) in DCM. There were obtained 3.7 g of brown viscous oil product. LC-MS (Method A), Rt=1.32 min, $[M+H]^+$=304.2.

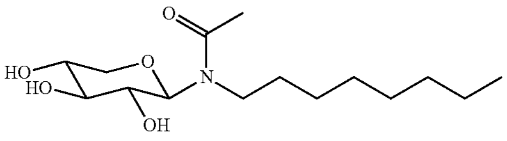 [SMILES: CCCCCCCCN(C(C)=O)C1OCC(O)C(O)C1O]

When the feedstock is 100% monosaccharides, the products produced by the invention have good surface-active properties, though do not retain some of the benefits apparent when the feedstock contains oligosaccharides; example benefits including, but not being limited to, the products being solids at room temperature, the excellent aqueous solubility even when large lipophilic groups (containing 12 or more carbon atoms) are used as substituents to the nitrogen, or the possibility of obtaining good yields of desired N-acetyl products without additional use of a chemical base, such as triethylamine.

C. Preparation of N-acetyl oligosylamines (XOS/COS=3:1)

a) Example 15—Preparation of N-decyl N-acetyl oligosylamine (XOS/COS=3:1)

Step (i) Preparation of N-decyl oligosylamine (XOS/COS=3:1)

A solution of 3 g of n-decylamine in 25 mL 2-propanol was added to a stirred solution of 3 g of xylo-oligosaccharide mixture and 1 g of cellobiose in 15 mL of water. The reaction mixture was stirred at room temperature for 3 days and then heated at 50 degrees centigrade for 30 minutes. The solvent was removed under reduced pressure, followed by co-evaporation with ethanol. The crude product was not isolated, aside from a small sample taken for analysis, but was used directly in reaction a) (ii)

Step (ii) Preparation of N-decyl N-acetyl oligosylamine (XOS/COS=3:1)

14 mL of acetic anhydride was added at ambient temperature to a stirred solution of 3.5 g of N-decyl oligosylamine in 45 mL of MeOH. The mixture was then stirred overnight. The solvent was evaporated under vacuum and co-evaporated with toluene. There were obtained 3.9 g of crude solid yellow product. Attempts to detect compounds of formula 1 wherein the n value is 1 were made, but said compounds could not be detected and so are not assumed to be present in the product mixture in any significant quantity. The following major products were detected in the crude solid by UPLC-MS.

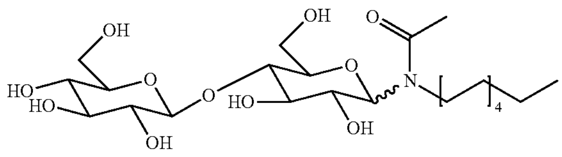

LC-MS Method G. Rt = 2.09 min, $[M - H]^-$ = 522.1

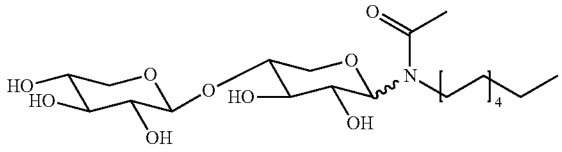

LC-MS Method G. Rt = 1.66 min, $[M - H]^-$ = 462.1

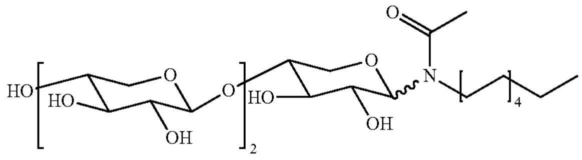

LC-MS Method G. Rt = 2.19 min, $[M - H]^-$ = 594.4

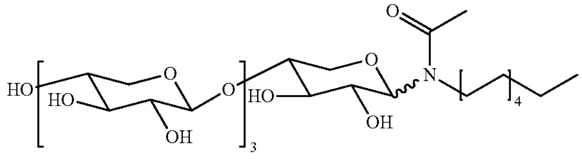

LC-MS Method G. Rt = 2.92 min, $[M - H]^-$ = 726.5

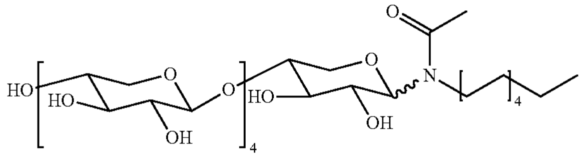

LC-MS Method G. Rt = 3.77 min, $[M - H]^-$ = 858.6

-continued

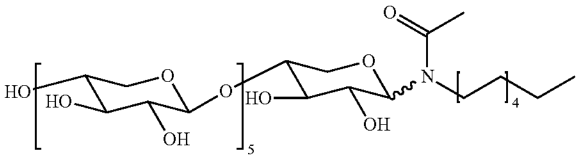

LC-MS Method G. Rt = 4.59 min, $[M - H]^-$ = 990.3

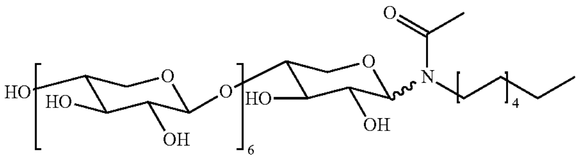

LC-MS Method G. Rt = 5.42 min, $[M - H]^-$ = 1122.8

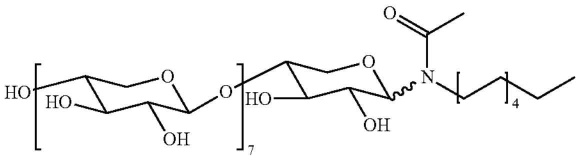

LC-MS Method G. Rt = 6.22 min, $[M - H]^-$ = 1255.1 b) Example 16—Preparation of N-dodecyl N-acetyl oligosylamine (XOS/COS=3:1)

Step (i) Preparation of N-dodecyl oligosylamine (XOS/COS=3:1)

The process was carried out in essentially the same manner as in Example 15, but using 1 g of n-dodecylamine, 1.5 g of xylo-oligosaccharide mixture and 0.5 g of cellobiose. The crude product was not isolated, aside from a small sample taken for analysis, but was used directly in reaction b) Step (ii). Attempts to detect compounds of formula 1 wherein the n value is 1 were made, but said compounds could not be detected and so are not assumed to be present in the product mixture in any significant quantity. The following products were detected in various quantity:

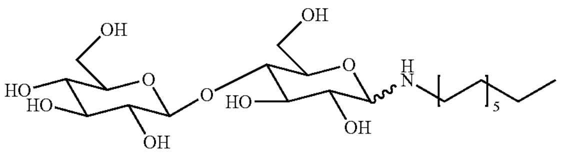

LC-MS Method D. Rt = 0.45 min, $[M - H]^-$ = 508.2

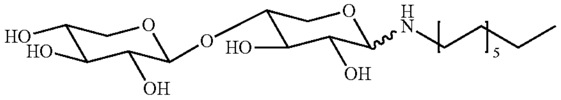

LC-MS Method D. Rt = 0.45 min, $[M - H]^-$ = 448.4

-continued

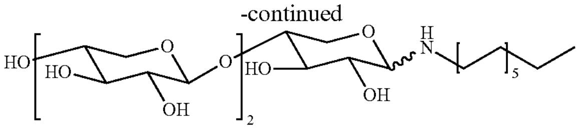

LC-MS Method D. Rt = 0.46 min, $[M - H]^-$ = 580.1

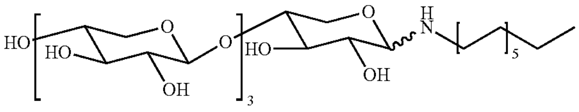

LC-MS Method D. Rt = 0.58 min, $[M - H]^-$ = 712.7

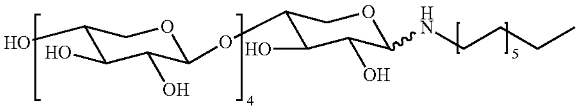

LC-MS Method D. Rt = 0.80 min, $[M - H]^-$ = 844.3

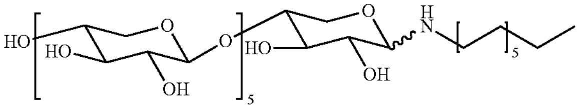

LC-MS Method D. Rt = 1.08 min, $[M - H]^-$ = 973.7

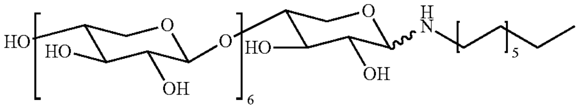

LC-MS Method D. Rt = 1.39 min, $[M - H]^-$ = 1110.3

Step (ii) Preparation of N-dodecyl N-acetyl oligosylamine (XOS/COS=3:1)

The process was carried out in essentially the same manner as in Example 15 a) step (ii), but using the crude product of Example 16 reaction b) Step (i) and 10 mL of acetic anhydride. There were recovered 3.6 g of crude solid yellow product. Attempts to detect compounds of formula 1 wherein the n value is 1 were made, but said compounds could not be detected and so are not assumed to be present in the product mixture in any significant quantity. The following products were detected in various quantity:

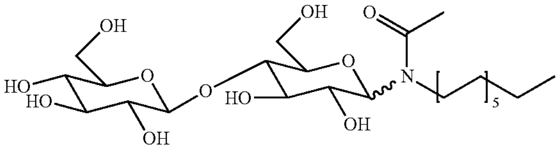

LC-MS Method G, Rt = 1.99 min, $[M - H]^-$ = 550.4

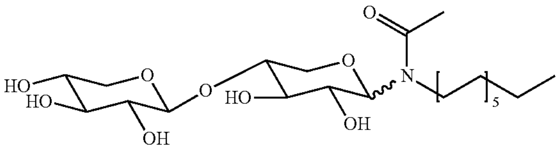

LC-MS Method G. Rt = 1.62 min, $[M - H]^-$ = 490.4

-continued

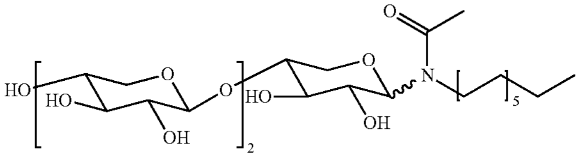

LC-MS Method G. Rt = 2.05 min, [M - H]$^-$ = 622.4

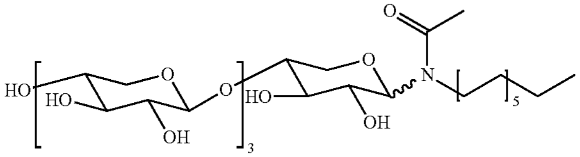

LC-MS Method G. Rt = 2.80 min, [M - H]$^-$ = 754.3

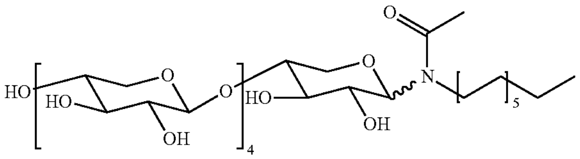

LC-MS Method G. Rt = 3.59 min, [M - H]$^-$ = 886.3

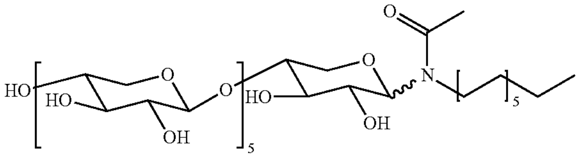

LC-MS Method G. Rt = 4.35 min, [M - H]$^-$ = 1017.5

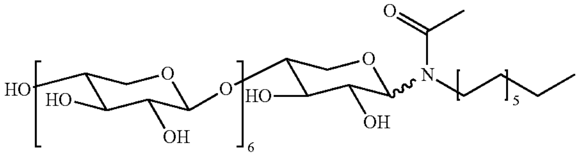

LC-MS Method G. Rt = 5.12 min, [M - H]$^-$ = 1150.1 c) Example 17—Preparation of N-tetradecyl N-acetyl oligosylamine (XOS/COS=3:1)

Step (i) Preparation of N-tetradecyl oligosylamine (XOS/COS=3:1)

The process was carried out in essentially the same manner as in Example 15 a) Step (i), but using 3 g of n-tetradecylamine, 3 g of xylo-oligosaccharide mixture and 1 g of cellobiose. The crude product was not isolated, aside from a small sample taken for analysis, but was used directly in reaction c) (ii).

Step (ii) Preparation of N-tetradecyl N-acetyl oligosylamine (XOS/COS=3:1)

Figure 3:
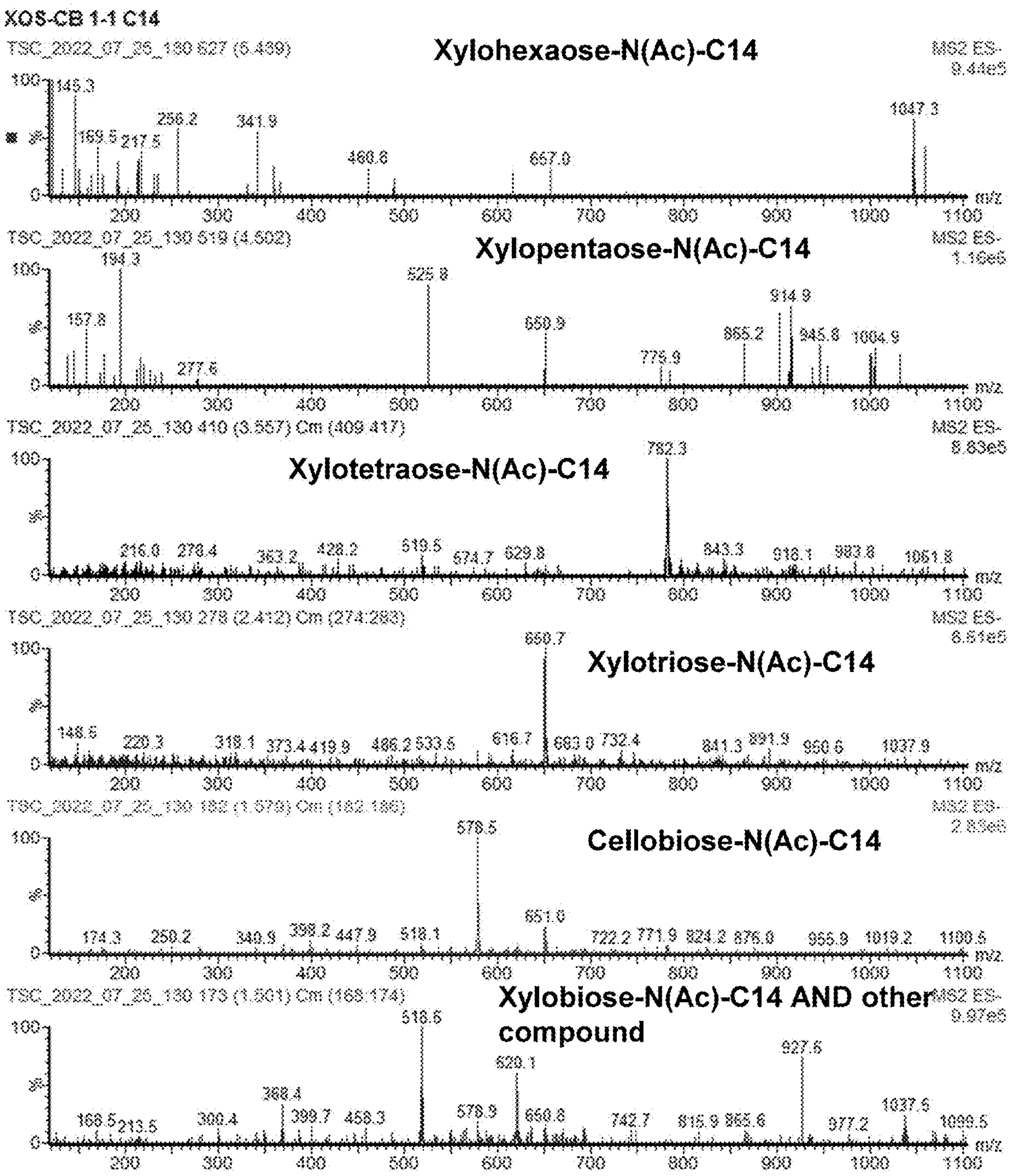
FIG. 3 illustrates the MS spectra obtained at the given retention times from another particular example of the active composition of the invention, specifically N-tetradecyl-N-acetyl oligosaccharides (xylo-oligosaccharides and cello-oligosaccharides). The major peaks visible in the spectra are assigned to the detected substances stated on the individual spectra.

The process was carried out in essentially the same manner as in Example 15 i) but using 2.5 g of N-tetradecyl oligosylamine and 10 mL of acetic anhydride. There were recovered 6.5 g of crude solid yellow product. Attempts to detect compounds of formula 1 wherein the n value is 1 were made, but said compounds could not be detected and so are not assumed to be present in the product mixture in any significant quantity. The following major products were detected by UPLC-MS; FIG. 3 depicts these spectra.

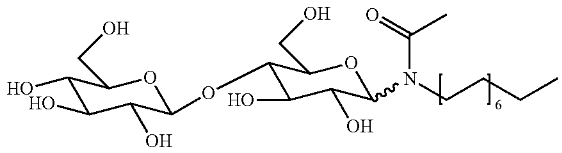

LC-MS Method F. Rt = 1.58 min. [M - H]$^-$ = 578.8.

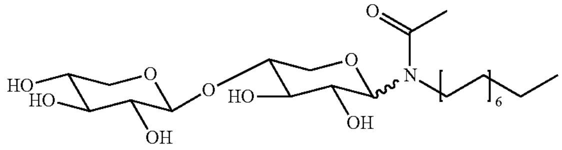

LC-MS Method F. Rt = 1.50 min, [M - H]$^-$ = 518.3.

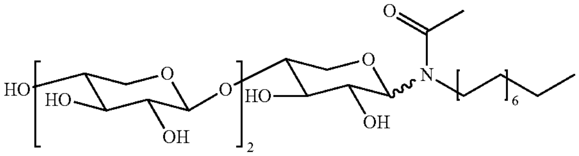

LC-MS Method F. Rt = 2.36 min, [M - H]$^-$ = 650.7

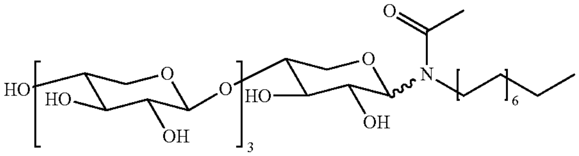

LC-MS Method F. Rt = 3.57 min, [M - H]$^-$ = 782.4

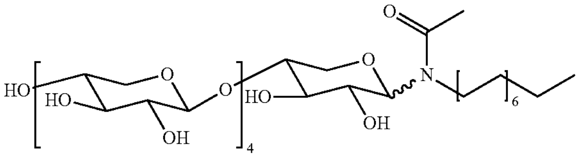

LC-MS Method F. Rt = 4.52 min, [M - H]$^-$ = 914.6

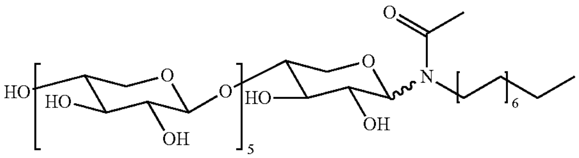

LC-MS Method F. Rt = 5.52 min, [M - H]$^-$ = 1046.7

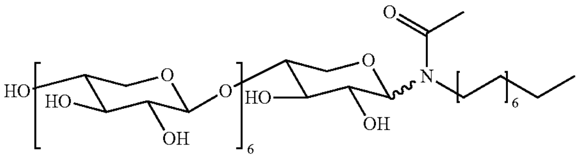

LC-MS Method F. Rt = 6.70 min, [M - H]$^-$ = 1178.7.

d) Example 18—Preparation of N-hexadecyl N-acetyl oligosylamine (XOS/COS=3:1)

Step (i) Preparation of N-hexadecyl oligosylamine (XOS/COS=3:1)

The process was carried out in essentially the same manner as in Example 15 a) Step (i), but using 1.3 g of n-hexadecylamine, 1.5 g of xylo-oligosaccharide mixture and 0.5 g of cellobiose. The crude product was not isolated, aside from a small sample taken for analysis, but was used directly in reaction d) (ii).

Step (ii) Preparation of N-hexadecyl N-acetyl oligosylamine (XOS/COS=3:1)

The process was carried out in essentially the same manner as in a) Step (ii), but using the crude product of Example 18 reaction d) Step (i) and 10 mL of acetic anhydride. There were recovered 3.2 g of crude solid yellow product. Attempts to detect compounds of formula 1 wherein the n value is 1 were made, but said compounds could not be detected and so are not assumed to be present in the product mixture in any significant quantity. The following compounds were detected by UPLC-MS:

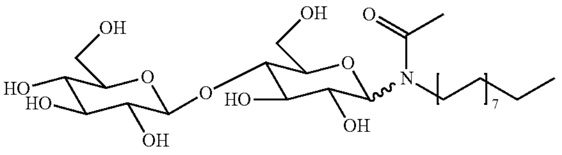

Method G. Rt = 2.08 min. $[M-H]^-$ = 606.3

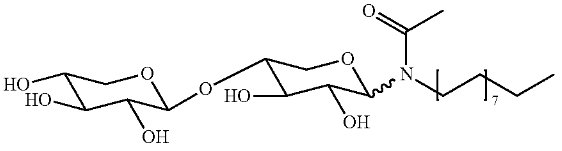

Method G. Rt = 1.62 min, $[M-H]^-$ = 518.3.

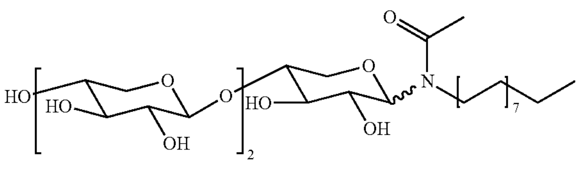

Method G. Rt = 1.70 min, $[M-H]^-$ = 650.3

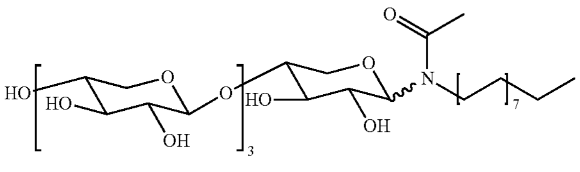

Method G. Rt = 2.66 min, $[M-H]^-$ = 782.4

-continued

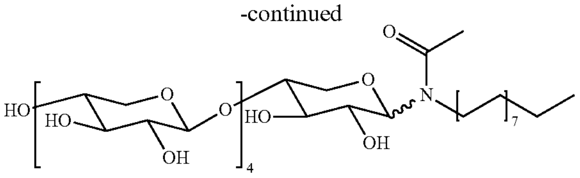

Method G. Rt = 3.38 min, $[M-H]^-$ = 914.6

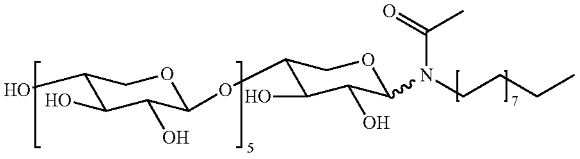

Method G. Rt = 4.12 min, $[M-H]^-$ = 1046.7

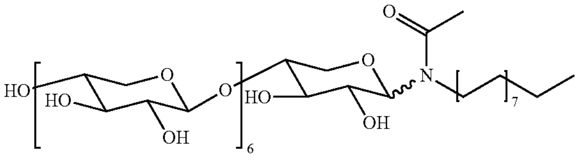

Method G. Rt = 4.90 min, $[M-H]^-$ = 1178.7.

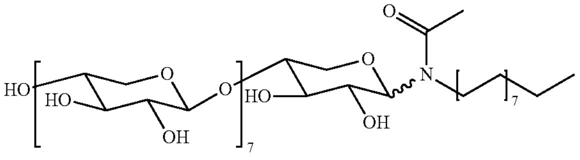

Method G. Rt = 5.64 min, $[M-H]^-$ = 1310.9

D. Preparation of N-acetyl oligosylamines (XOS/COS=1:1)

a) Example 19—Preparation of N-tetradecyl N-acetyl oligosylamine (XOS/COS=1:1)

Step (i) Preparation of N-tetradecyl oligosylamine (XOS/COS=1:1)

The process was carried out in essentially the same manner as in Example 15 a) Step (i), but using 1.24 g of n-tetradecylamine, 1 g of xylo-oligosaccharide mixture, 1 g of cellobiose, 20 mL of 2-propanol and 15 mL of $H_2O$. The crude product was not isolated, aside from a small sample taken for analysis, but was used directly in reaction Example 19 a) (ii).

Step (ii) Preparation of N-tetradecyl N-acetyl oligosylamine (XOS/COS=1:1)

The process was carried out in essentially the same manner as in Example 15 a) Step (ii) but using the crude product of reaction Example 19 a) Step (i) and 10 mL of acetic anhydride. There were recovered 4.2 g of crude solid yellow product. Attempts to detect compounds of formula 1 wherein the n value is 1 were made, but said compounds could not be detected and so are not assumed to be present in the product mixture in any significant quantity. The following compounds were detected by UPLC-MS:

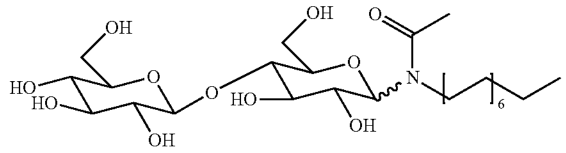

LC-MS Method F. Rt = 1.58 min. [M - H]$^-$ = 578.8.

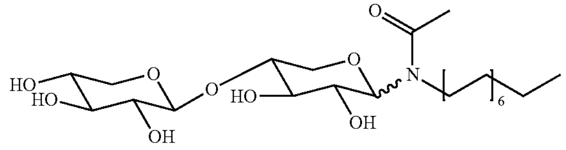

LC-MS Method F. Rt = 1.50 min, [M - H]$^-$ = 518.3.

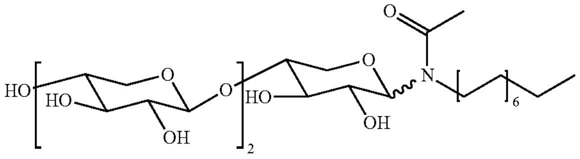

LC-MS Method F. Rt = 2.36 min, [M - H]$^-$ = 650.7

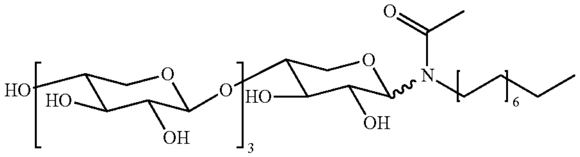

LC-MS Method F. Rt = 3.57 min, [M - H]$^-$ = 782.4

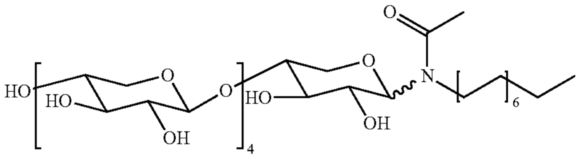

LC-MS Method F. Rt = 4.52 min, [M - H]$^-$ = 914.6

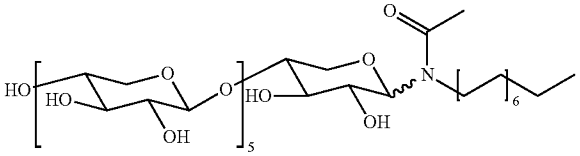

LC-MS Method F. Rt = 5.52 min, [M - H]$^-$ = 1046.7

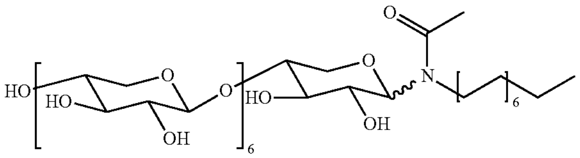

LC-MS Method F. Rt = 6.70 min, [M - H]$^-$ = 1178.7.

The composition analysis of selected component of the product mixture is depicted in FIG. 29.

E. Preparation of N-acetyl oligosylamines (XOS/COS=1:3)

a) Example 20—Preparation of N-tetradecyl N-acetyl oligosylamine (XOS/COS=1:3)

Step (i) Preparation of N-tetradecyl oligosylamine (XOS/COS=1:3)

The process was carried out in essentially the same manner as in Example 19, a) Step (i), but using 1.3 g of n-tetradecylamine, 0.5 g of xylo-oligosaccharide mixture, 1.5 g of cellobiose, 20 mL of 2-propanol and 20 mL of $H_2O$. The crude product was not isolated, aside from a small sample taken for analysis, but was used directly in reaction a) (ii).

Step (ii) Preparation of N-tetradecyl N-acetyl oligosylamine (XOS/COS=1:3)

The process was carried out in essentially the same manner as in Example 19 a) Step (ii) but using the crude product of reaction in Example 20 a) Step (i) and 10 mL of acetic anhydride. There were recovered 3.5 g of crude solid off-white product. Attempts to detect compounds of formula 1 wherein the n value is 1 were made, but said compounds could not be detected and so are not assumed to be present in the product mixture in any significant quantity. The following products were detected by UPLC-MS:

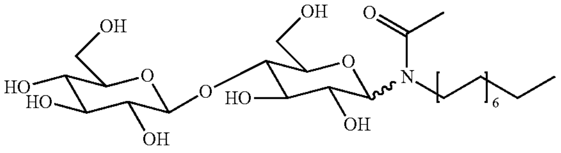

LC-MS Method F. Rt = 1.58 min. [M - H]$^-$ = 578.8.

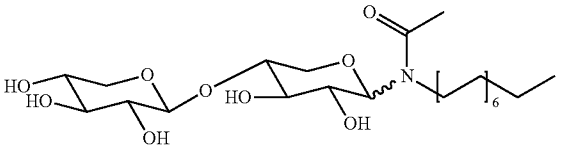

LC-MS Method F. Rt = 1.50 min, [M - H]$^-$ = 518.3.

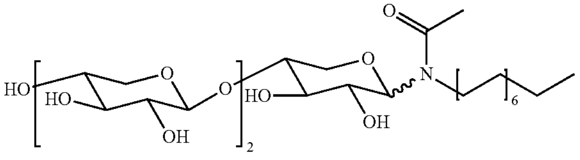

LC-MS Method F. Rt = 2.36 min, [M - H]$^-$ = 650.7

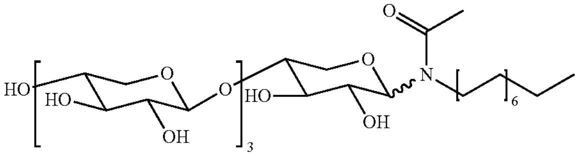

LC-MS Method F. Rt = 3.57 min, [M - H]$^-$ = 782.4

-continued

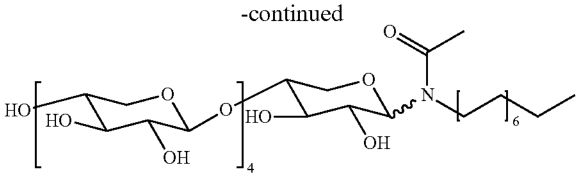

LC-MS Method F. Rt = 4.52 min, [M - H]$^-$ = 914.6

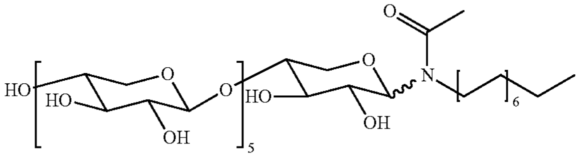

LC-MS Method F. Rt = 5.52 min, [M - H]$^-$ = 1046.7

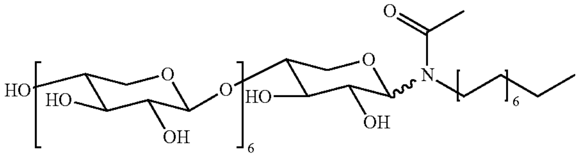

LC-MS Method F. Rt = 6.70 min, [M - H]$^-$ = 1178.7.

F. Preparation of N-acetyl cellobiosylamines a) Example 21—Preparation of N-tetradecyl N-acetyl cellobiosylamine Step (i) Preparation of N-tetradecyl cellobiosylamine 1 g of cellobiose and 630 mg of n-tetradecylamine were added to 10 mL of water and 10 mL of 2-propanol. The reaction mixture was stirred at 40 degrees centigrade for 16 hours, after which time a white solid had precipitated. 100 mL of water was added, the reaction mixture filtered, and the solid washed with water and hexane. There were obtained 0.8 g of a solid white product, which was used immediately in part ii) without further purification.

Figure 8:
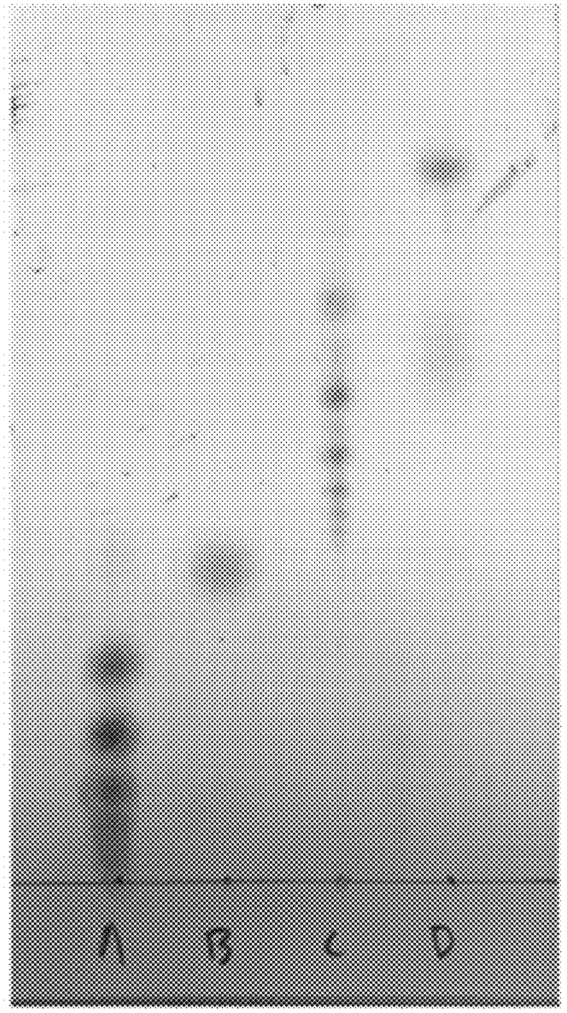
FIG. 8 illustrates the use of a TLC plate for showing the difference between inventive surface-active compositions N-tetradecyl N-acetyl xylo-oligosylamine (C), N-tetradecyl N-acetyl xylosylamine (D) and their starting materials, xylo-oligosaccharides (A) and xylose (B).

Step (ii) Preparation of N-tetradecyl N-acetyl cellobiosylamine 1.27 mL of acetic anhydride was added at ambient temperature to a stirred suspension of 0.5 g of N-tetradecyl cellobiosylamine in 40 mL of MeOH. The mixture was then stirred overnight. This type of reactions can be monitored by TLC. See FIG. 8. The solvent was evaporated under vacuum and co-evaporated with toluene. There were recovered 0.45 g of an off-white crude product. The crude product was purified by reverse-phase FCC eluting with MeCN (5-80%) in water to give the desired product (82 mg) as a white crystalline solid. LC-MS (Method D). Rt=0.72 min, [M–H]$^-$= 578.2.

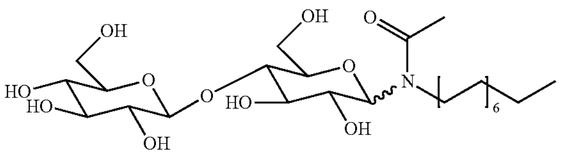

b) Example 22—Preparation of N-hexadecyl N-acetyl cellobiosylamine

Step (i) Preparation of N-hexadecyl cellobiosylamine 1 g of cellobiose and 630 mg of n-hexadecylamine were added to 10 mL of water and 10 mL of 2-propanol. The reaction mixture was stirred at 40 degrees centigrade for 16 hours, after which time a white solid had precipitated. 100 mL of water was added, the reaction mixture filtered, and the solid washed with water and hexane. There were obtained 0.8 g of a solid white product, which was used immediately in part ii) without further purification. LC-MS (Method D). Rt=0.41 min, [M–H]$^-$=564.2.

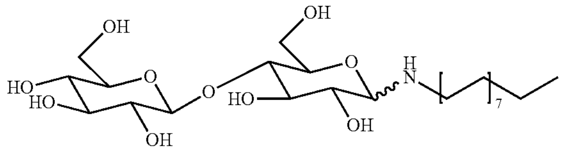

Step (ii) Preparation of N-hexadecyl N-acetyl cellobiosylamine 1.27 mL of acetic anhydride was added at ambient temperature to a stirred suspension of 0.5 g of N-hexadecyl cellobiosylamine in 40 mL of MeOH. The mixture was then stirred overnight. The solvent was evaporated under vacuum and co-evaporated with toluene. The desired product was obtained as a white solid (0.32 g). LC-MS (Method D). Rt=0.36 min, [M–H]$^-$=606.3.

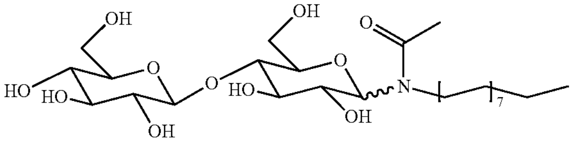

c) Example 23—Preparation of N-dodecyl N-acetyl cellobiosylamine

Step (i) Preparation of N-dodecyl cellobiosylamine 4 g of cellobiose and 2.68 mL of n-dodecylamine were added to 40 mL of water and 40 mL of 2-propanol. The reaction mixture was stirred at 40 degrees centigrade for 48 hours. 400 mL of water was added, the reaction mixture filtered, and the solid dried under vacuum. There were obtained 2.4 g of a white solid, which was used immediately in part ii) without further purification. LC-MS (Method G, Rt=2.17 min, [M–H]$^-$=508.1.

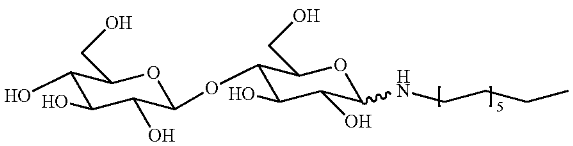

Step (ii) Preparation of N-dodecyl N-acetyl cellobiosylamine 0.97 mL of acetic anhydride was added at ambient temperature to a stirred solution of 1.2 g of N-hexadecyl cellobiosylamine in 25 mL of MeOH. The mixture was then stirred overnight. The solvent was evaporated under vacuum and co-evaporated with toluene. The desired product was obtained in high purity as a white solid (0.6 g). LC-MS (Method G) Rt=1.99 min, $[M-H]^-$=550.4.

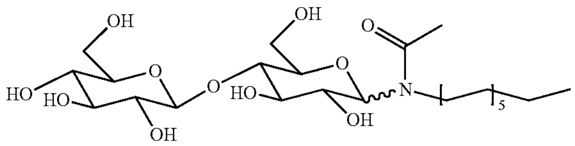

When the feedstock is 100% COS, the surface-activity of the products is acceptable, but surprisingly, reaction times are very long, and the yields are low. It was additionally unexpected that water was required as part of the solvent medium in step (i) to achieve an appreciable rate of reaction, despite it being known that water may degrade the intermediate. When the feedstock is 100% monosaccharides, the surface-activity of the products is surprisingly improved versus when the feedstock is 100% COS, across a range of different carbon chain-lengths, but the products are generally viscous oils that lack particular processing options. When the feedstock is 100% XOS, the reaction is more effective due to fewer side-products being detected and the products are solids. However, when the feedstock is a mixture of XOS and COS, the products retain their solidity and additionally perform unexpectedly superior in application tests than other aforementioned feedstocks.

G. Preparation of N-dodecyl-N-acetyl oligosylamines with Specific XOS—COS Ratios a) Example 24—N-dodecyl, N-acetyl oligosylamine (XOS/COS=1:5)

The product composition of Example 23 (500 mg) was mixed with the product composition of Example 5 (100 mg) to give a beige solid.

b) Example 25—N-dodecyl, N-acetyl oligosylamine (XOS/COS=1:3)

The product composition of Example 23 (450 mg) was mixed with the product composition of Example 5 (150 mg) to give a beige solid.

c) Example 26—N-dodecyl, N-acetyl oligosylamine (XOS/COS=1:1)

The product composition of Example 23 (300 mg) was mixed with the product composition of Example 5 (300 mg) to give a beige solid.

d) Example 27—N-dodecyl, N-acetyl oligosylamine (XOS/COS=3:1)

The product composition of Example 23 (150 mg) was mixed with the product composition of Example 5 (450 mg) to give an off-white solid.

e) Example 28—N-dodecyl, N-acetyl oligosylamine (XOS/COS=5:1)

The product composition of Example 23 (100 mg) was mixed with the product composition of Example 5 (500 mg) to give a white solid.

H. Preparation of N-dodecyl-N-acetyl oligosylamines with Specific XOS—COS Ratios, Purified by FCC a) Example 29—N-dodecyl, N-acetyl oligosylamine (XOS/COS=1:5)

The product composition of Example 5 was purified by FCC eluting with MeCN (10-80%) in water. Fractions containing higher purities of desired N-dodecyl, N-acetyl oligosylamine compounds (by UPLC-MS inspection) were combined and evaporated to dryness to give a brown solid. A sample of this brown solid (100 mg) was mixed with a sample of the product composition of Example 23 (500 mg) to give a beige solid.

b) Example 30—N-dodecyl, N-acetyl oligosylamine (XOS/COS=1:3)

The product composition of Example 5 was purified by FCC eluting with MeCN (10-80%) in water. Fractions containing higher purities of desired N-dodecyl, N-acetyl oligosylamine compounds (by UPLC-MS inspection) were combined and evaporated to dryness to give a brown solid. A sample of this brown solid (150 mg) was mixed with the product composition of Example 23 (450 mg) to give a beige solid.

c) Example 31—N-dodecyl, N-acetyl oligosylamine (XOS/COS=1:1)

The product composition of Example 5 was purified by FCC eluting with MeCN (10-80%) in water. Fractions containing higher purities of desired N-dodecyl, N-acetyl oligosylamine compounds (by UPLC-MS inspection) were combined and evaporated to dryness to give a brown solid. A sample of this brown solid (300 mg) was mixed with the product composition of Example 23 (300 mg) to give a beige solid.

d) Example 32—N-dodecyl, N-acetyl oligosylamine (XOS/COS=3:1)

The product composition of Example 5 was purified by FCC eluting with MeCN (10-80%) in water. Fractions containing higher purities of desired N-dodecyl, N-acetyl oligosylamine compounds (by UPLC-MS inspection) were combined and evaporated to dryness to give a brown solid. A sample of this brown solid (450 mg) was mixed with the product composition of Example 23 (150 mg) to give an off-white solid.

e) Example 33—N-dodecyl, N-acetyl oligosylamine (XOS/COS=5:1)

The product composition of Example 5 was purified by FCC eluting with MeCN (10-80%) in water. Fractions containing higher purities of desired N-dodecyl, N-acetyl oligosylamine compounds (by UPLC-MS inspection) were combined and evaporated to dryness to give a brown solid.

A sample of this brown solid (500 mg) was mixed with the product composition of Example 23 (100 mg) to give an off-white solid.

I. Preparation of N-acetyl oligosylamines (Mixture of xylose, glucose, and arabinose oligosaccharides)

a) Example 34—N-dodecyl, N-acetyl oligosylamine

Step (i) Preparation of N-dodecyl oligosylamine

A mixture of oligosaccharides containing xylose, glucose, and arabinose units in mixed polymerization degree, in addition to other oligosaccharides, derived in entirety from oat fiber (28 g) was suspended in MeOH (120 mL) and n-dodecylamine (18.5 g, 0.1 mol, 23 mL) was added. The mixture was stirred for 24 h, then left to stand for 24 h. A cream precipitate was collected by filtration and washed with additional MeOH to give a cream solid (15.2 g) that contained the following major products when analyzed by UPLC-MS:

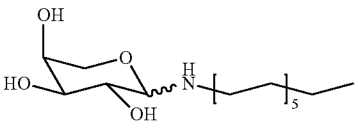

LC-MS Method D. Rt = 0.34 min, $[M - H]^-$ = 316.1

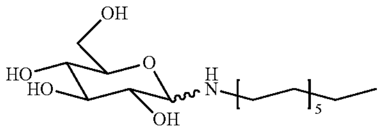

LC-MS Method D. Rt = 0.34 min, $[M - H]^-$ = 346.2

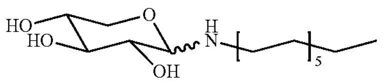

LC-MS Method D. Rt = 0.37 min, $[M - H]^-$ = 316.1

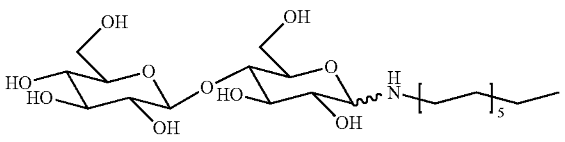

LC-MS Method D. Rt = 0.45 min, $[M - H]^-$ = 508.2

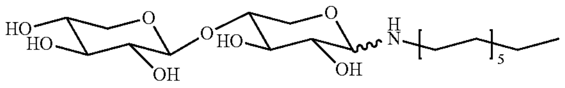

LC-MS Method D. Rt = 0.45 min, $[M - H]^-$ = 448.4

-continued

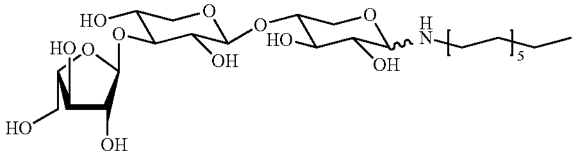

LC-MS Method D. Rt = 0.49 min, $[M - H]^-$ = 580.3

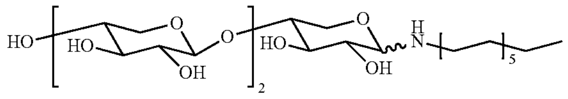

LC-MS Method D. Rt = 0.46 min, $[M - H]^-$ = 580.1

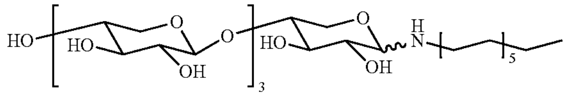

LC-MS Method D. Rt = 0.58 min, $[M - H]^-$ = 712.7

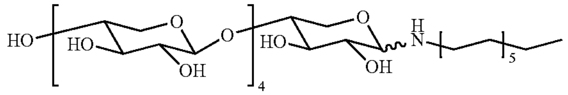

LC-MS Method D. Rt = 0.80 min, $[M - H]^-$ = 844.3

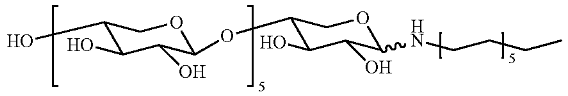

LC-MS Method D. Rt = 1.08 min, $[M - H]^-$ = 976.7

Figures 16A, 16B:
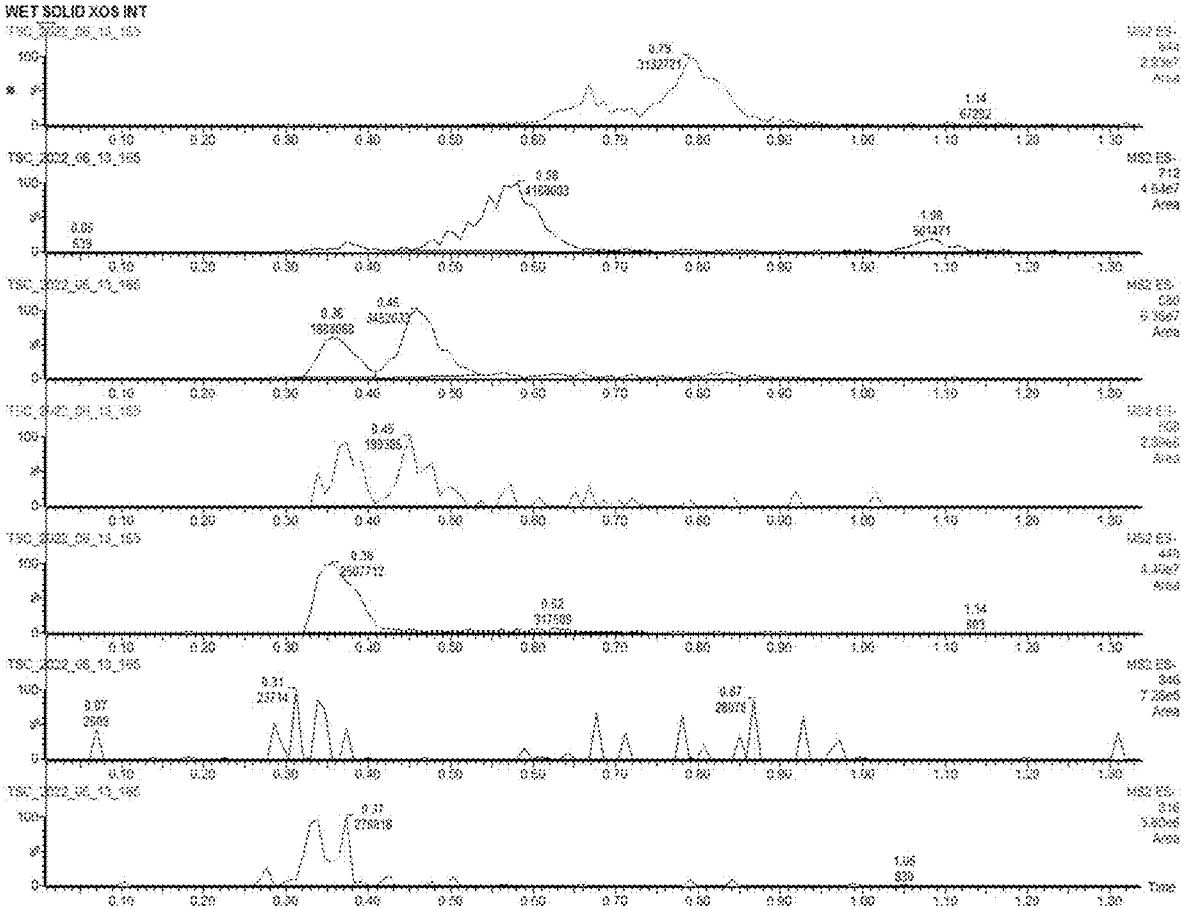
FIG. 16A depicts the LC-MS chromatograms for selected products obtained in Example 34, step (i).
FIG. 16B shows the peak areas for ions responding to the selected products from the mixture given in Example 34, step (i).

The LC-MS chromatograms for selected products are depicted in FIG. 16A. The peak areas for ions responding to the selected products are shown in FIG. 16B. The peak area of signals corresponding to monosaccharide products was 2% of the total area for all selected compounds (and 98% of the peak area was from signals corresponding to compounds wherein the saccharide component had a DP of 2-10). No further monosaccharide products to those stated in FIG. 16B were detected.

Step (ii) Preparation of N-dodecyl N-acetyl oligosylamine

Figure 4:
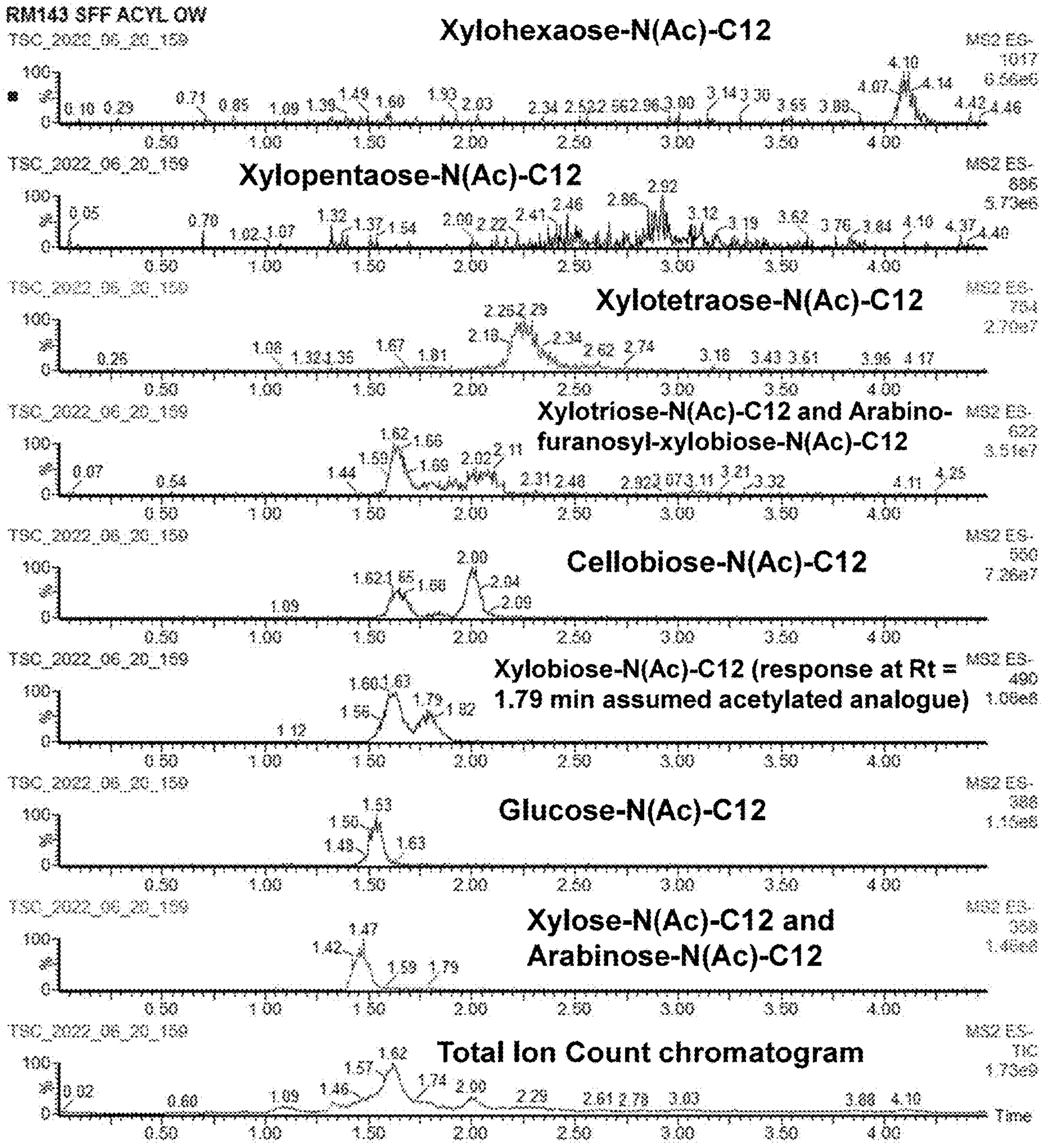
FIG. 4 illustrates the MS spectra obtained at given retention times from another particular example of the active composition of the invention, specifically N-dodecyl-N-acetyl oligosaccharides (specifically where the saccharide components are glucose, xylose, arabinose, and related oligosaccharides). The major peaks visible in the spectra are assigned to the detected substances stated on the individual spectra.
Figure 5:
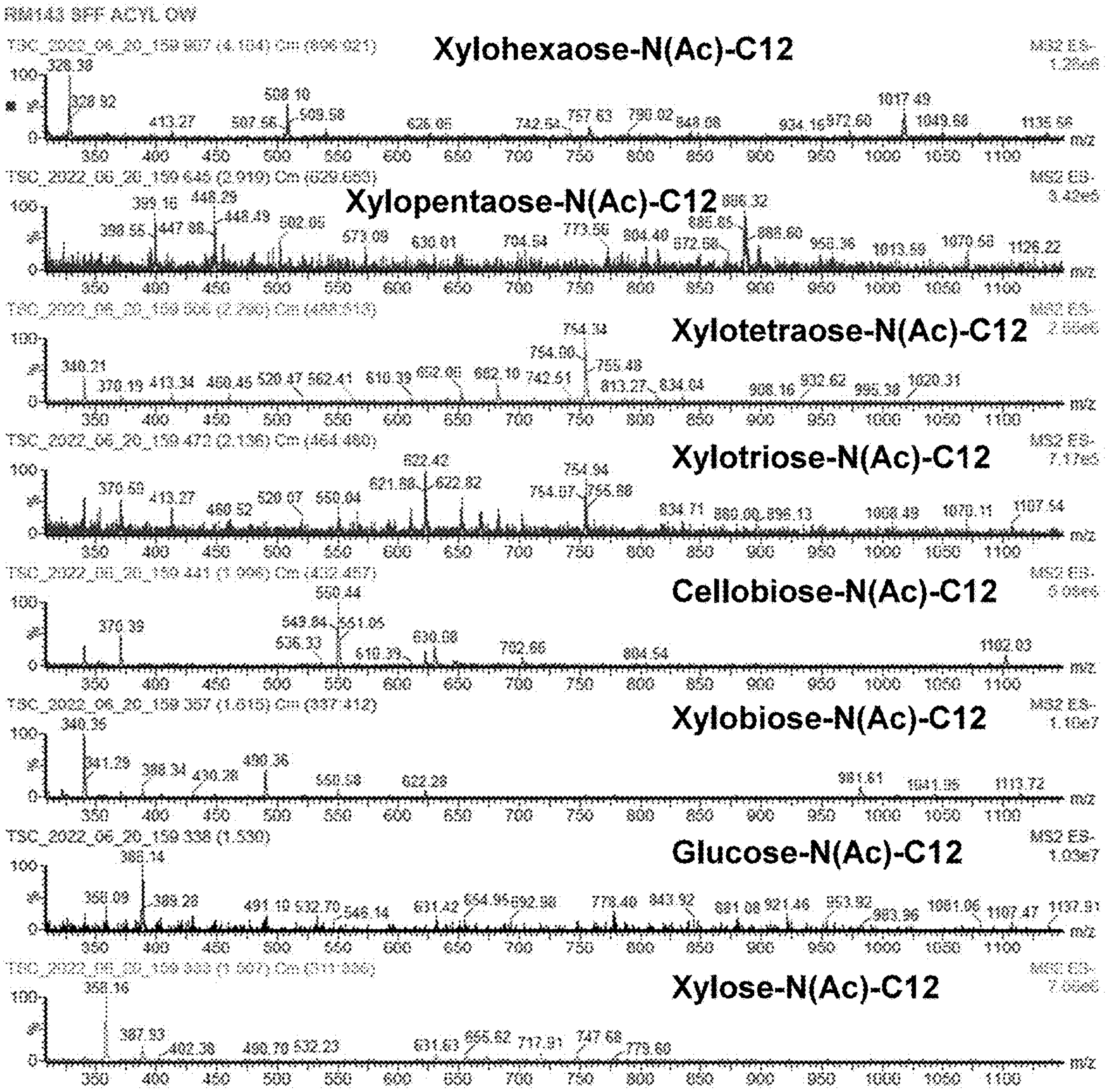
FIG. 5 illustrates the MS spectra obtained at given retention times from another particular example of the active composition of the invention, specifically N-dodecyl-N-acetyl oligosaccharides (specifically where the saccharide components are glucose, xylose, and related oligosaccharides). The major peaks visible in the spectra are assigned to the detected substances stated on the individual spectra.

The solid N-dodecyl oligosylamine (15.2 g) was suspended in MeOH (120 mL) and acetic anhydride (0.225 mol) was added slowly via a syringe pump. The mixture was stirred for an additional 24 h. The mixture was concentrated under reduced pressure to give an orange gum. The gum was stirred with isopropanol-heptane (1:20, 300 mL) to give a cream suspension. The suspension was collected by filtration and dried in vacuo to give an amber solid (9.9 g) that contained the following major products when analyzed by UPLC-MS, with the spectra shown in FIG. 4 and/or FIG. 5.

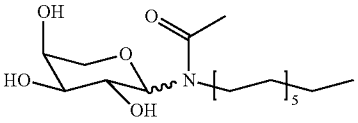

LC-MS Method G.
Rt = 1.42 min, [M - H]$^-$ = 358.2

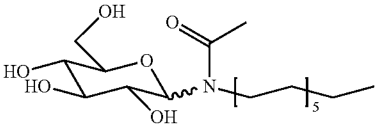

LC-MS Method G.
Rt = 1.53 min, [M - H]$^-$ = 388.1

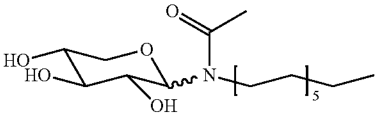

LC-MS Method G.
Rt = 1.42 min, [M - H]$^-$ = 358.2

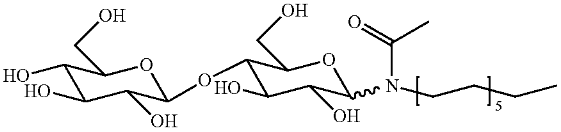

LC-MS Method G.
Rt = 1.97 min, [M - H]$^-$ = 550.4

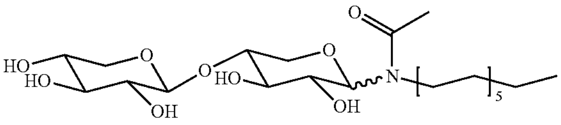

LC-MS Method G.
Rt = 1.62 min, [M - H]$^-$ = 490.4

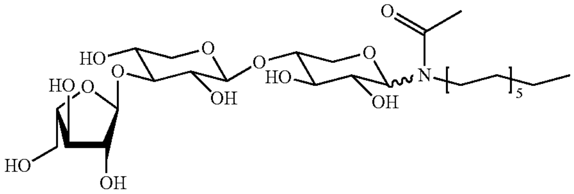

LC-MS Method G.
Rt = 1.65 min, [M - H]$^-$ = 622.4

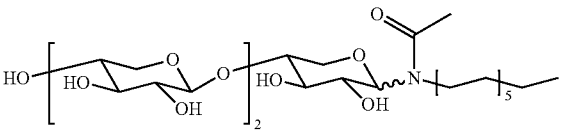

LC-MS Method G.
Rt = 2.02 min, [M - H]$^-$ = 622.4

-continued

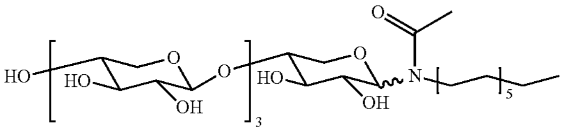

LC-MS Method G.
Rt = 2.29 min, [M - H]$^-$ = 754.3

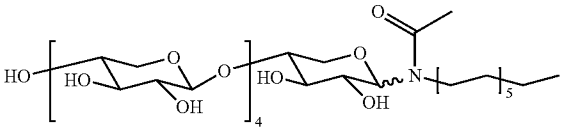

LC-MS Method G.
Rt = 2.92 min, [M - H]$^-$ = 886.3

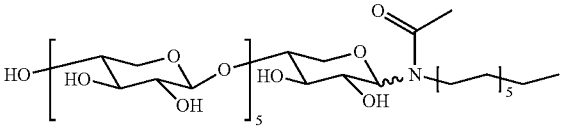

LC-MS Method G.
Rt = 4.10 min, [M - H]$^-$ = 1017.5 b) Example 35—N-dodecyl, N-acetyl oligosylamine, from oligosaccharides derived from wheat bran

Step (i) Preparation of N-dodecyl oligosylamine

A mixture of oligosaccharides containing xylose, glucose, and arabinose units in mixed polymerization degree, in addition to other oligosaccharides, derived in entirety from wheat bran fiber, (28 g) was suspended in MeOH (120 mL) and n-dodecylamine (18.5 g, 0.1 mol, 23 mL) was added. The mixture was stirred for 24 h, then left to stand for 24 h. The resulting thick suspension contained the following major products when analyzed by UPLC-MS:

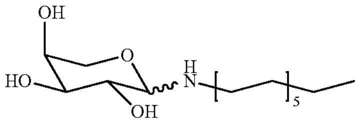

LC-MS Method D. Rt = 0.34 min, [M - H]$^-$ = 316.1

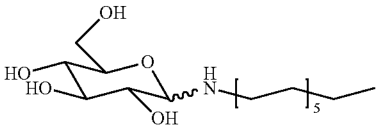

LC-MS Method D. Rt = 0.34 min, [M - H]$^-$ = 346.2

-continued

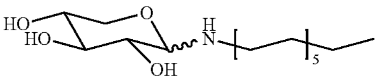

LC-MS Method D. Rt = 0.37 min, $[M - H]^-$ = 316.1

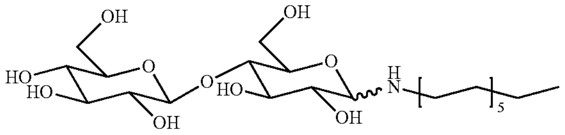

LC-MS Method D. Rt = 0.45 min, $[M - H]^-$ = 508.2

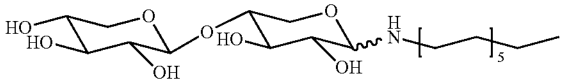

LC-MS Method D. Rt = 0.45 min, $[M - H]^-$ = 448.4

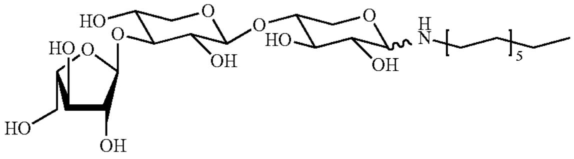

LC-MS Method D. Rt = 0.49 min, $[M - H]^-$ = 580.3

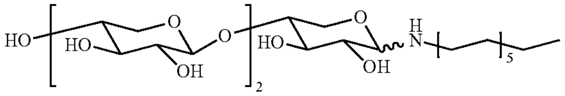

LC-MS Method D. Rt = 0.46 min, $[M - H]^-$ = 580.1

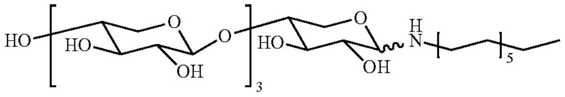

LC-MS Method D. Rt = 0.58 min, $[M - H]^-$ = 712.7

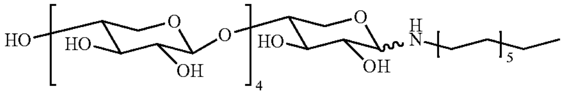

LC-MS Method D. Rt = 0.80 min, $[M - H]^-$ = 844.3

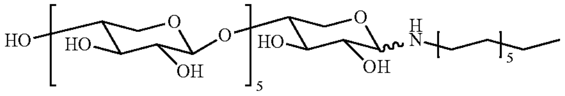

LC-MS Method D. Rt = 1.08 min, $[M - H]^-$ = 976.7

Step (ii) Preparation of N-dodecyl N-acetyl oligosylamine

To the thick suspension containing N-dodecyl oligosylamine of part i) was added additional MeOH (30 mL) and then acetic anhydride (0.225 mol) was added slowly via a syringe pump. The mixture was stirred for an additional 24 h. The mixture was concentrated under reduced pressure to give a viscous brown oil. The oil was stirred with toluene-ethanol-heptane (1:5:3, 200 mL) to give a beige suspension. The suspension was collected by filtration and dried in vacuo to give a brown, low-melting solid (14.3 g) that contained the following major products when analyzed by UPLC-MS:

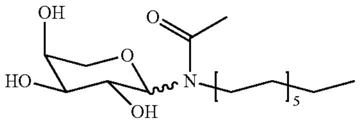

LC-MS Method G. Rt = 1.42 min, $[M - H]^-$ = 358.2

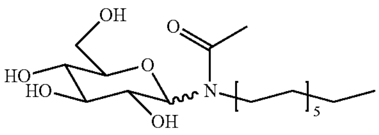

LC-MS Method G. Rt = 1.53 min, $[M - H]^-$ = 388.1

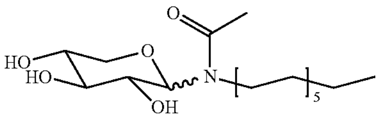

LC-MS Method G. Rt = 1.42 min, $[M - H]^-$ = 358.2

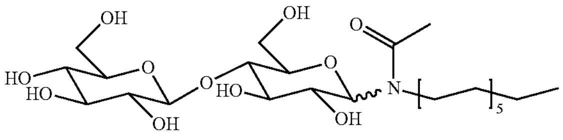

LC-MS Method G. Rt = 1.97 min, $[M - H]^-$ = 550.4

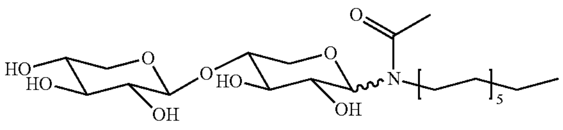

LC-MS Method G. Rt = 1.62 min, $[M - H]^-$ = 490.4

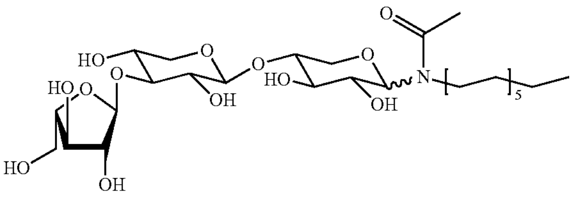

LC-MS Method G. Rt = 1.65 min, $[M - H]^-$ = 622.4

-continued

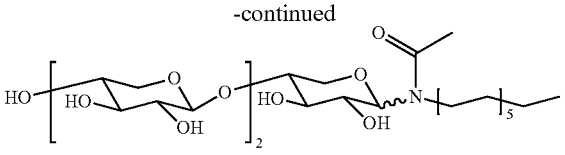

LC-MS Method G. Rt = 2.02 min, $[M - H]^- = 622.4$

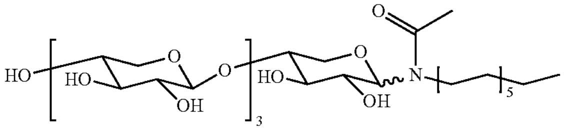

LC-MS Method G. Rt = 2.29 min, $[M - H]^- = 754.3$

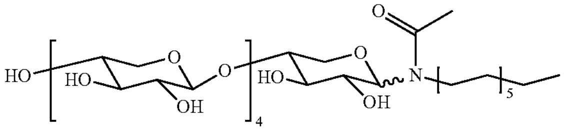

LC-MS Method G. Rt = 2.92 min, $[M - H]^- = 886.3$

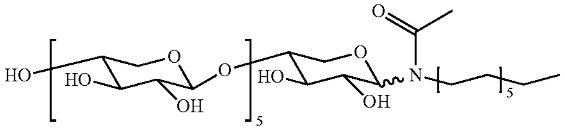

LC-MS Method G. Rt = 4.10 min, $[M - H]^- = 1017.5$ c) Example 36—N-Dodecyl, N-Acetyl Oligosylamine, from Oligosaccharides Derived from Corn Cobs Biomass

Step (i) Preparation of N-dodecyl oligosylamine

A mixture of oligosaccharides containing xylose, glucose, and arabinose units in mixed polymerization degree, derived in entirety from corn cob fiber, in addition to other oligosaccharides (38 g) was suspended in MeOH (120 mL) and n-dodecylamine (18.5 g, 0.1 mol, 23 mL) was added. The mixture was stirred for 24 h, then left to stand for 24 h. The cream precipitate was collected by filtration and washed with additional MeOH to give a cream solid (43 g) that contained the following major products when analyzed by UPLC-MS:

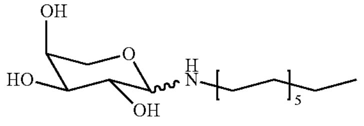

LC-MS Method D. Rt = 0.34 min, $[M - H]^- = 316.1$

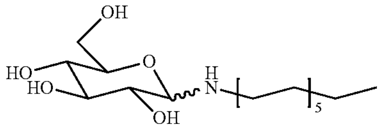

LC-MS Method D. Rt = 0.34 min, $[M - H]^- = 346.2$

-continued

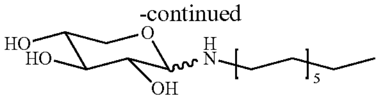

LC-MS Method D. Rt = 0.37 min, $[M - H]^- = 316.1$

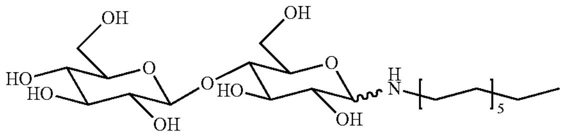

LC-MS Method D. Rt = 0.45 min, $[M - H]^- = 508.2$

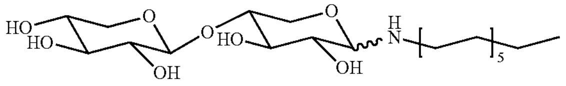

LC-MS Method D. Rt = 0.45 min, $[M - H]^- = 448.4$

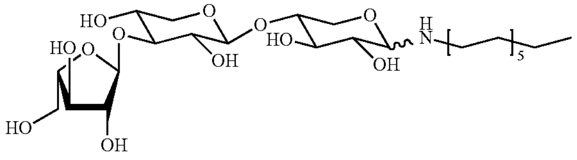

LC-MS Method D. Rt = 0.49 min, $[M - H]^- = 580.3$

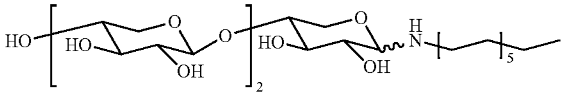

LC-MS Method D. Rt = 0.46 min, $[M - H]^- = 580.1$

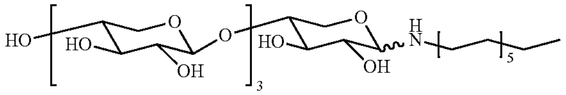

LC-MS Method D. Rt = 0.58 min, $[M - H]^- = 712.7$

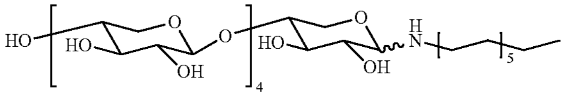

LC-MS Method D. Rt = 0.80 min, $[M - H]^- = 844.3$

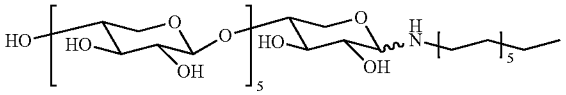

LC-MS Method D. Rt = 1.08 min, $[M - H]^- = 976.7$

Step (ii) Preparation of N-dodecyl N-acetyl oligosylamine

The solid N-dodecyl oligosylamine (43 g) was suspended in MeOH (100 mL) and acetic anhydride (0.225 mol) was added slowly via a syringe pump. The mixture was stirred for an additional 24 h. The mixture was concentrated under reduced pressure to give a brown gum. The gum was stirred with toluene (30 mL) and then ethanol (100 mL) was added to give a cream suspension. The suspension was collected by filtration and dried in vacuo to give an amber solid (9.9 g) that contained the following major products when analyzed by UPLC-MS:

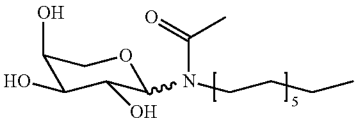

LC-MS Method G. Rt = 1.42 min, $[M-H]^{-}$ = 358.2

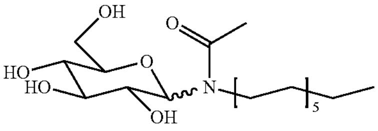

LC-MS Method G. Rt = 1.53 min, $[M-H]^{-}$ = 388.1

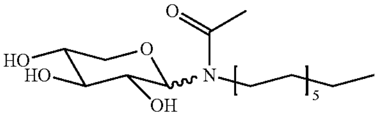

LC-MS Method G. Rt = 1.42 min, $[M-H]^{-}$ = 358.2

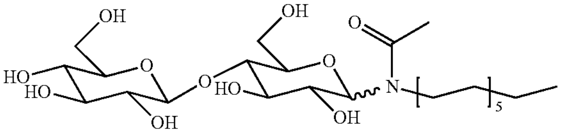

LC-MS Method G. Rt = 1.97 min, $[M-H]^{-}$ = 550.4

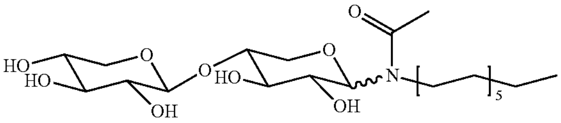

LC-MS Method G. Rt = 1.62 min, $[M-H]^{-}$ = 490.4

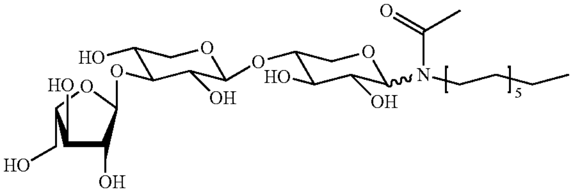

LC-MS Method G. Rt = 1.65 min, $[M-H]^{-}$ = 622.4

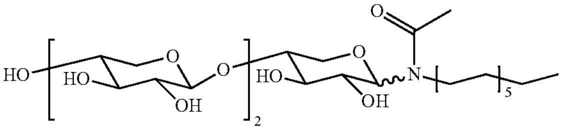

LC-MS Method G. Rt = 2.02 min, $[M-H]^{-}$ = 622.4

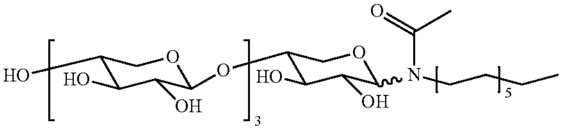

LC-MS Method G. Rt = 2.29 min, $[M-H]^{-}$ = 754.3

-continued

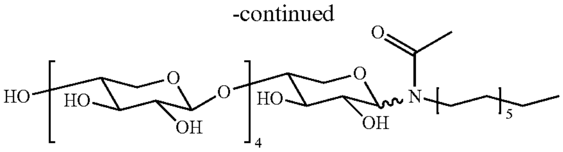

LC-MS Method G. Rt = 2.92 min, $[M-H]^{-}$ = 886.3

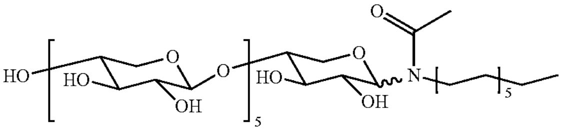

LC-MS Method G. Rt = 4.10 min, $[M-H]^{-}$ = 1017.5

Figures 19A, 19B:
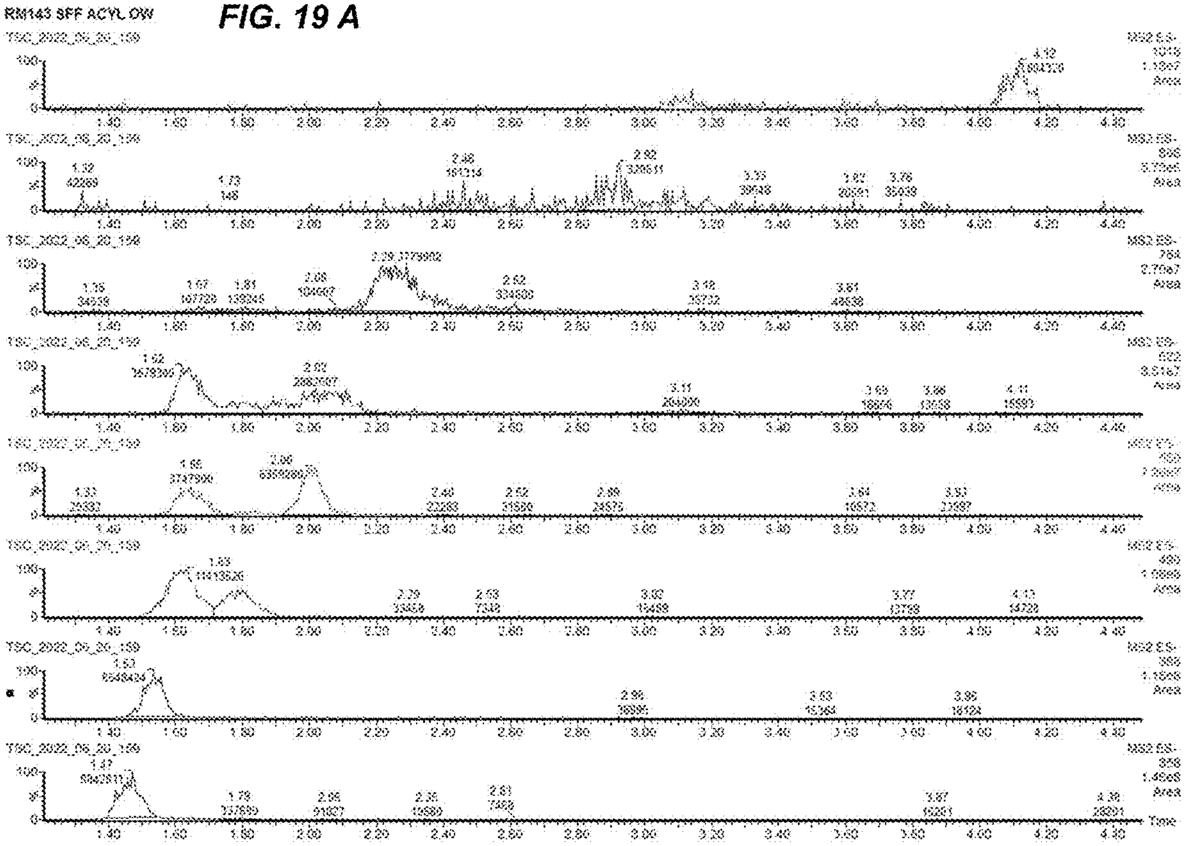
FIG. 19A depicts the LC-MS chromatograms for selected products obtained in Example 36, step (ii).
FIG. 19B shows the peak areas for ions responding to the selected products from the mixture given in Example 36, step (ii).

The LC-MS chromatograms for selected products are depicted in FIG. 19A. The peak areas for ions corresponding to the selected products are shown in FIG. 19B. The peak area of signals corresponding to monosaccharide products was 35.7% of the total area for all selected compounds (and 64.3% of the peak area was from signals corresponding to compounds wherein the saccharide component had a DP of 2-10). No further monosaccharide products to those stated in FIG. 19B were detected.

When the feedstock is 10000 COS, the surface-activity of the products is acceptable, but reaction times are unexpectedly very long, and the yields are low. When the feedstock is 100% monosaccharides, the surface-activity of the products is acceptable, but they are generally viscous oils that lack particular processing options. When the feedstock is 100% XOS, the reaction is unexpectedly more effective due to fewer side-products being detected and the products are solids. However, when the feedstock is a mixture of XOS and COS (excluding monosaccharides), the products surprisingly and additionally perform superior in application tests than other aforementioned feedstocks. When the feedstock is a mixture of XOS and COS, which includes monosaccharides, the overall product performed similarly well in application testing to if the feedstock mixture of COS and XOS did not include monosaccharides, but has the additional, surprising advantage that the amine intermediate mixture (e.g., N-dodecyl-N-oligosylamine) is readily separated from the reaction mixture by filtration.

J. Preparation of N-Acyl Oligosylamines (Mixture of Xylose, Glucose, and Arabinose Oligosaccharides)

a) Example 37: Preparation of N-propanoyl N-substituted oligosylamines

The selected crude N-substituted oligosylamine intermediate product mixtures (1 equiv.) as synthesized in the related example were suspended in methanol (4 mL). Propionic anhydride (0.152 mL, 0.155 g, 1.19 mmol, 1.2 equiv.) was added dropwise and stirring was continued at room temperature for 16 h. The following components were detected in the product mixtures:

i) The selected Oligosylamine intermediate mixture was: N-butyl xylose-oligosylamine. The resulting products detected were:

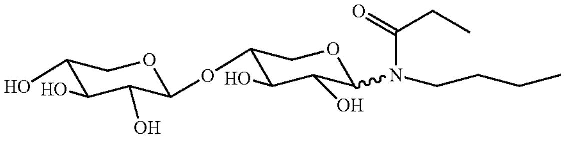 [SMILES: CCCCN(C(=O)CC)C1OCC(OC2OCC(O)C(O)C2O)C(O)C1O]

LC-MS Method D. Rt = 0.49 min, [M − H]$^-$ = 392.0

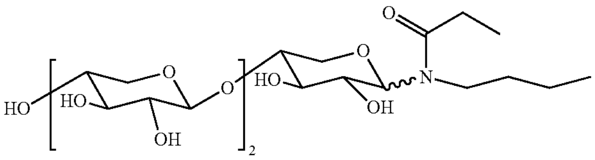

LC-MS Method D. Rt = 0.62 min, [M − H]$^-$ = 524.0

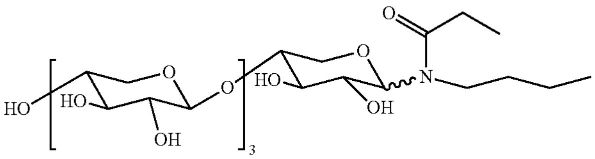

LC-MS Method D. Rt = 0.87 min, [M − H]$^-$ = 656.6

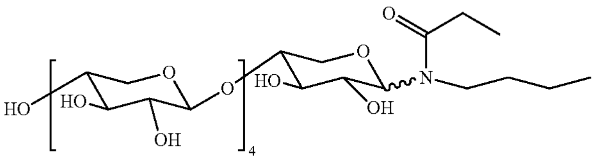

LC-MS Method D. Rt = 1.21 min, [M − H]$^-$ = 789.3 ii) The selected oligosylamine intermediate was: N-decyl xylosylamine. The resulting detected product was N-propanoyl-N-decyl xylosylamine amine.

LC-MS Method C. Rt = 0.32 min, [M − H]$^-$ = 344.4 iii) The selected oligosylamine intermediate was: N-dodecyl xylosylamine. The resulting detected product was N-propanoyl-N-dodecyl xylosylamine.

Figure 6:
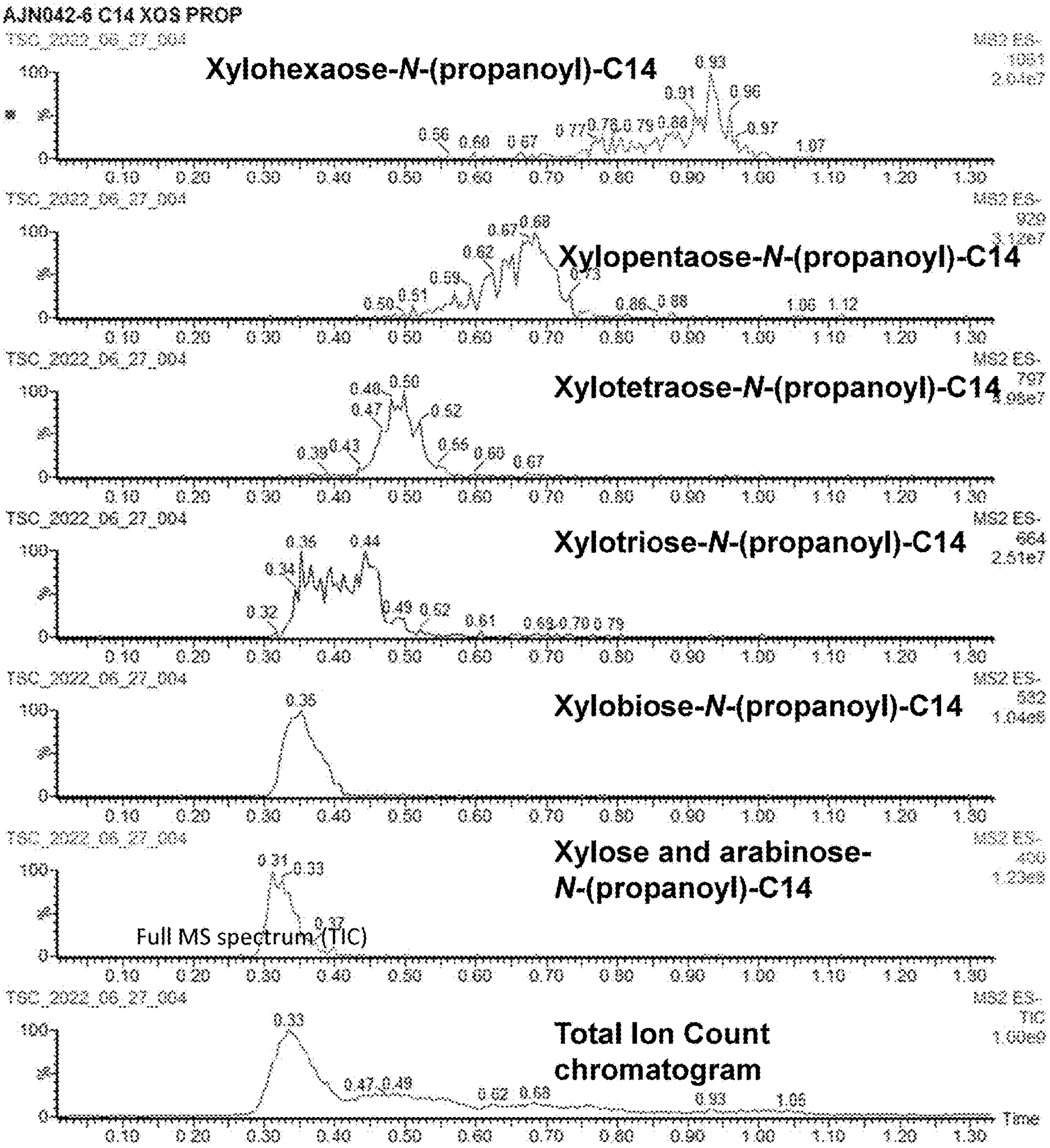
FIG. 6 illustrates the MS response for the expected product ions (shown to the right of the trace and include ions within +1 Da of the stated value) obtained from the liquid chromatography of another particular example of the surface-active composition of the invention, specifically N-tetradecyl-N-propanoyl xylo-oligosaccharides. The major peaks visible in the spectra are assigned to the detected substances stated.

LC-MS Method A. Rt = 1.97 min, [M + H]$^+$ = 374.5 iv) The selected oligosylamine intermediate mixture was: N-tetradecyl oligosylamine. The resulting detected products were:

LC traces of products in mixture shown in FIG. 6

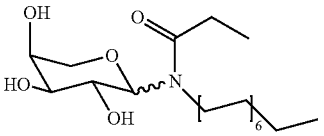

LC-MS Method D. Rt = 0.33 min, [M − H ]$^-$ = 399.8

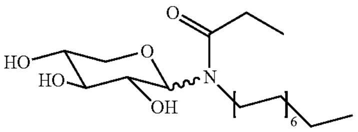

LC-MS Method D: Rt = 0.34 min, [M − H]$^-$ = 400.2

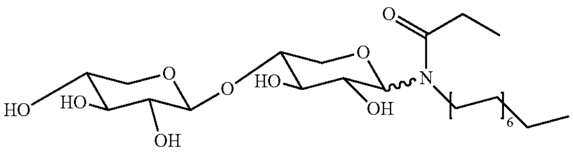

LC-MS Method D. Rt = 0.36 min, [M − H]$^-$ = 532.2

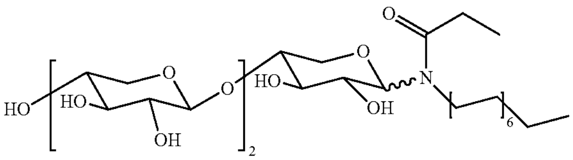

LC-MS Method D. Rt = 0.38 min, [M − H ]$^-$ = 664.6

-continued

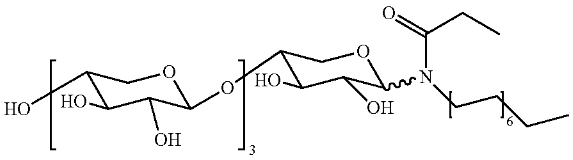

LC-MS Method D. Rt = 0.49 min, [M − H]$^-$ = 796.6

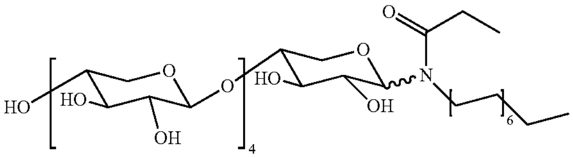

LC-MS Method D. Rt = 0.68 min, [M − H]$^-$ = 928.8

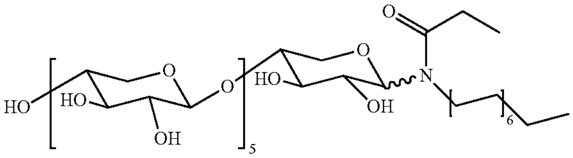

LC-MS Method D. Rt = 0.93 min, [M − H]$^-$ = 1060.8

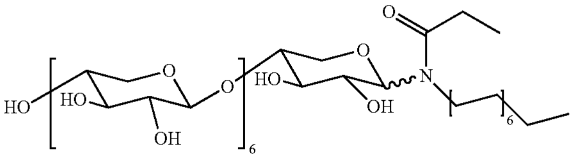

LC-MS Method D. Rt = 1.22 min, [M − H]$^-$ = 1191.7

Compositional analysis based on peak area for this mixture is depicted in FIG. 30.

v) The selected oligosylamine intermediate mixture was: N-oleyl oligosylamine. The resulting products detected were:

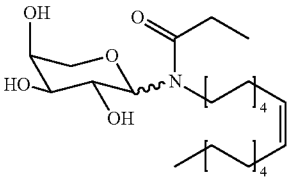

LC-MS Method D. Rt = 0.32 min, [M − H ]$^-$ = 454.6

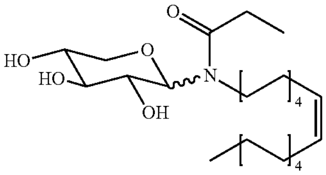

LC-MS Method D. Rt = 0.34 min, [M − H]$^-$ = 454.3

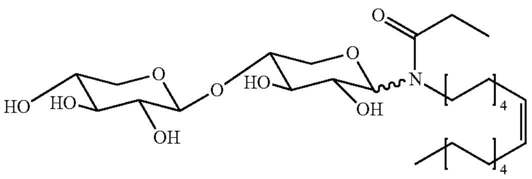

LC-MS Method D. Rt = 0.37 min, [M − H]$^-$ = 586.3

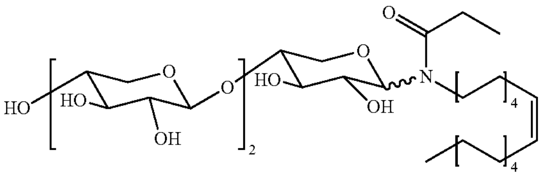

LC-MS Method D. Rt = 0.39 min, [M − H]$^-$ = 718.3

-continued

| | |
|---|---|
| 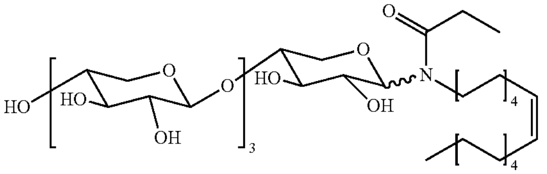 | LC-MS Method D. Rt = 0.47 min, [M − H]$^-$ = 850.2 |
| 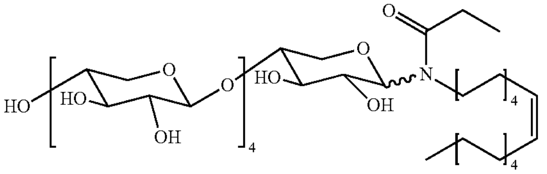 | LC-MS Method D. Rt = 0.64 min, [M − H]$^-$ = 981.7 |
| 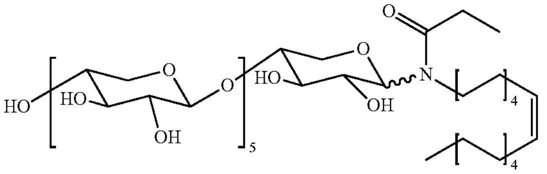 | LC-MS Method D. Rt = 0.84 min, [M − H]$^-$ = 1113.6 |

b) Example 38: Preparation of N-n-butanoyl N-substituted oligosylamines

The selected crude XOS-amine intermediate product (1 equiv.) as synthesized above were suspended in methanol (4 mL). n-Butyric anhydride (0.195 mL, 0.188 g, 1.19 mmol, 1.2 equiv.) was added dropwise and stirring was continued at room temperature for 16 h. The following components were detected in the product mixtures:

| | |
|---|---|
| i) The selected oligosylamine intermediate was: N-decyl xylosylamine. The resulting detected product was N-(n-butanoyl)-N-decyl xylosylamine. | LC-MS Method A. Rt = 1.81 min, [M + H]$^+$ = 360.4 |
| ii) The selected oligosylamine intermediate mixture was: N-oleyl oligosylamine. The resulting detected products were: 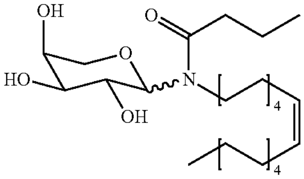 | LC-MS Method D. Rt = 0.41 min, [M + $NH_4$]$^+$ = 530.0 |
| 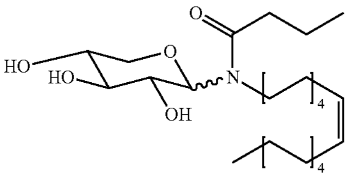 | LC-MS Method D. Rt = 0.46 min, [M + $NH_4$]$^+$ = 530.1 |
| 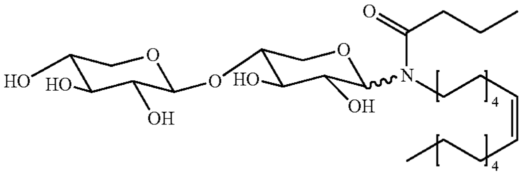 | LC-MS Method D. Rt = 0.87 min, [M + $NH_4$]$^+$ = 662.3 |

-continued

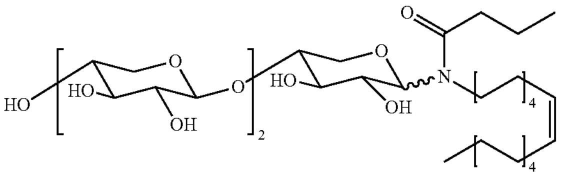

LC-MS Method D. Rt = 1.04 min, $[M + NH_4]^+$ = 794.0

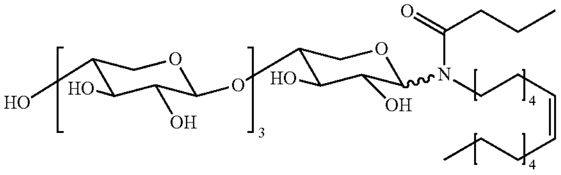

LC-MS Method D. Rt = 1.23 min, $[M + NH_4]^+$ = 926.2

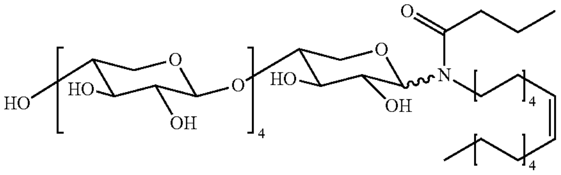

LC-MS Method D. Rt = 1.34 min, $[M + NH_4]^+$ = 1058.1 c) Example 39: Preparation of N-i-butanoyl N-substituted oligosylamines

The selected crude XOS-amine intermediate product (1 equiv.) as synthesized above were suspended in methanol (4 mL). i-Butyric anhydride (0.197 mL, 0.188 g, 1.19 mmol, 1.2 equiv.) was added dropwise and stirring was continued at room temperature for 16 h. The following components were detected in the product mixtures:

i) The selected oligosylamine intermediate was: N-dodecyl xylosylamine. The resulting detected product was N-(i-butanoyl)-N-dodecyl xylosylamine.

LC-MS Method A
Rt = 1.86 min, $[M + H]^+$ = 388.3 ii) The selected oligosylamine intermediate mixture was: N-oleyl oligosylamine. The resulting detected products were:

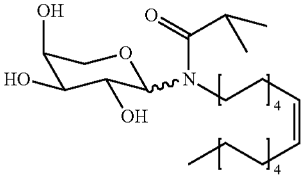

LC-MS Method D. Rt = 0.41 min, $[M + NH_4]^+$ = 530.0

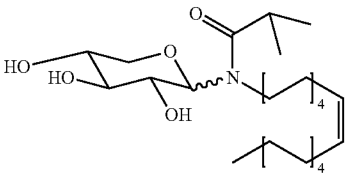

LC-MS Method D. Rt = 0.46 min, $[M + NH_4]^+$ = 530.1

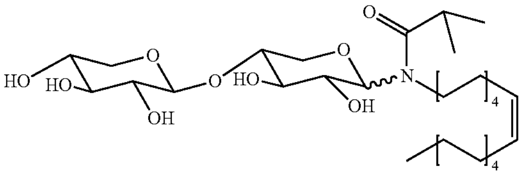

LC-MS Method D. Rt = 0.83 min, $[M + NH_4]^+$ = 662.3

-continued

| | |
|---|---|
| 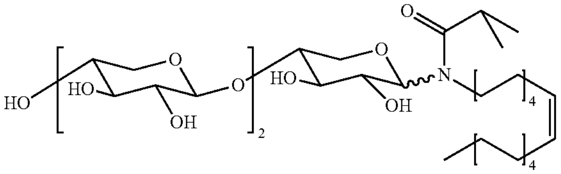 | LC-MS Method D. Rt = 0.97 min, $[M + NH_4]^+$ = 794.0 |
| 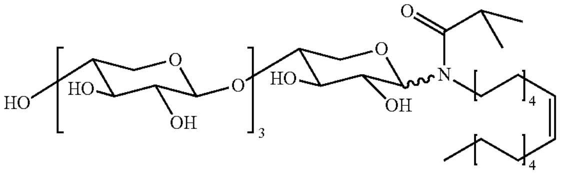 | LC-MS Method D. Rt = 1.14 min, $[M + NH_4]^+$ = 926.2 |
| 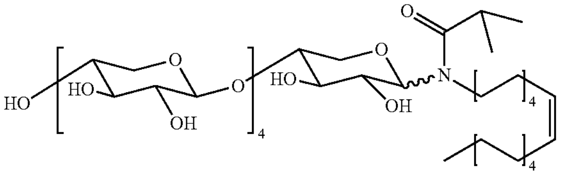 | LC-MS Method D. Rt = 1.28 min, $[M + NH_4]^+$ = 1058.1 |
| 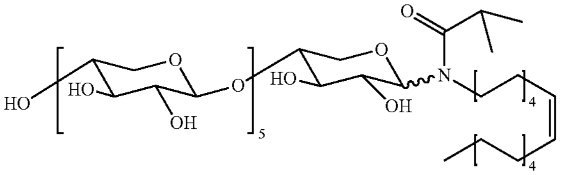 | LC-MS Method D. Rt = 1.51 min, $[M + NH_4]^+$ = 1190.2 |

It was somewhat unexpected that bulky oleyl oligosylamines were able to undergo reactions with butyric anhydride to form such congested amides about the nitrogen.

K. Preparation O-Alkyl-O-Oligosyl Acetals (Fisher Glycosides)

a) Example 40—O-Methyl-O-oligosyl acetals (fisher glycosides)

Xylo-oligosaccharides (250 mg) were suspended in methanol (1.5 mL) and p-toluenesulfonic acid (10 mg) was added. The mixture was stirred in a sealed vial under elevated pressure, maintained at 100° C. with microwave irradiation, for 5 min. Solids were removed by filtration. The filtrate was concentrated under reduced pressure to give a brown solid. The following compounds were detected by UPLC-MS:

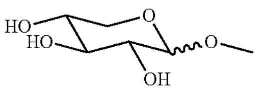

LC-MS Method D. Rt = 0.47 min, $[M - H]^-$ = 163.2

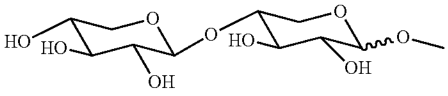

LC-MS Method D. Rt = 0.64 min, $[M - H]^-$ = 295.2.

-continued

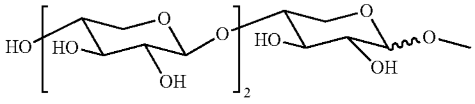

LC-MS Method D. Rt = 0.95 min, $[M - H]^-$ = 427.1

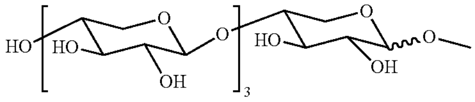

LC-MS Method D. Rt = 1.33 min, $[M - H]^-$ = 559.3.

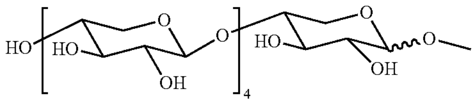

LC-MS Method D. Rt = 1.72 min, $[M - H]^-$ = 690.9.

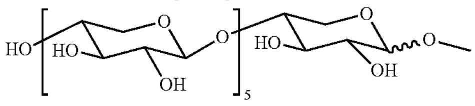

LC-MS Method D. Rt = 2.09 min, $[M - H]^-$ = 823.1 b) Example 41—O-butyl-O-oligosyl acetals (fisher glycosides)

Xylo-oligosaccharides (250 mg) were suspended in n-butanol (1.5 mL) and p-toluenesulfonic acid (10 mg) was added. The mixture was stirred in a sealed vial under elevated pressure, maintained at 100° C. with microwave irradiation, for 5 min. Solids were removed by filtration. The filtrate was concentrated under reduced pressure to give a brown solid. The following compounds were detected by UPLC-MS:

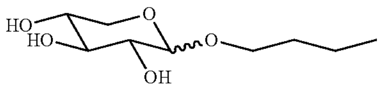

LC-MS Method G. Rt = 1.63 min,
[M - H]$^-$ = 205.5

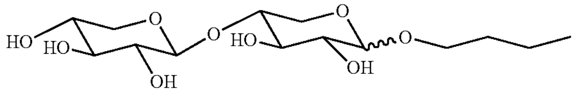

LC-MS Method G. Rt = 2.08 min,
[M - H]$^-$ = 337.4.

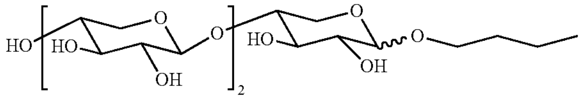

LC-MS Method G. Rt = 2.94 min,
[M - H]$^-$ = 469.3

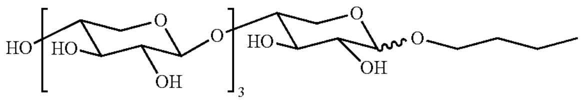

LC-MS Method G. Rt = 3.93 min,
[M - H]$^-$ = 601.0.

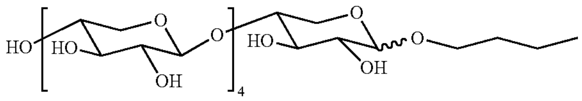

LC-MS Method G. Rt = 4.95 min,
[M - H]$^-$ = 733.1.

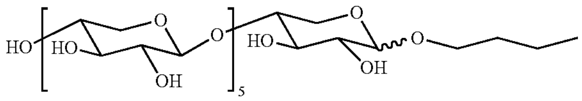

LC-MS Method G. Rt = 5.97 min,
[M - H]$^-$ = 865.8 c) Example 42—O-octyl-O-oligosyl acetals (fisher glycosides)

Xylo-oligosaccharides (250 mg) were suspended in n-octanol (1.5 mL) and p-toluenesulfonic acid (10 mg) was added. The mixture was stirred in a sealed vial under elevated pressure, maintained at 100° C. with microwave irradiation, for 5 min. Solids were removed by filtration. The filtrate was concentrated under reduced pressure to give a brown solid. The following compounds were detected, in small quantities, by UPLC-MS:

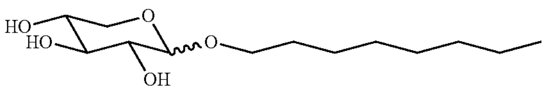

LC-MS Method D. Rt = 0.33 min,
[M - H]$^-$ = 261.3

-continued

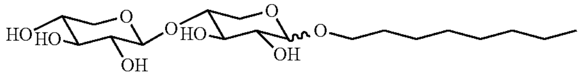

LC-MS Method D. Rt = 0.35 min,
[M - H]$^-$ = 393.6.

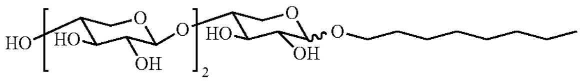

LC-MS Method D. Rt = 0.46 min,
[M - H]$^-$ = 525.1

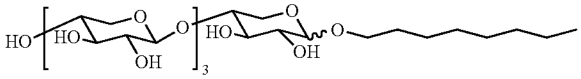

LC-MS Method D. Rt = 0.60 min,
[M - H]$^-$ = 656.7.

d) Example 43—O-nonyl-O-oligosyl acetals (fisher glycosides)

Xylose-oligosaccharides (250 mg) were suspended in n-nonanol (1.5 mL and p-toluenesulfonic acid (10 mg) was added. The mixture was stirred in a sealed vial under elevated pressure, maintained at 100° C. with microwave irradiation, for 5 min. Solids were removed by filtration. The filtrate was concentrated under reduced pressure to give a brown solid. The following compounds were detected, in small quantities, by UPLC-MS:

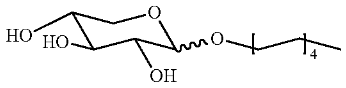

LC-MS Method D. Rt = 0.34 min,
[M - H]$^-$ = 275.2

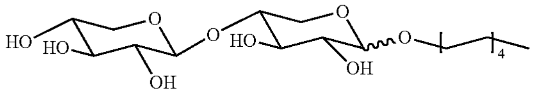

LC-MS Method D. Rt = 0.35 min,
[M - H]$^-$ = 407.1

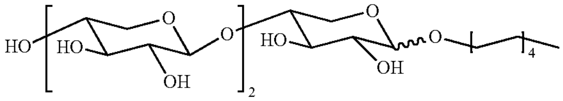

LC-MS Method D. Rt = 0.46 min,
[M - H]$^-$ = 539.4 e) Example 44—O-decyl-O-oligosyl acetals (fisher glycosides)

Xylose-oligosaccharides (250 mg) were suspended in n-decanol (1.5 mL and p-toluenesulfonic acid (10 mg) was added. The mixture was stirred in a sealed vial under elevated pressure, maintained at 100° C. with microwave irradiation, for 5 min. Solids were removed by filtration. The filtrate was concentrated under reduced pressure to give a brown solid. The following compounds were detected, in small quantities, by UPLC-MS:

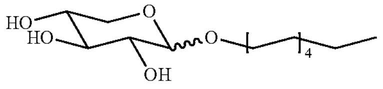

LC-MS Method D. Rt = 0.32 min,
[M - H]⁻ = 289.2.

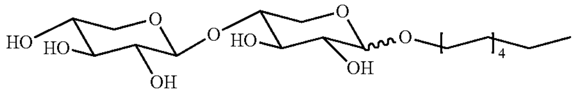

LC-MS Method D. Rt = 0.34 min,
[M - H]⁻ = 421.9.

f) Example 45—O-dodecyl-O-oligosyl acetals (fisher glycosides)

Step (i)

Xylose-oligosaccharides (250 mg) were suspended in pre-warmed (30° C.) n-dodecanol (1.5 mL) and p-toluenesulfonic acid (10 mg) was added. The mixture was stirred in a sealed vial under elevated pressure, maintained at 100° C. with microwave irradiation, for 5 min. Solids were removed by filtration. The filtrate was concentrated under reduced pressure to give a brown solid. The following compounds were detected, in small quantities, by UPLC-MS:

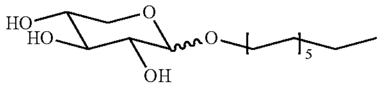

LC-MS Method D. Rt = 0.32 min,
[M - H]⁻ = 317.3

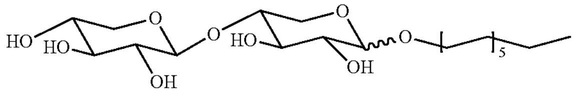

LC-MS Method D. Rt = 0.34 min,
[M - H]⁻ = 449.2.

It was surprising to be able to detect compounds of DP2 or even higher, given the known acid-instability of these compounds.

L. Preparation of Fisher Glycosides by Trans-Esterification a) Example 46—O-octyl-O-oligosyl acetals (fisher glycosides)

Example 41 composition (300 mg) was suspended in n-octanol (1.5 mL) and p-toluenesulfonic acid (10 mg) was added. The mixture was stirred in a sealed vial under elevated pressure, maintained at 100° C. with microwave irradiation, for 5 min. Solids were removed by filtration. The filtrate was concentrated under reduced pressure to give a brown solid. The following compounds were detected, in small quantities, by UPLC-MS:

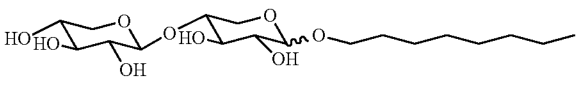

LC-MS Method D. Rt = 0.35 min,
$[M + Na]^+$ = 417.3

-continued

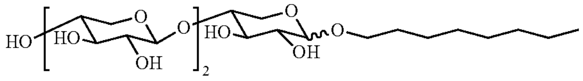

LC-MS Method D. Rt = 0.46 min,
$[M + Na]^+$ = 549.5

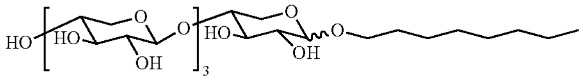

LC-MS Method D. Rt = 0.60 min,
$[M + Na]^+$ = 681.5

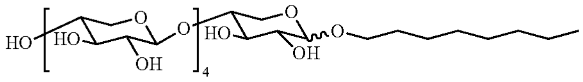

LC-MS Method D. Rt = 0.76 min,
$[M + Na]^+$ = 813.5 b) Example 47—O-nonyl-O-oligosyl acetals (fisher glycosides)

Example 41 composition (300 mg) was suspended in n-nonanol (1.5 mL) and p-toluenesulfonic acid (10 mg) was added. The mixture was stirred in a sealed vial under elevated pressure, maintained at 100° C. with microwave irradiation, for 5 min. Solids were removed by filtration. The filtrate was concentrated under reduced pressure to give a brown solid. The following compounds were detected, in small quantities, by UPLC-MS:

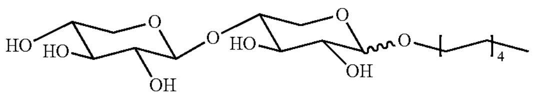

LC-MS Method H.
$[M + Na]^+$ = 431.4.

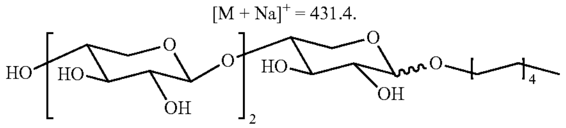

LC-MS Method H.
$[M + Na]^+$ = 563.5.

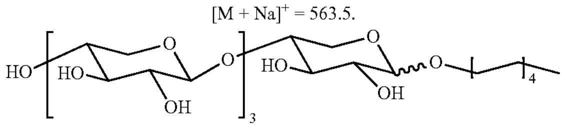

LC-MS Method H.
$[M + Na]^+$ = 695.5.

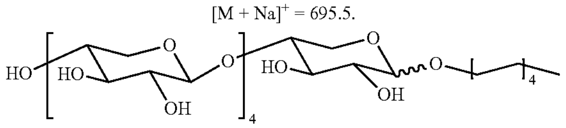

LC-MS Method H.
$[M + Na]^+$ = 827.7 c) Example 48—O-decyl-O-oligosyl acetals (fisher glycosides)

Example 41 composition (300 mg) was suspended in n-decanol (1.5 mL) and p-toluenesulfonic acid (10 mg) was added. The mixture was stirred in a sealed vial under elevated pressure, maintained at 100° C. with microwave irradiation, for 5 min. Solids were removed by filtration. The filtrate was concentrated under reduced pressure to give a brown solid. The following compounds were detected, in small quantities, by UPLC-MS:

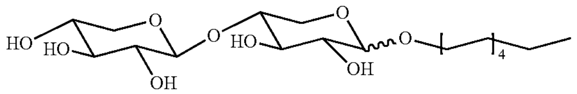

LC-MS Method H.
$[M+Na]^+=445.4$.

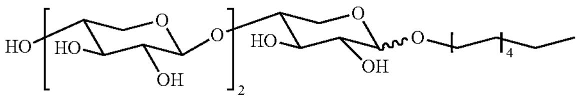

LC-MS Method H.
$[M+Na]^+=577.6$

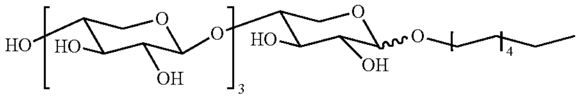

LC-MS Method H.
$[M+Na]^+=709.6$.

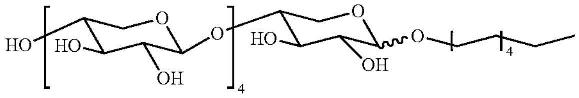

LC-MS Method H.
$[M+Na]^+=841.7$ d) Example 49—O-dodecyl-O-oligosyl acetals (fisher glycosides)

Example 41 composition (300 mg) was suspended in pre-warmed (30° C.) n-dodecanol (1.5 mL) and p-toluenesulfonic acid (10 mg) was added. The mixture was stirred in a sealed vial under elevated pressure, maintained at 100° C. with microwave irradiation, for 5 min. Solids were removed by filtration. The filtrate was concentrated under reduced pressure to give a brown solid. The following compounds were detected, in small quantities, by UPLC-MS:

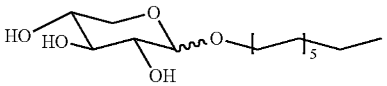

LC-MS Method H.
$[M+Na]^+=341.3$.

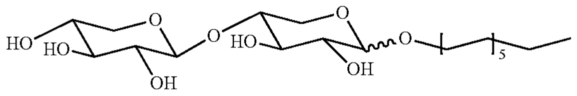

LC-MS Method H.
$[M+Na]^+=473.6$.

The use of the trans-esterification method of section L. allowed products with a higher DP in the sugar component to be detected on some occasions than the direct method of section K.

M. Preparation of Cleaning Products from the New Surface-Active Inventions a) Example 50—Water-based surface cleaner An aqueous surface cleaner was prepared by combining the ingredients, with hand-mixing, in the following order: water (98 wt %), Example 5 composition (N-dodecyl-N-acetylxylo-oligosylamine) (1 wt %), sodium hydrogen carbonate (0.5 wt %), sodium gluconate (0.5 wt %) to give a pale-orange solution. The solution foamed vigorously upon agitation.

b) Example 51—Alternative Surface Cleaner

Another aqueous surface cleaner was prepared by combining the ingredients, with hand-mixing, in the following order: water (98 wt %), (Example 34 composition (N-dodecyl, N-acetyl oligosylamine) (1 wt %), sodium hydrogen carbonate (0.5 wt %), sodium gluconate (0.5 wt %) to give a pale-yellow solution.

Figure 23A:
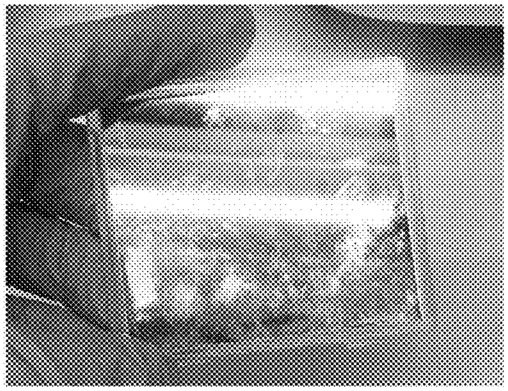
FIGS. 23A-23F depict three different stained objects, before.
Figure 23D:
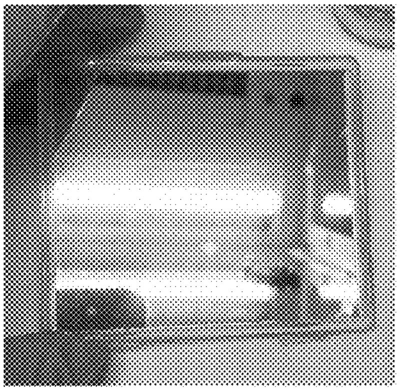

The solution foamed vigorously upon agitation and can be used to remove fingerprint stains from a glass mirror, as illustrated in FIG. 23A and FIG. 23D.

c) Example 52—Alternative Surface Cleaner

Another aqueous surface cleaner was prepared by combining the ingredients, with hand-mixing, in the following order: water (98.5 wt %), (Example 34 composition (N-dodecyl, N-acetyl oligosylamine) (0.5 wt %), sodium hydrogen carbonate (0.5 wt %), sodium gluconate (0.5 wt %) to give a pale-yellow solution. The solution foamed vigorously upon agitation and can be used to remove fingerprint stains from a glass mirror.

d) Example 53—a Gel-Based Cream Cleaner

A gel-based cleaning substance prepared by combining the ingredients in the following order: water 96.5 wt %, glycerine 2 wt %, xanthan gum 0.5 wt %, guar gum 0.5 wt %, preservative eco 0.5 wt % to make a gel base. To this gel base was added one part (by mass) of 52 wt % aqueous solution of Example 5 composition (N-dodecyl-N-acetylxylo-oligosylamine), for every nine parts of gel base. The resulting mixture was stirred under vigorous magnetic stirring until forming a beige-brown gel phase.

N. Preparation of Guar Gum Gel-Based Products from the New Surface-Active Ingredients A gel base was prepared by mixing guar gum (1 wt %) in water.

a) Example 54—Gel Product Using Guar Gum Base and Example 34 Composition

The gel base (90 wt %) was mixed with pre-dissolved Example 34 composition (N-dodecyl, N-acetyl oligosylamine, 2.5 wt %) in water (7.5 wt %) to form a yellow gel that was stable for at least 1 week.

b) Example 55—Gel Product Using Guar Gum Base and Larger Amount of Example 5 Composition The gel base (90 wt %) was mixed with pre-dissolved Example 5 composition (N-dodecyl-N-acetylxylo-oligosylamine, 5.2 wt %) and water (4.8 wt %) to form a brown gel that was stable for at least 1 week.

c) Example 56—Gel Product Using Guar Gum Base and Lesser Amount of Example 5 Composition The gel base (90 wt %) was mixed with Example 5 composition (N-dodecyl, N-acetylxylo-oligosylamine, 2.5 wt %) in water (7.5 wt %) to form a cream gel that was stable for at least 1 week.

O. Preparation of Xanthan Gum Gel-Based Products from the New Surface-Active Ingredients Xanthan gum-based gels: A gel base was prepared by mixing xanthan gum (1 wt %) in water.

a) Example 57—Gel Product Using Xanthan Gum Base and Example 34 Composition

Figure 27A:
FIGS. 27A-27C illustrate photographs of some selected formulated example products containing inventive surface-active compositions.

The gel base (90 wt %) was mixed with pre-dissolved Example 34 composition (N-dodecyl, N-acetyl oligosylamine, 2.5 wt %) in water (7.5 wt %) to form an off-white gel that was stable for at least 1 week. A photograph of this product is depicted in FIG. 27A.

b) Example 58—Attempt at Preparing a Gel Product Using Xanthan Gum Base and Larger Amount of Example 5 Composition The gel base (90 wt %) was mixed with pre-mixed Example 5 composition (N-dodecyl-N-acetylxylo-oligosylamine, 5.2 wt %) and water (4.8 wt %). The mixture failed to form a stable gel.

c) Example 59—Gel Product Using Xanthan Gum Base and Lesser Amount of Example 5 Composition The gel base (90 wt %) was mixed with Example 5 composition (N-dodecyl-N-acetylxylo-oligosylamine, 2.5 wt %) in water (7.5 wt %) to form a cream gel that was stable for at least 1 week.

P. Preparation of Carbomer Gum Gel-Based Products from the New Surface-Active Ingredients Carbomer gum-based gels: A gel base was prepared by mixing carbomer gum (1 wt %) in water.

a) Example 60—Gel Product Using Carbomer Base and Example 34 Composition

The gel base (90 wt %) was mixed with pre-dissolved Example 34 composition (N-dodecyl, N-acetyl oligosylamine, 2.5 wt %) in water (7.5 wt %) to form an off-white gel that was stable for at least 1 week.

b) Example 61—Attempted Preparation of a Gel Product Using Carbomer Base and Larger Amount of Example 5 Composition The gel base (90 wt %) was mixed with pre-dissolved Example 5 composition (N-dodecyl-N-acetylxylo-oligosylamine, 5.2 wt %) and water (4.8 wt %). The mixture failed to form a stable gel.

c) Example 62—Gel Product Using Carbomer Base and Lesser Amount of Example 5 Composition The gel base (90 wt %) was mixed with Example 5 composition (N-dodecyl-N-acetylxylo-oligosylamine, 2.5 wt %) in water (7.5 wt %) to form a cream gel that was stable for at least 1 week.

Figure 27B:
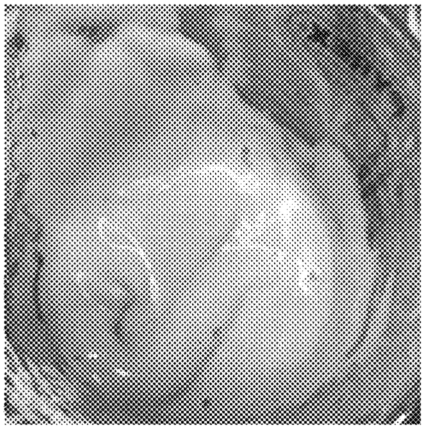

Q. Preparation of Water-In-Oil Emulsions from the New Surface-Active Ingredients a) Example 63—Water-in-oil emulsion using Example 5 composition A viscous, water-in-oil emulsion using an inventive surface-active composition as the emulsifier was prepared by combining water (27 wt %) with sunflower oil (70 wt %), and Example 5 composition (N-dodecyl-N-acetylxylo-oligosylamine, 3 wt %) to form a cream gel. A photograph of this gel product is depicted in FIG. 27B.

b) Example 64—Alternative Water-In-Oil Emulsion Using Example 34 Composition

Figure 27C:
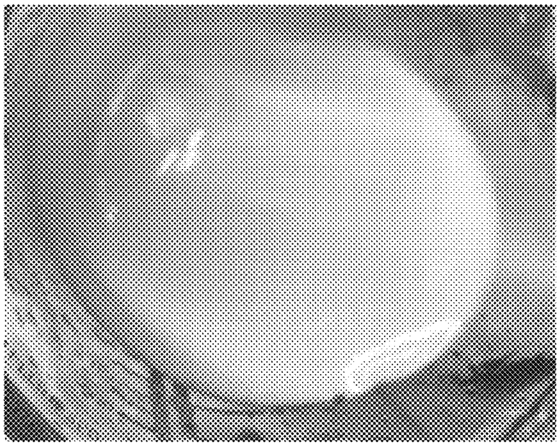

A viscous, water-in-oil emulsion using an inventive surface-active composition as the emulsifier was prepared by combining water (27 wt %) with sunflower oil (70 wt %), and Example 34 composition (N-dodecyl, N-acetyl oligosylamine, 3 wt %) to form a white gel. A photograph of this gel product is depicted in FIG. 27C.

Figure 14:
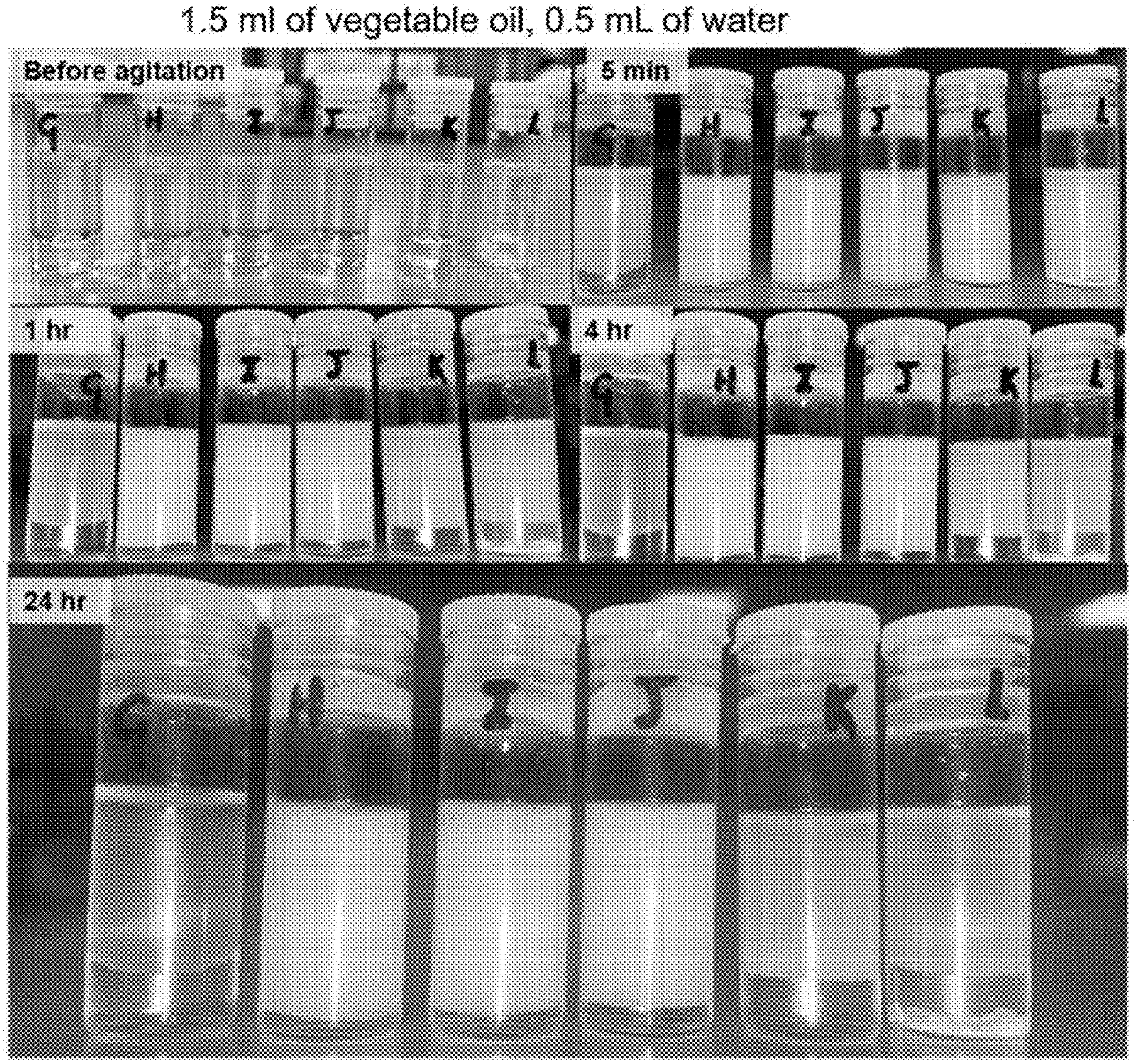
FIG. 14 illustrates water in oil emulsions for the xylose and xylo-oligosaccharide based surface-active agent compositions (H—K) compared with no added agent (G) and dodecyl glucoside (L) (0.5 wt %) at five minutes, one hour, four hours and twenty-four hours after shaking. G=No surface-active composition; H=Example 4 composition; I=Example 5 composition; J=Example 6 composition; K=Example 7 composition; L=Dodecyl Glucoside.
Figure 15:
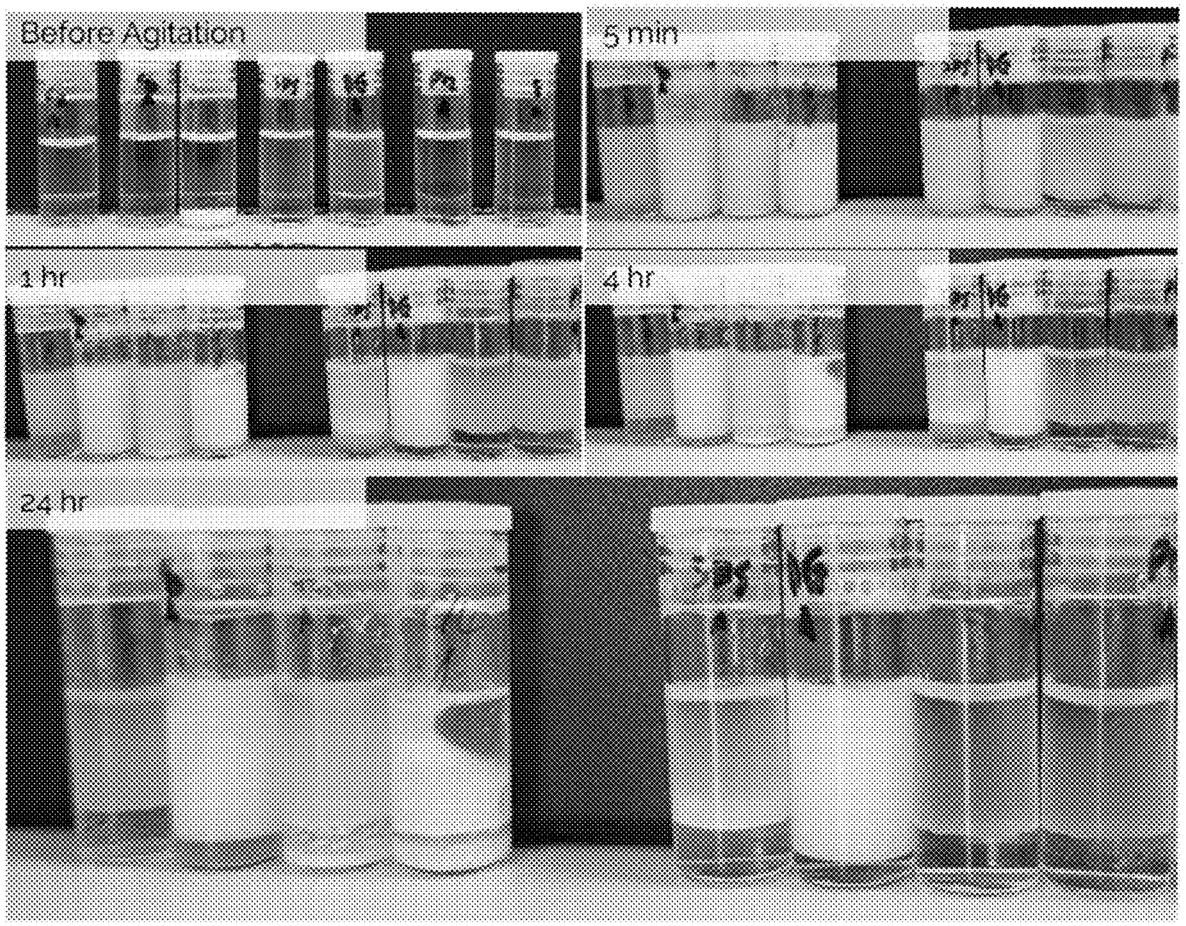
FIG. 15 in a similar manner to FIG. 14, illustrates water in oil emulsions for additional xylose and xylo-oligosaccharide based surface-active agent compositions (A-G) compared with no added agent (A) and dodecyl glucoside (L) (0.5 wt %) at five minutes, one hour, four hours and twenty-four hours after shaking. Left to right (in each image): Example 14 composition; Example 11 composition; Example 13 composition; Example 12 composition; Sodium dodecyl sulfate, dodecyl glucoside, xylose; No surface-active composition.

R. Application Tests of the Described Inventive Surface-Active Compositions a) Example 65—Emulsion Stability Application Testing Step (i) Water in Oil Emulsions 0.5 mL deionized water containing 2 wt % of the stated inventive or comparative compound was added to 1.5 mL commercial, food-grade sunflower oil, in a sample vial. The vials were each agitated with a IKA Vortex mixture for 30 seconds. The vials were left to stand and inspected visually for emulsion quality after 5 minutes, 1 hour, 4 hours and finally 24 h (FIG. 14 and FIG. 15). These test results show that the ability of the new inventions as emulsifiers is competitive with or even superior to commercial alternatives. The results also show an unexpected increase in emulsifying performance for the inventive compositions comprising oligosaccharide mixture-derived surface-active agents (such as example 4-6 compositions) compared with those derived from a single monomeric sugar (xylose) alone (such as example 12 and 13 compositions). In particular, Example 6 composition was surprisingly found to form an exceptionally stable water-in-oil emulsion that had not separated after 5 months. The results are shown in table 1.

TABLE 1

| results of the water-in-oil emulsion tests of Example 65. | | |
|---|---|---|
| Substance | Inventive or Comparative | Time inspected by which the emulsion first appeared dispersed |
| Water (no additional substance) | Comparative | <5 min |
| Example 4 composition. (N-decyl-N-acetylxylo-oligosylamine) | Inventive | >24 h |
| Example 5 composition. (N-dodecyl-N-acetylxylo-oligosylamine) | Inventive | >24 h |
| Example 6 composition. N-tetradecyl-N-acetylxylo-oligosylamine | Inventive | >5 months |
| Example 7 composition. N-hexadecyl-N-acetylxylo-oligosylamine | Inventive | 12 h |
| Dodecyl Glucoside | Comparative | 12 h |
| Sodium dodecyl sulfate | Comparative | 1 h |
| Example 14 composition (N-octyl-N-acetylxylosylamine) | Inventive | 5 min |
| Example 11 composition (N-decyl-N-acetylxylosylamine) | Inventive | 24 h |
| Example 13 composition (N-dodecyl-N-acetylxylosylamine) | Inventive | 1 h |
| Example 12 composition (N-tetradecyl-N-acetylxylosylamine) | Inventive | 1 h |
| Decyl glycoside | Comparative | 24 h |
| Xylose | Comparative | <5 min |

b) Example 66—Attempts at Emulsion Formation with Different Oil-Water Ratios Using Various Inventive Example Surface-Active Compositions The ability of inventive surface-active compositions to stabilize emulsions in different mass-ratios of vegetable oil and water was investigated. Mixtures of water, vegetable oil and inventive surface-active composition were prepared as per table below, by adding groundnut oil, water, and surface-active composition in the desired mass ratio. The mixtures were heated at 60 C in a homogenizer (stirring for 10 minutes at 800 rpm, then further homogenized at this speed and ambient temperature for 5 min). The visual appearance of each mixture was acknowledged. The mixtures were then treated by centrifugation at 1500 rpm for 5 mi and the visual appearance was again acknowledged. The results show that the inventive surface-active compositions tested are good water-in-oil emulsifiers and surprisingly that the example 34 composition, which consists of mixed mono and oligosaccharides, could form more stable emulsions than other formulations. The results are shown in table 2.

TABLE 2

Figure 21A:
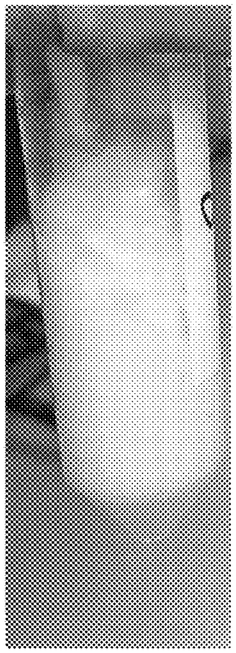
FIGS. 21A-21D depict photographs of some specified emulsification tests of Example 34 composition (N-dodecyl, N-acetyl oligosylamine (1.5 wt %).
Figure 21B:
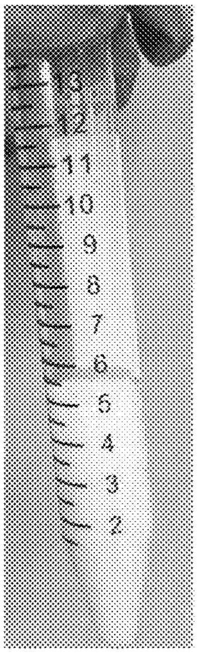
Figure 21C:
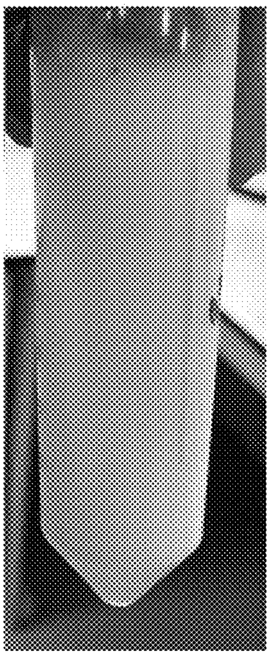
Figure 21D:
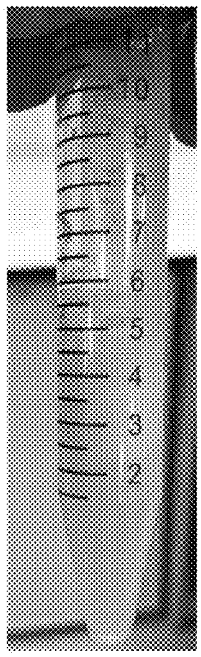
Figure 26:
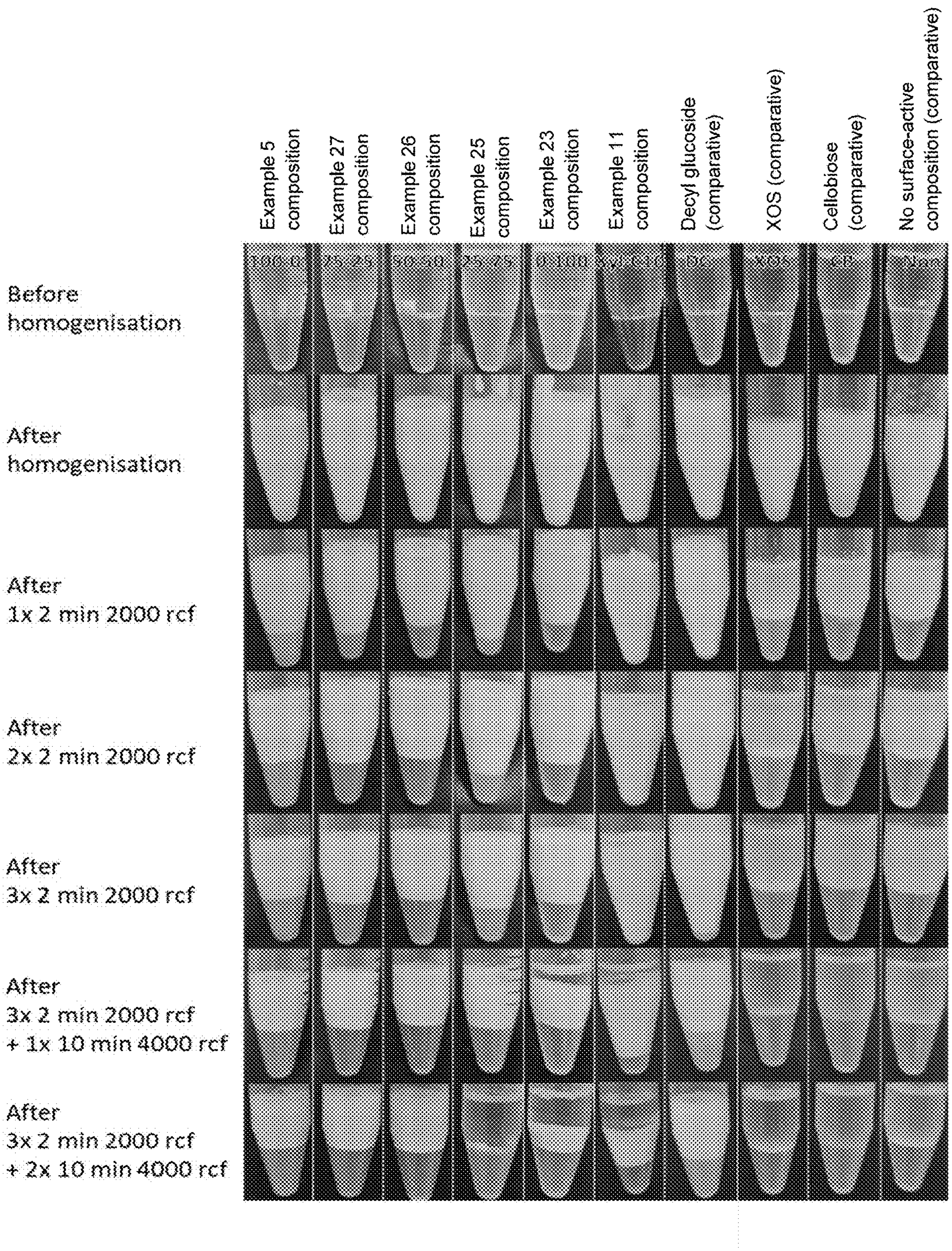
FIG. 26 depicts water-in-oil emulsions formed from surface-active compositions before performing homogenisation and at various timescales thereafter.

| Emulsification tests of different inventive surface-active compositions of Example 66 | | |
|---|---|---|
| Surface-Active Composition | Water-oil ratio | Visual interpretation of results. |
| Example 5 composition (N-dodecyl-N-acetylxylo-oligosylamine (3.0 wt %) | 1:4 | Emulsion failed to form. Complete phase-separation following centrifugation |
| Example 34 composition (N-dodecyl, N-acetyl oligosylamine (1.5 wt %) | 1:4 | Stable emulsion observed, as depicted in FIG. 21A, including after centrifugation as depicted in FIG. 21B. |
| Example 5 composition (N-dodecyl-N-acetylxylo-oligosylamine (3.0 wt %) | 4:1 | Partly emulsified, small amount emulsified after centrifuge |
| Example 34 composition (N-dodecyl, N-acetyl oligosylamine (1.5 wt %) | 4:1 | Emulsion failed to form, as depicted in FIG. 21C. Complete phase-separation following centrifugation, as depicted in FIG. 21D. |
| Example 5 composition (N-dodecyl-N-acetylxylo-oligosylamine (3.0 wt %) | 1:1 | Emulsion formed initially, though separated following centrifugation |
| Example 34 composition (N-dodecyl, N-acetyl oligosylamine (3.0 wt %) | 1:1 | Emulsion formed initially, though separated following centrifugation |
| Example 5 composition (N-dodecyl-N-acetylxylo-oligosylamine (3.0 wt %) | 1:2 | Emulsion formed initially, though separated following centrifugation |
| Example 5 composition (N-dodecyl-N-acetylxylo-oligosylamine (3.0 wt %) | 2:1 | Emulsion formed initially, though separated following centrifugation |
| Example 5 composition (N-dodecyl-N-acetylxylo-oligosylamine (3.0 wt %) | 1:2.5 | Stable emulsion observed, including after centrifugation |
| Example 11 composition (N-decyl N-acetyl xylosylamine, 3.0 wt %) | 1:2.5 | Emulsion failed to form. Complete phase-separation following centrifugation |

c) Example 67—Stability of Emulsions Formed by Homogenizer Treatment 60 mg of either inventive example surface-active composition, or comparative example substance was dissolved in deionized water (0.75 mL) and sunflower oil (2.25 mL) was added. The resulting mixture was treated with a mechanical homogenizer for 5 min. The visual appearances of the treated mixtures were interpreted by inspection. The mixtures were then treated by centrifugation at 2000 rpm for 2 min. The visual appearances were again interpreted by inspection and compared to the previous appearances before centrifugation. If the mixture had formed a distinct aqueous phase, the volume of the emulsified oil phase was measured. The mixtures were then further treated by centrifugation at 2000 rpm for 2 min. The visual appearances were again interpreted by inspection and compared to the previous appearances. The mixtures were then further treated by centrifugation at 2000 rpm for 2 min. The visual appearances were again interpreted by inspection and compared to the previous appearances before centrifugation. All results were photographed and are shown in FIG. 26. The interpretation of the results is that all inventive surface-active compositions were effective water-in-oil emulsifiers. Some variation was observed: generally, the surface-active compositions generated from feedstocks high in monosaccharide or cellobiose content, appeared less stable and broke more easily than those generated from feedstocks high in xylo-oligosaccharides, though this is based on inspection.

d) Example 68—Zein Solubilization Test

Figure 18:
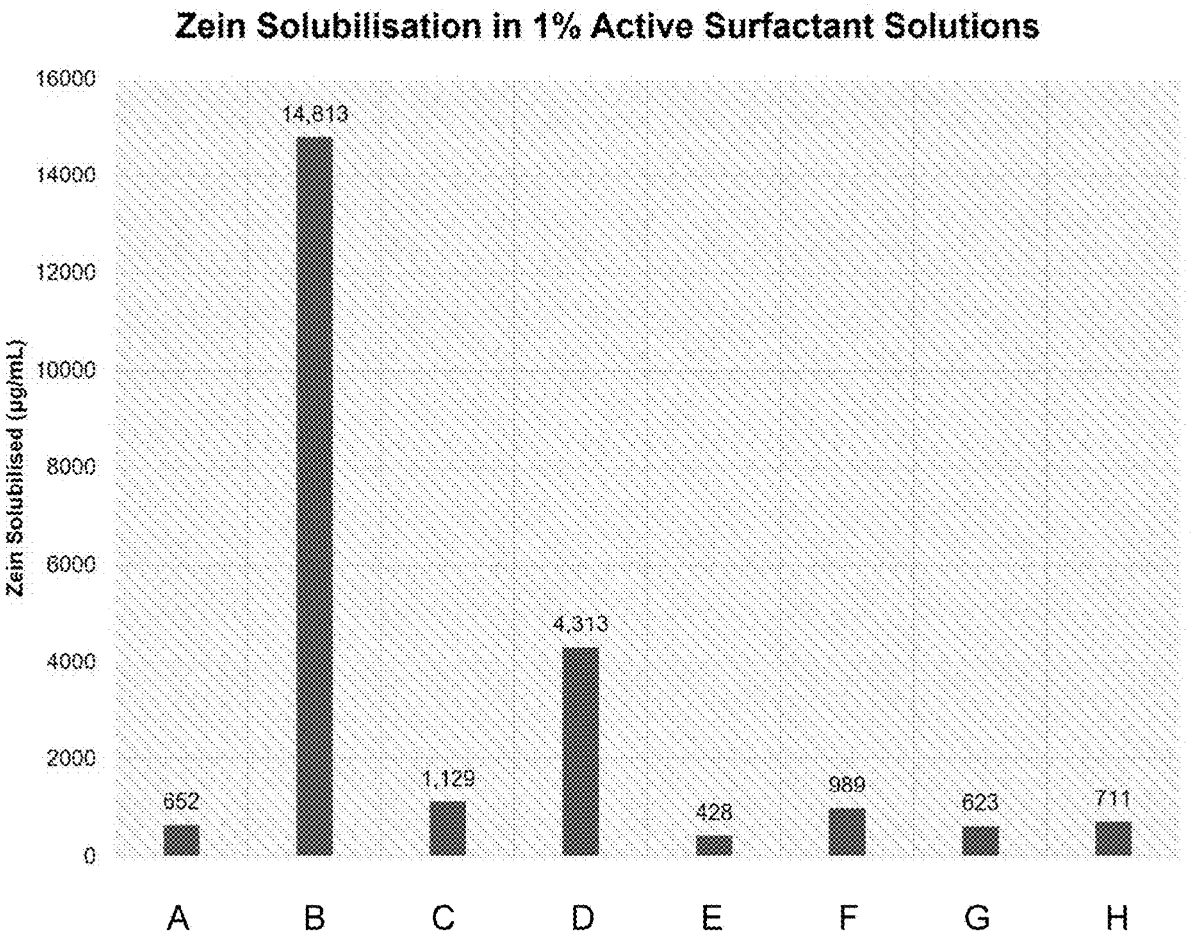
FIG. 18 illustrates the results of the amount of zein proteins solubilized by different inventive and comparative surface-active compositions. A=No surface-active composition; B=Sodium dodecyl sulfate; C=Decyl glucoside; D=Cocamidopropyl betaine; E=Example 10 composition; F=Example 11 composition; G=Example 12 composition; H=Example 17 composition.

Zein is a water-insoluble corn protein, structurally similar to keratin. The ability of a surfactant to solubilize zein is related to irritation potential. The more zein solubilized, the more irritating the product is deemed to be, according to this test. Zein (25 mg) was added to 1 wt % active surfactant solution (1 mL) and mixed under centrifugation at 30 rpm for 30 min. The solutions were centrifuged, and the protein concentration in the supernatant determined by BCA assay. Each surfactant was tested in triplicate. Protein content was determined from a bovine serum albumin (BSA) standard curve. The test results (FIG. 18 and Table 3) show the new inventions are poor solubilizers for zein and hence can be described as less irritating, when compared to existing Comparative surfactants.

TABLE 3

Results of the zein solubilization test of Example 68 for comparative and inventive compositions.

| Surface-Active Component | Inventive or Comparative | Resulting zein concentration solubilized (μg/mL) |
|---|---|---|
| Water (no surface-active component) | Comparative | 652 |
| Sodium dodecyl sulfate | Comparative | 14813 |
| Decyl glucoside | Comparative | 1129 |
| Cocoamidopropyl betaine | Comparative | 4313 |
| Example 14 compositionl (N-octyl-N-acetylxylosylamine) | Inventive | 428 |
| Example 11 composition (N-decyl-N-acetylxylosylamine) | Inventive | 989 |
| Example 13 composition (N-dodecyl-N-acetylxylosylamine) | Inventive | 623 |
| Example 17 composition (N-tetradecyl-N-acetyl oligosylamine from XOS/CB = 3:1 feedstock) | Inventive | 711 |

f) Example 69—Dynamic Foam Tests

Figure 12A:
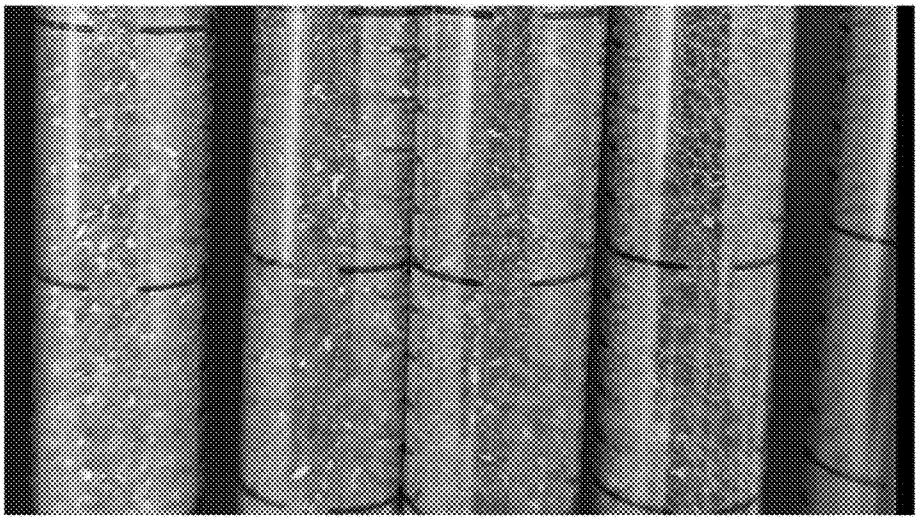
FIG. 12A shows an image of foam generated from a selection of surface-active compositions in aqueous solution.
Figure 12B:
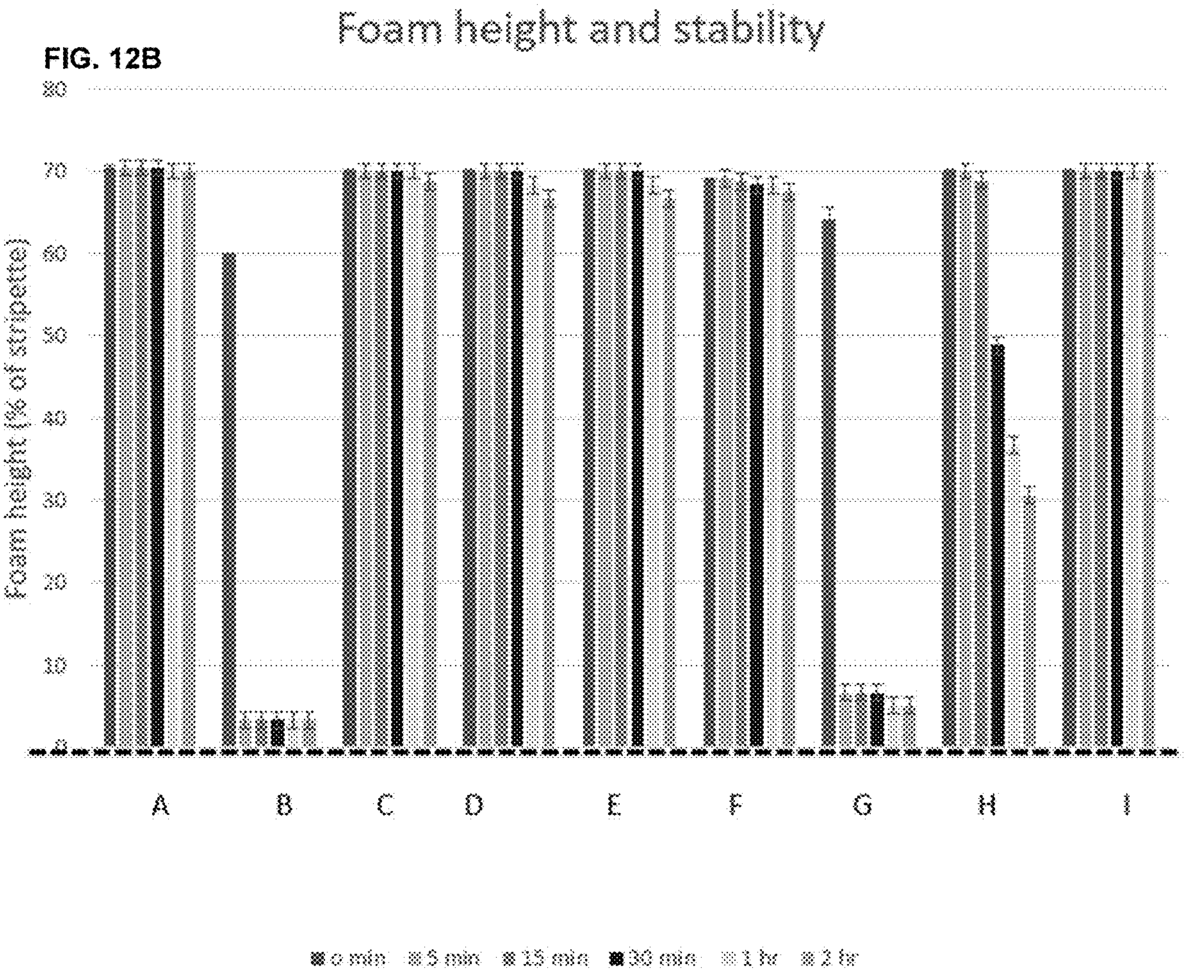
FIG. 12B illustrates foaming application test results for some selected surface-active compositions A=Dodecyl Glucoside; B=Example 11 composition; C=Example 5 composition; D=Example 27 composition; E=Example 26 composition; F=Example 25 composition; G=Example 23 composition; H=Example 34 composition; I=Example 10 composition.

The intensity and approximate decay-rate for the foaming behavior of the surface-active compositions in dilute aqueous solution was determined by dosing 5 mL of 0.5 wt % aqueous solution of surface-active composition to a vertically-aligned 50 m plastic serological pipette ("Stripette"). Air (40 $cm^3$) was bubbled through the surface-active composition solution at a rate of 17 $cm^3$/min via a syringe pump and the foam height upon complete addition of air recorded. The foam height was also recorded again 5 min after complete addition of air, 10 min after complete addition of air, 15 m after complete addition of air, 30 min after complete addition of air, 1 hour after complete addition of air and finally 2 hours after complete addition of air. Graphical results and images of the different foams generated are shown in FIG. 12 and table 4.

TABLE 4 the results for the dynamic foam tests of Example 70

| | | Volume of foam after given time ($cm^3$) | | | | | |
|---|---|---|---|---|---|---|---|
| Surface-active composition | Inventive or Comparative | 0 min | 5 min | 15 min | 30 min | 1 h | 2 h |
| Dodecyl Glucoside | Comparative | 42.3 | 42.3 | 42.3 | 42.3 | 42.0 | 42.0 |
| Example 11 composition (N-decyl-N-acetylxylosylamine) | Inventive | 36.0 | 2.0 | 2.0 | 2.0 | 2.0 | 2.0 |
| Example 5 composition (N-dodecyl-N-acetylxylo-oligosylamine) | Inventive | 42.0 | 42.0 | 42.0 | 42.0 | 42.0 | 41.3 |
| Example 27 composition (N-dodecyl-N-acetyloligosylamine 75:25 (XOS:CB)-C12) | Inventive | 42.0 | 42.0 | 42.0 | 42.0 | 41.0 | 40.0 |
| Example 26 composition (N-dodecyl-N-acetyloligosylamine 50:50 (XOS:CB)-C12) | Inventive | 42.0 | 42.0 | 42.0 | 42.0 | 41.0 | 40.0 |
| Example 25 composition (N-dodecyl-N-acetyloligosylamine 25:75 (XOS:CB)-C12) | Inventive | 41.5 | 41.5 | 41.3 | 41.0 | 41.0 | 40.5 |
| Example 23 composition (N-dodecyl-N-acetylcellobiosylamine) | Inventive | 38.5 | 4.0 | 4.0 | 4.0 | 3.0 | 3.0 |
| Example 34 composition (N-dodecyl, N-acetyl oligosylamine from Mixed mono & oligosaccharides) | Inventive | 42.0 | 42.0 | 41.3 | 29.3 | 22.0 | 18.3 |
| Example 10 composition (N-oleyl-N-acetyl xylo-oligosylamine and N-linoley1-N-acetyl xylo-oligosylamine) | Inventive | 42.0 | 42.0 | 42.0 | 42.0 | 42.0 | 42.0 |

Figure 11:
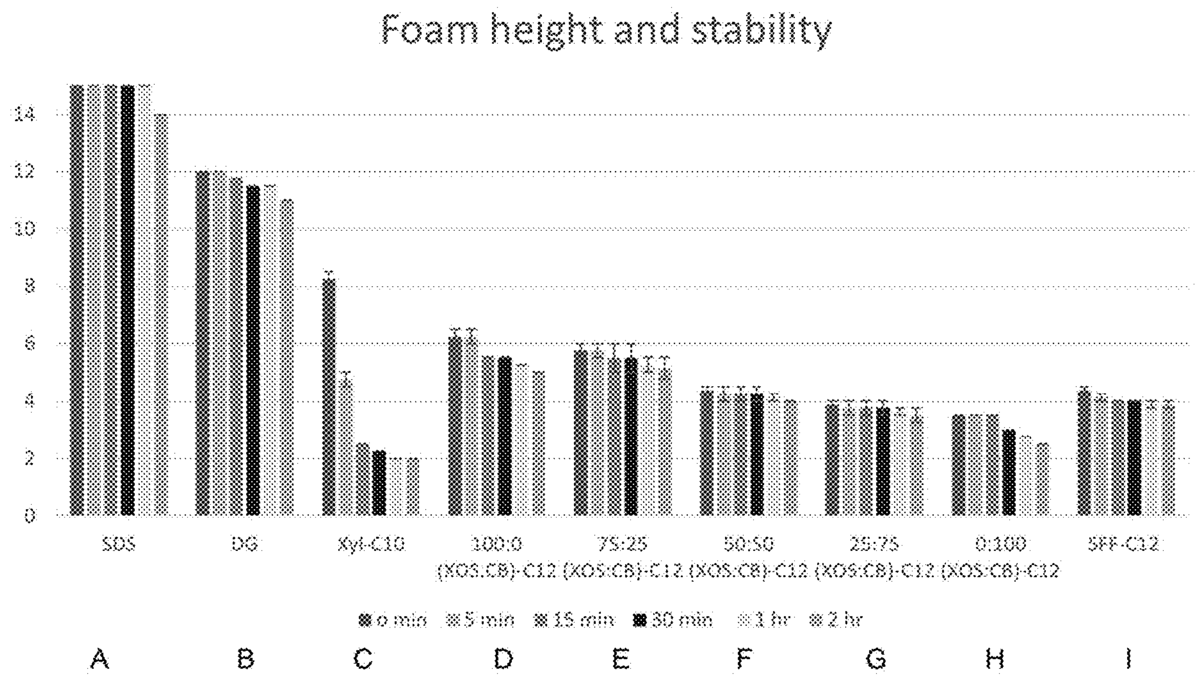
FIG. 11 illustrates results of foaming tests (foam height and stability) conducted for a selection of inventive and comparative surface-active compositions in aqueous solution (0.5 wt %) at time zero minute, five minutes, thirty minutes, 1 h and 2 h A=Sodium dodecyl sulfate; B=dodecyl glucoside; C=Example 11 composition; D=Example 5 composition; E=Example 27 composition; F=Example 26 composition; G=Example 25 composition; H=Example 23 composition; I=Example 34 composition.

When the surface-active composition was generated from a feedstock that included monosaccharides, disaccharides and oligosaccharides, the solutions form very stable foams, compared to when the surface-active composition was generated from a feedstock that included only monosaccharides or disaccharides. The results also show that surface-active compositions of oligosaccharides excluding monosaccharides could form more stable foams than mixtures of oligosaccharides that included monosaccharides, however this is apparent only after between 15-30 minutes and few applications would require a surface-active composition to remain foaming for such a length of time.

g) Example 70—Flash Foam Generation Test 20 mg of each surface-active composition for testing was dissolved in deionized water (4 mL) to give a 10 wt % solution, 2 mL was added to a 15 mL FALCON tube. Each falcon tube was secured in a holder before being vigorously shook for 30 seconds. The initial foam height and structure was noted. The foam height was then noted at 5 min, 10 min, 15 min, 30 min, 45 min, 1 hr and 2 hr after the initial measurement. The experiment was repeated in duplicate. Averaged results are depicted in table 5 and FIG. 11.

TABLE 5 flash foam tests of Example 70

| | | Volume of foam after given time ($cm^3$) | | | | | |
|---|---|---|---|---|---|---|---|
| Surface-active composition | Inventive or Comparative | 0 min | 5 min | 15 min | 30 min | 1 h | 2 h |
| Sodium dodecyl sulfate | Comparative | 15.0 | 15.0 | 15.0 | 15.0 | 15.0 | 14.0 |
| Decyl Glucoside | Comparative | 12.0 | 12.0 | 11.8 | 11.5 | 11.5 | 11.0 |
| Example 11 composition (N-decyl-N-acetylxylosylamine) | Inventive | 8.3 | 4.8 | 2.5 | 2.3 | 2.0 | 2.0 |
| Example 5 composition (N-dodecyl-N-acetylxylo-oligosylamine) | Inventive | 6.3 | 6.3 | 5.5 | 5.5 | 5.3 | 5.0 |
| Example 27 composition (N-dodecyl-N-acetyloligosylamine 75:25 (XOS:CB)-C12) | Inventive | 5.8 | 5.8 | 5.5 | 5.5 | 5.3 | 5.1 |
| Example 26 composition (N-dodecyl-N-acetyloligosylamine 50:50 (XOS:CB)-C12) | Inventive | 4.4 | 4.3 | 4.3 | 4.3 | 4.1 | 4.0 |
| Example 25 composition (N-dodecyl-N-acetyloligosylamine 25:75 (XOS:CB)-C12) | Inventive | 3.9 | 3.8 | 3.8 | 3.8 | 3.6 | 3.5 |
| Example 23 composition (N-dodecyl-N-acetylcellobiosylamine) | Inventive | 3.5 | 3.5 | 3.5 | 3.0 | 2.8 | 2.5 |
| Example 34 composition (N-dodecyl, N-acetyl oligosylamine from Mixed mono & oligosaccharides) | Inventive | 4.4 | 4.1 | 4.0 | 4.0 | 3.9 | 3.9 |

Figure 9:
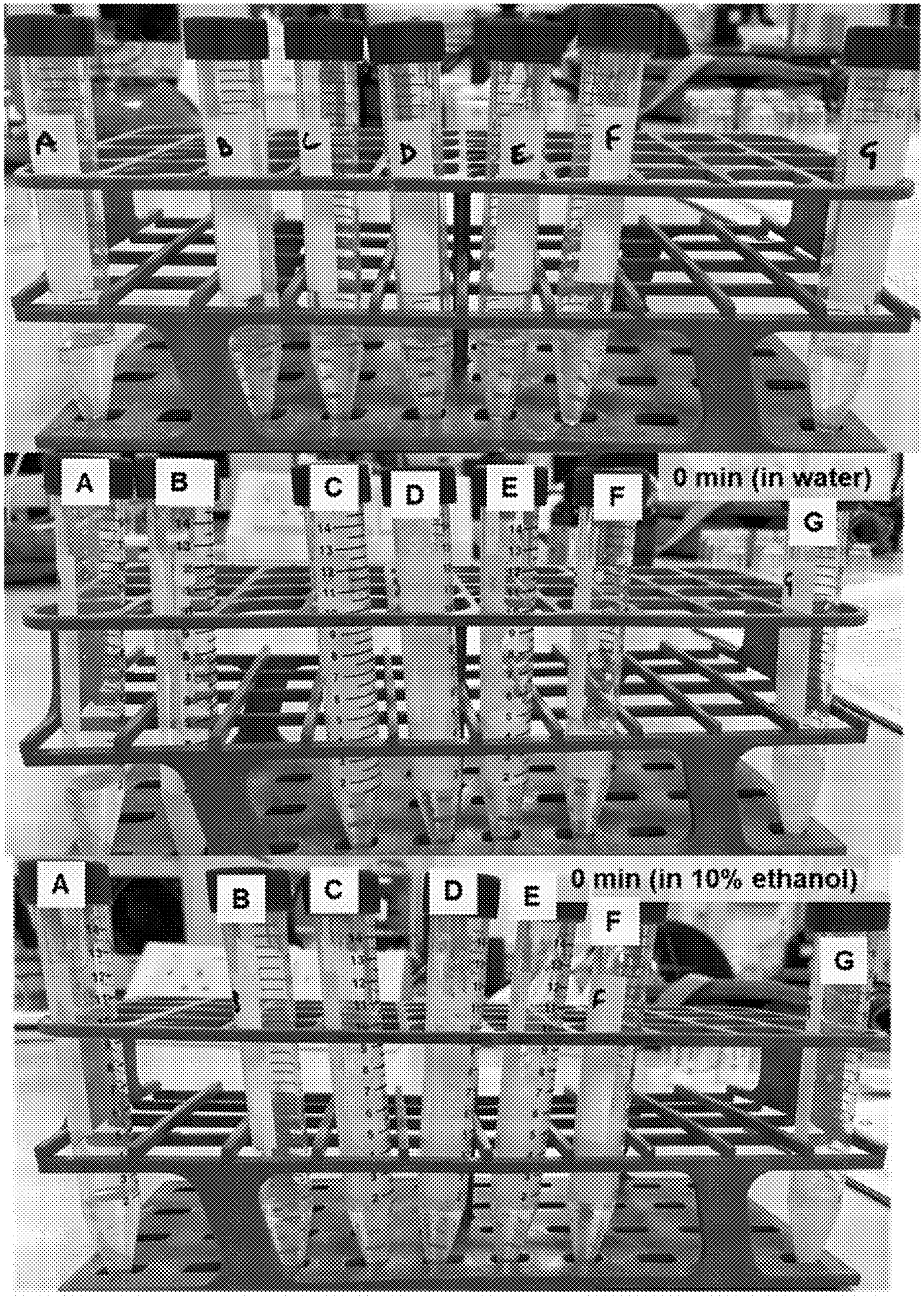
FIG. 9 illustrates foaming tests conducted for some specified xylo-oligosaccharide based surface-active compositions (0.5 wt %) in water and a solution of 10 vol % ethanol in water compared with the xylo-oligosaccharide mixture, decylamine and dodecyl glucoside at time zero minutes (immediately after agitation) A=XOS; B=n-decylamine; C=Example 4 composition; D=Example 5 composition; E=Example 6 composition; F=Example 7 composition; G=Dodecyl Glucoside.
Figure 10:
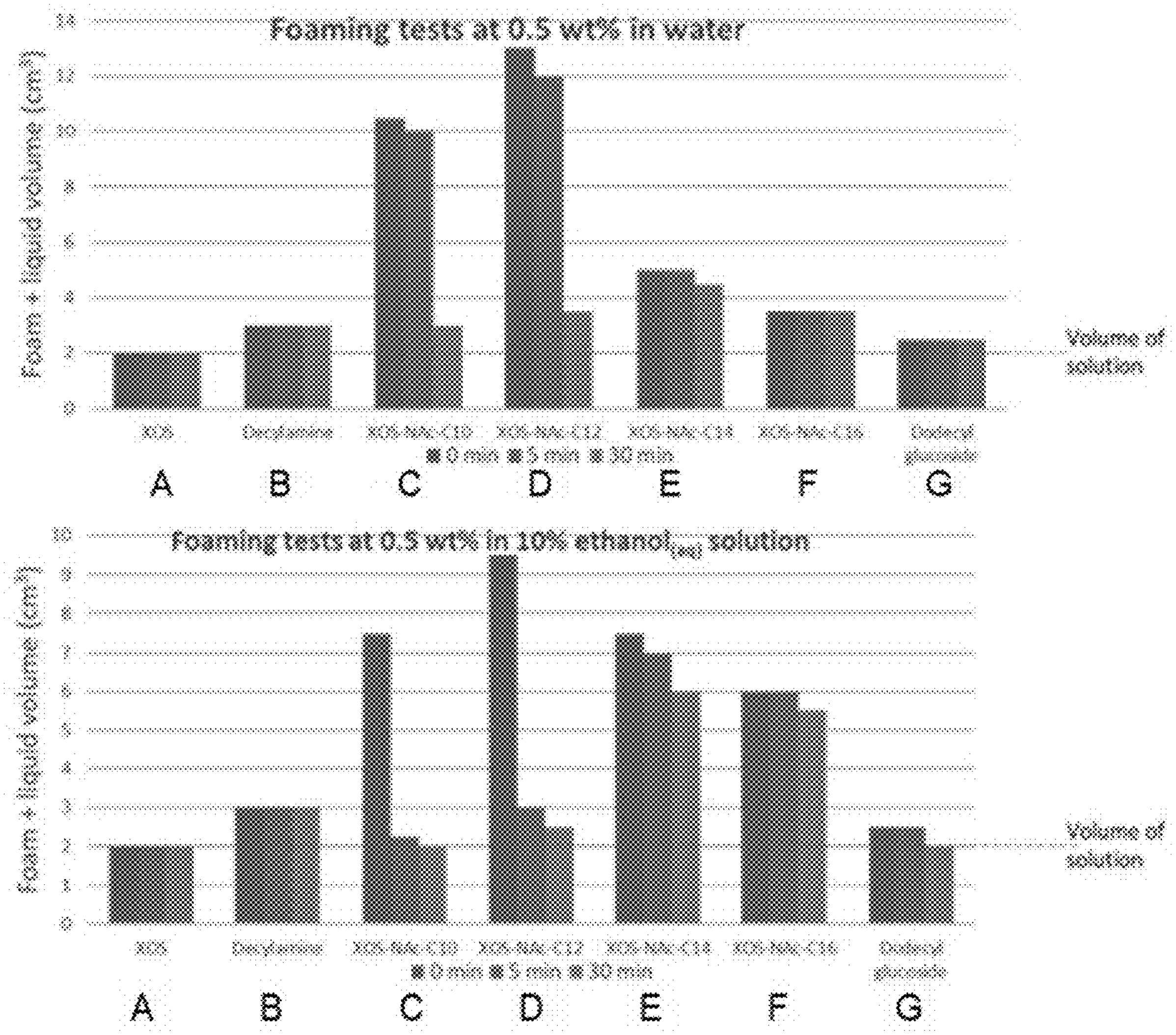
FIG. 10 illustrates results of foaming tests conducted for the xylo-oligosaccharide based surface-active agents in water (0.5 wt %) and a solution of 10 vol % ethanol in water (0.5 wt %) compared with the xylo-oligosaccharides mixture, decylamine and dodecyl glucoside at time zero minutes, five minutes, and thirty minutes A=XOS; B=n-decylamine; C=Example 4 composition; D=Example 5 composition; E=Example 6 composition; F=Example 7 composition; G=Dodecyl Glucoside.
Figure 13A:
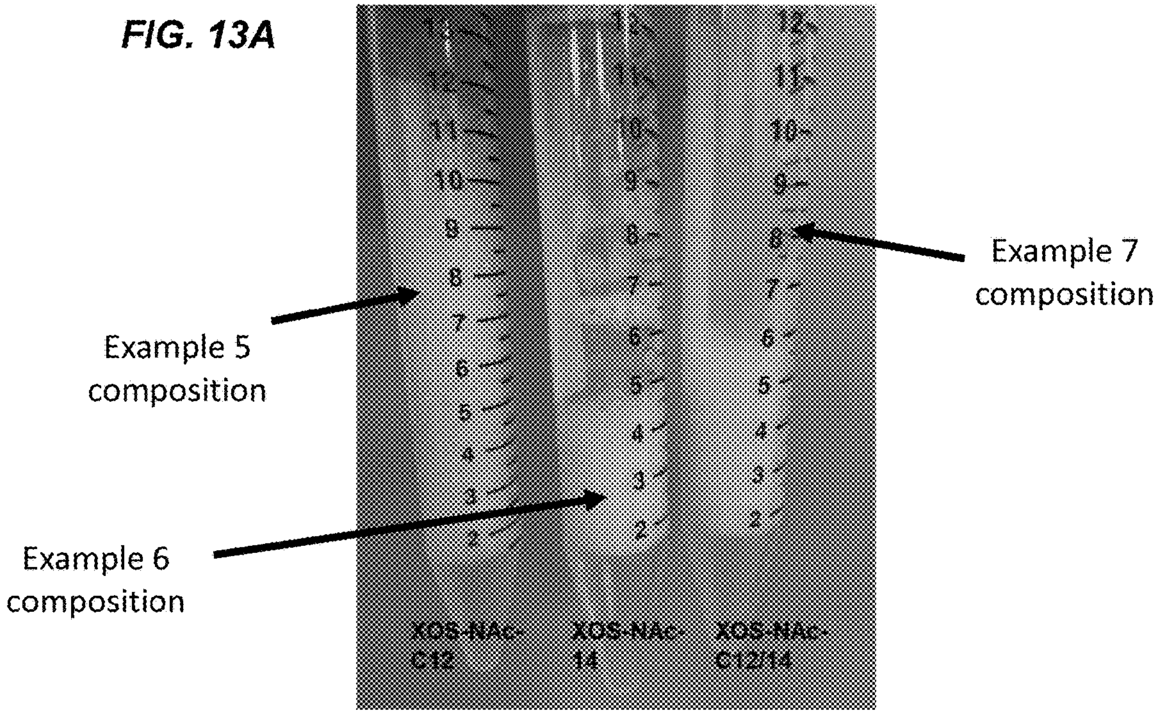
FIG. 13A shows an image of foam generated from a selection of surface-active compositions in aqueous solution after 10 minutes.
Figure 13B:
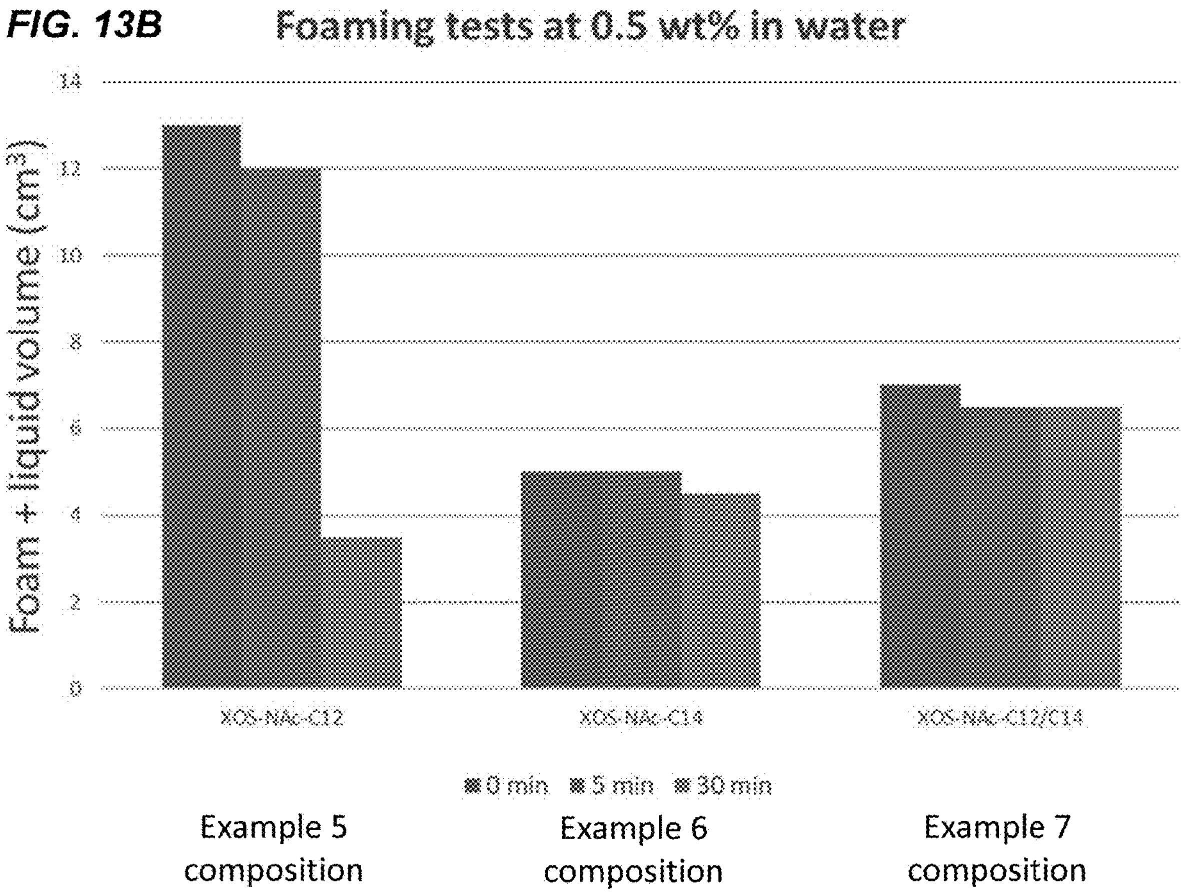
FIG. 13B illustrates foaming application test results for some selected surface-active compositions, specifically example 5 composition, example 6 composition and example 7 composition.

Additional foaming test with Example 4-7 were also conducted. See FIGS. 9-10, 13A-13B. FIG. 9 illustrates foaming tests conducted for the stated inventive surface-active agents (0.5% wt) in water and a solution of 10% ethanol in water compared with the xylooligosaccharides mixture, decylamine and dodecyl glucoside at time zero minutes (immediately after agitation). FIG. 10 depicts the results of the same experiments after 0 minutes (immediately after agitation) but also after 5 min and 30 min. FIG. 13B further depicts specifically the illustrates foaming tests conducted for examples 5, 6 and 7 in water (0.5% wt) at time zero minute, five minutes, and thirty minutes, with FIG. 13A showing an image of the foam appearance after 10 minutes.

The surface-active compositions all demonstrated flash-foam generation upon agitation of their aqueous solutions. For XOS-derived surface-active compositions with shorter alkyl chains (example compositions 4 and 5), the foam height and stability were notably lower in ethanol/water (1:9 v/v) compared with for pure water. Surprisingly, it was found that the foam heights for XOS-derived surface-active compositions with longer chains (example compositions 6 and 7) were higher in ethanol/water (1:9 v/v) compared with for pure water, and that the presence of ethanol did not significantly destabilize the foam (FIG. 10). Generally, compositions containing higher proportions of XOS versus COS reached greater foam heights than compositions with higher COS than XOS proportions, though this did not translate to significant differences in foam lifetime.

h) Example 71—Lipophilic Substances Solubilization Test—Lemongrass Oil

Determination of the solubilization improvement of an example lipophilic oil (lemongrass essential oil) was determined by stepwise addition (2.5 μL) of neat lemongrass essential oil to 2 mL of 5 wt % surface-active compound aqueous solution. After each addition, the sample was agitated with a vortex mixture for 60 s and left to stand for 5 min. If no heterogenous phase was observed visually, the oil was said to be fully soluble. If a heterogenous, immiscible biphasic or emulsion was visible, then the saturation limit for that surface-active component was said to have been exceeded. Each surface-active composition was tested in duplicate. The results (table 6) show that the new inventions are surprisingly effective solubilizers for lemongrass essential oil, and likely essential oils and lipophilic chemical compounds in general. Interestingly, example 11 composition was a notably good solubilizer for lemongrass oil.

TABLE 6

Lemongrass oil solubilization test results

| Substance | Inventive or Comparative | Maximum volume of lemongrass oil solubilized (μL) |
|---|---|---|
| Sodium Dodecyl Sulfate | Comparative | 2.5 |
| Decyl glucoside | Comparative | 2.5 |
| Emulsifan | Comparative | 3.75 |
| Water | Comparative | 0.0 |
| Example 14 composition (N-octyl-N-acetylxylosylamine) | Inventive | 5.0 |
| Example 11 composition (N-decyl-N-acetylxylosylamine) | Inventive | 8.75 |
| Example 13 composition (N-dodecyl-N-acetylxylosylamine) | Inventive | 5.0 |

i) Example 72—Lipophilic Substances Solubilization Test—Preservative P12

Determination of the solubilization improvement of an example lipophilic oil (preservative 12 oil) was determined by stepwise addition (10 μL) of neat preservative 12 oil (supplier) to 2 mL of 5 wt % surface-active compound aqueous solution. After each addition, the sample was agitated with a vortex mixture for 60 s and left to stand for 5 min. If no heterogenous phase was observed visually, the oil was said to be fully soluble. If a heterogenous phase or emulsion was visible, then the saturation limit for that surface-active component was said to have been exceeded. Each surface-active composition was tested in duplicate. The results (table 7) show that the new inventive compositions are surprisingly effective solubilizers for preservative P12. They also show that surface-active compositions containing COS and XOS product mixtures are more effective solubilizes of Preservative P12 if the COS content is 25% or lower, which was unexpected.

TABLE 7 results for the lipophilic substances solubilization test of Example 72.

| Substance | Inventive or Comparative | Maximum volume of preservative P12 solubilized (μL) |
|---|---|---|
| Sodium Dodecyl Sulfate | Comparative | 100 |
| Decyl glucoside | Comparative | 40 |
| Example 5 composition (N-dodecyl-N-acetylxylo-oligosylamine) | Inventive | 50 |
| Example 27 composition (N-dodecyl-N-acetyloligosylamine 75:25 (XOS:CB)-C12) | Inventive | 50 |
| Example 26 composition (N-dodecyl-N-acetyloligosylamine 50:50 (XOS:CB)-C12) | Inventive | 40 |
| Example 25 composition (N-dodecyl-N-acetyloligosylamine 25:75 (XOS:CB)-C12) | Inventive | 40 |
| Example 5 composition (N-dodecyl-N-acetylcellobiosylamine) | Inventive | 20 |

j) Example 73—Aqueous Hydrolytic Stability

Determination of aqueous stability of the test compounds was performed using UPLC-MS. A test compound 10 mg/mL stock solution was prepared by dissolving Example 11 composition (N-decyl-N-acetylxylosylamine) (inventive surface-active composition) in DMSO. Buffer solutions, comprised of simple, commercially-available acidic or basic substances in deionized water were prepared at pH 1, pH 3, pH 4, pH 5, pH 6, pH 7, pH 9, pH 11 and pH 13. 950 μL of each buffer solution were dispensed into a sample vial and to each was added 50 μL of the test compound stock solution (hence preparing solutions with initial concentration of 0.5 mg/mL. The solution was immediately placed in an insulated autosampler maintained at 25° C. and injected without delay into the UPLC-MS (Waters Acquity-TQD). Additional injections were performed at appropriate time points. Concentrations of the test compound were determined from the MS response. Results, shown in table 8, were categorized by the % of the original concentration that had been lost to degradation after 12 hours and again after 1 week of incubation. The result was said to be 'full stability' if the change in concentration detected was within the expected error of the starting concentration.

TABLE 8

The results of the hydrolytic stability study of Example 11 composition, from Example 73.

| Buffer pH | Stability During 12-hour Assay | Stability During 1-week (daily monitoring) |
|---|---|---|
| 1 | Minor (<1%) degradation | Significant degradation (<50%) |
| 3 | Extremely Minor (<0.1%) degradation | Extremely Minor (<0.1%) degradation |
| 4 | Full stability | Full stability |
| 5 | Full stability | Full stability |
| 6 | Full stability | Full stability |
| 7 | Full stability | Full stability |
| 9 | Full stability | Full stability |

TABLE 8-continued

| The results of the hydrolytic stability study of Example 11 composition, from Example 73. | | |
|---|---|---|
| Buffer pH | Stability During 12-hour Assay | Stability During 1-week (daily monitoring) |
| 11 | Extremely Minor (<0.1%) degradation | Extremely Minor (<0.1%) degradation |
| 13 | Extremely Minor (<0.1%) degradation | Partial degradation (<10%) |

k) Example 74—Relative Viscosity

Figure 20:
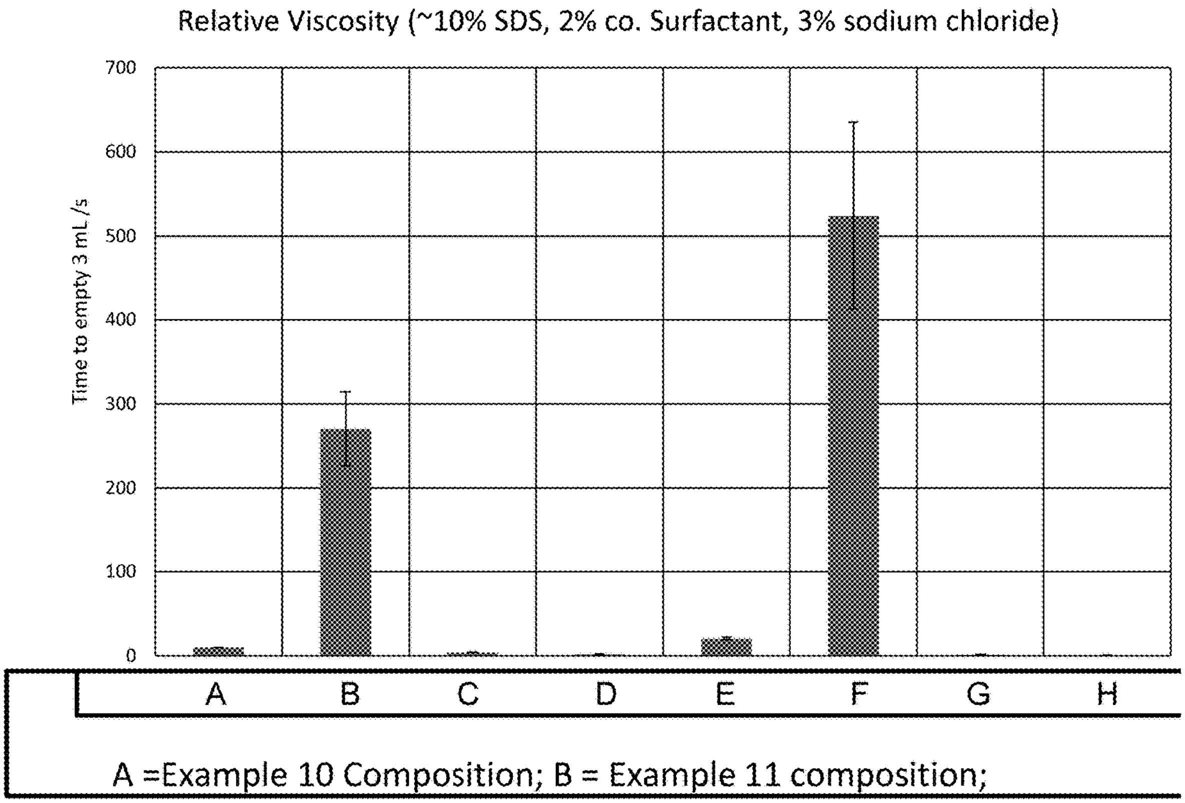
FIG. 20 illustrates the graphical results of relative viscosity measurements. A=Example 10 Composition; B=Example 11 composition; C=Decyl glucoside; D=Dodecyl glucoside; E=Coco glucoside; F=Cocoamidopropyl betaine; G=No additional surface-active composition; H=No additional surface-active composition, no sodium dodecyl sulfate, and no sodium chloride.

To Solutions of 10 wt % sodium dodecyl sulfate (10 mL) was added 0.3 g of NaCl and 0.655 mL of 30 wt % testing surface-active composition solution. The mixtures were then stirred for 15 min until homogeneous and maintained at 27° C., with stirring, until the time of testing. 4.5 mL of each testing mixture was added to separate 5 mL stripettes (cut at the 5 mL line). The time taken for precisely 3 mL of testing mixture to pass out of the stripette by gravity was recorded. The test was repeated in triplicate. Averaged results are depicted in FIG. 20 and table 9. It was unexpected that example 11 composition recorded such high viscosity over example 14 composition, which differs by a slightly smaller alkyl chain (octyl instead of decyl).

TABLE 9

| The results for relative viscosity tests of Example 74. | | |
|---|---|---|
| Testing surface-active composition | Inventive or Comparative | Average time (s) |
| Example 14 composition (N-octyl-N-acetylxylosylamine) | Inventive | 10.0 |
| Example 11 composition (N-decyl-N-acetylxylosylamine) | Inventive | 270.3 |
| Dodecyl glucoside | Comparative | 4.0 |
| Lauryl glucoside | Comparative | 1.9 |
| Coco glucoside | Comparative | 20.7 |
| Cocamidopropyl betaine | Comparative | 524.0 |
| No testing surface-active composition | Comparative | 1.5 |

l) Example 75—Horizontal Pseudo-Two-Dimensional Foam Stability

Figure 24:
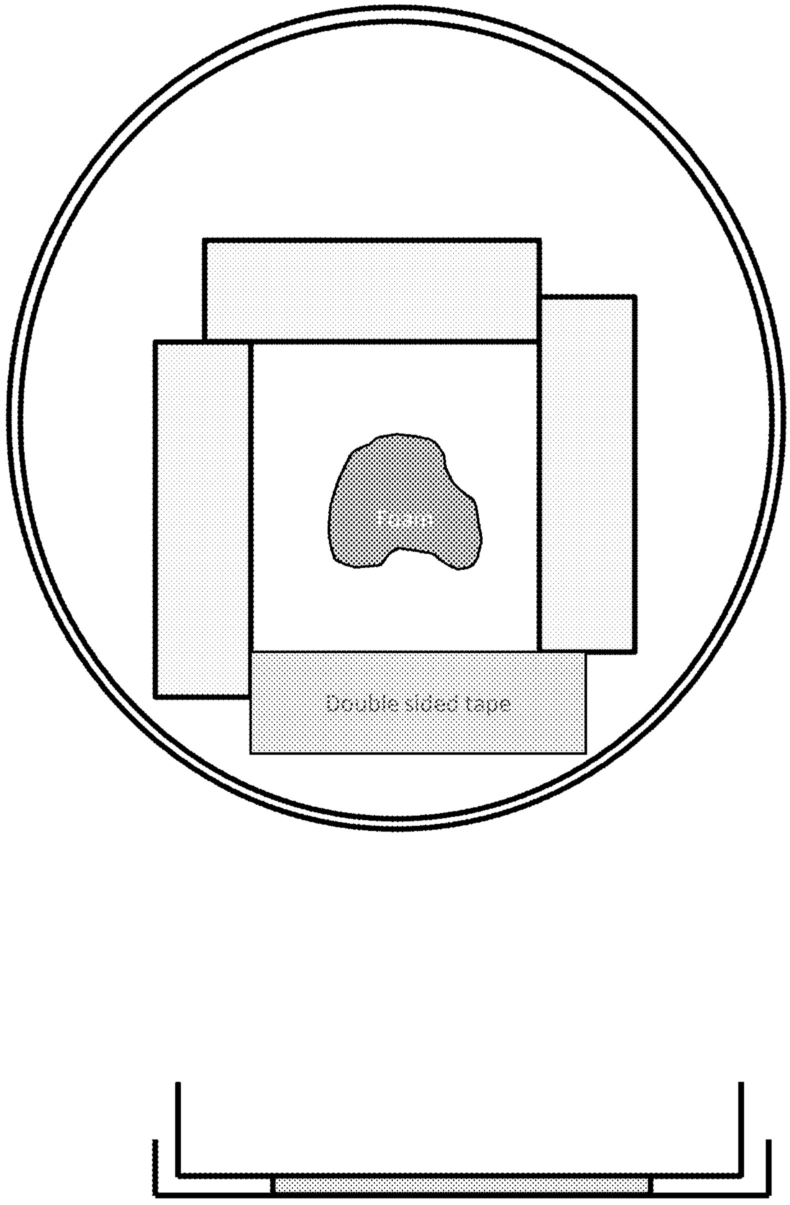
FIG. 24 depicts a diagram of top view and side view to show how an application test of the foaming characteristics of some surface-active compositions was performed.

For each sample, 4.0×1.0×3.5 cm strips of 1 mm thick double-sided tape were cut and stuck to the inside lid of a petri dish in an arrangement shown in FIG. 24 as to create a 3×3 cm square cell.

Figure 25:
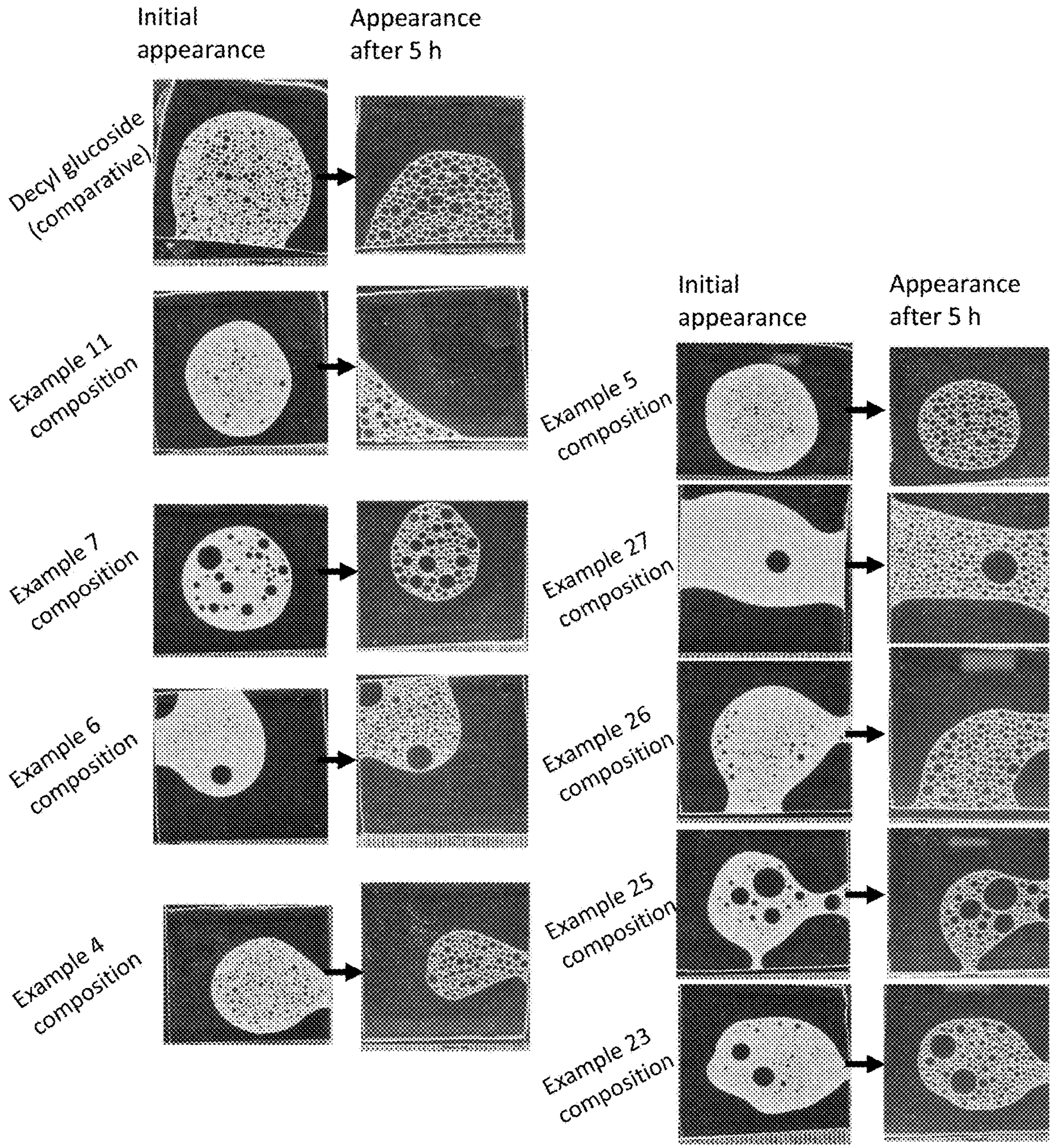
FIG. 25 depicts photographs of isolated foaming phases generated from agitated aqueous solutions of surface-active, immediately after isolation and then 5 h later.

For this test the following inventive surface-active compositions were trialed: Example 11 composition, Example 7 composition, Example 6 composition, Example 4 composition, Example 5 composition, Example 27 composition, Example 26 composition, Example 25 composition, Example 23 composition. As a comparative example, decyl glucoside was also trialed. 10 mg of example surface-active composition was dissolved in 2 mL of deionized water in a 15 mL FALCON tube and was then shaken vigorously for 30 seconds, to generate a foam in the head-space above the solutions. FIG. 24 depicts a diagram of top view and side view to show how an application test of the foaming characteristics of some surface-active compositions was performed. Further, FIG. 25 depicts photographs of isolated foaming phases generated from agitated aqueous solutions of surface-active, immediately after isolation and then 5 h later using a setup depicted in FIG. 24. A 400 μL sample was pipetted from the midpoint of the foaming head-space above the solutions and placed onto the prepared petri-dish lid, within the boundaries of the double-sided tape cell (FIG. 24). The base of the petri-dish was then placed inside the up-turned lid of the petri-dish and stuck to the double-sided tape. The foam was then photographed initially and again after 5 hr. The photographs obtained are depicted in FIG. 25. The results demonstrate that the inventive surface-active compositions are capable of forming foams that are stable for more than 5 h, albeit at reducing bubble-density over time.

m) Example 76—Verification of Ability of Inventive Composition to Remove Common Stains from Objects (i) Removing Fingerprint Stains from Glass Surface To a glass mirror that was visibly contaminated with fingerprint stains, as depicted in FIG. 23A, was sprayed 0.5 mL of Example 51 formulated solution product. The treated mirror surface was then wiped across with absorbent laboratory tissue three times. The presence of the fingerprint stains was no longer apparent by visual inspection, as depicted in FIG. 23D.

(ii) Removing Grease Stain from Plastic Surface

Figure 23B:
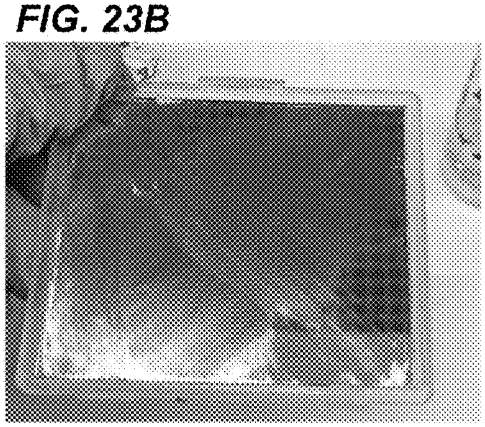
Figure 23E:
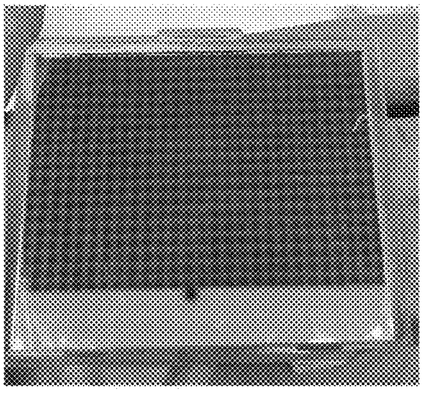

To a plastic sample-plate box lid that was visibly contaminated with a greasy residue, as depicted in FIG. 23B, was sprayed 0.5 mL of example 51 formulated solution product. The treated plastic surface was then wiped across with absorbent laboratory tissue three times. The presence of the greasy residue was no longer apparent by visual inspection, as depicted in FIG. 23E.

(iii) Removing a Cosmetic Product Stain from Veneer Benchtop Surface

Figure 17:
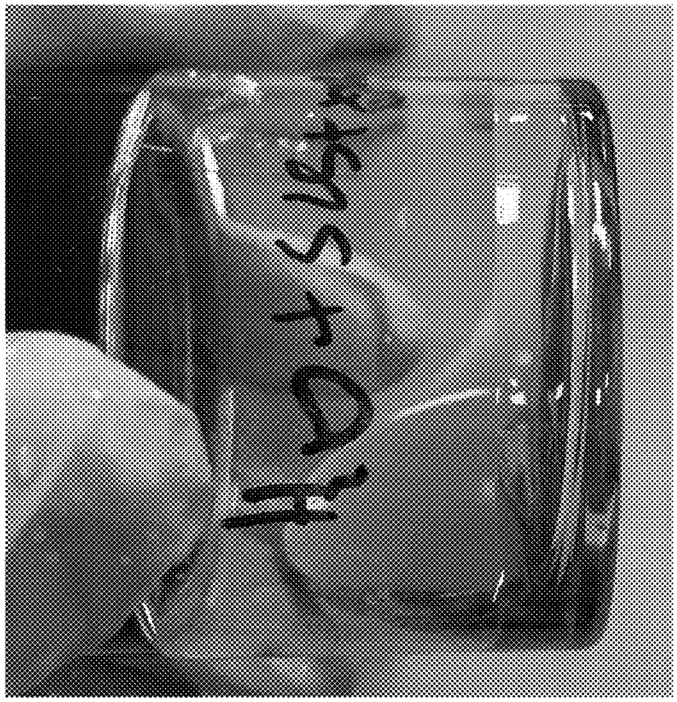
FIG. 17 illustrates a thick aqueous solution made from combining example 5 composition (1 wt %) with a co-surfactant (sodium dodecyl sulfate, 10 wt %) and sodium chloride (3 wt %).
Figure 23C:
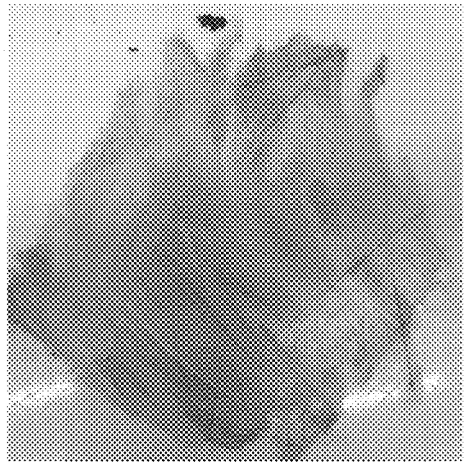
Figure 23F:
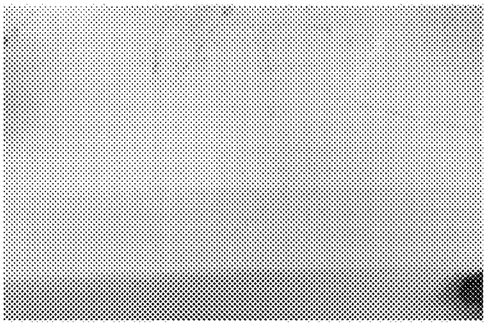

To a synthetic veneer-surfaced benchtop that was visibly contaminated with an oil-based cosmetic product containing a colorant, as depicted in FIG. 23C, was sprayed 0.5 mL of example 51 formulated solution product. The benchtop surface was then wiped across with absorbent laboratory tissue three times. The presence of the cosmetic product stain was no longer apparent by visual inspection, as depicted in FIG. 23F.

n) Example 77—Salt-Induced Thickening of Solutions Containing Surface-Active Compositions To an aqueous solution of sodium dodecyl sulfate (5 mL, 10 wt %) was added sodium chloride (3 wt %) and selected inventive or comparative surface-active composition (2 wt %). The formed liquid was placed in ajar and rotated 90° and photographed, to obtain a visual interpretation of the thickness. The photograph is depicted in FIG. 17. The surface-active composition included in the test were example 5 composition (inventive, FIG. 17). The result showed that the formulations containing inventive surface-active compositions displayed the desired thickened effect expected of surface-active compositions.

o) Example 78—Critical Micellular Concentration Determination

Stock solutions were prepared of known weight concentration (range spanning 0.005 wt %-5.000 wt %) of inventive surface-active compositions (by solution of the appropriate weight of example composition in deionized water). For reference, the surface tension of deionized water in the absence of a surface-active composition is 73 mN. The surface tension at the different concentrations was measured and from this data, the CMC was calculated as the concentration where further increases in concentration did not lead to a greater reduction in surface tension. The surface tensions of the solutions at the concentration of the CMC were also noted. Results are shown in table 10 and graphical results are depicted in FIG. 22.

TABLE 10

Results of the critical micellular concentration determination experiments of Example 78

| Substance | Inventive or Comparative | CMC (wt %) | Solution Surface tension at CMC (mN) |
|---|---|---|---|
| Example 5 composition (N-dodecyl-N-acetylxylo-oligosylamine) | Inventive | 0.03 | 39 |
| Example 27 composition (N-dodecyl-N-acetyloligosylamine 75:25 (XOS:CB)-C12) | Inventive | 0.02 | 41 |
| Example 26 composition (N-dodecyl-N-acetyloligosylamine 50:50 (XOS:CB)-C12) | Inventive | 0.02 | 43 |
| Example 25 composition (N-dodecyl-N-acetyloligosylamine 25:75 (XOS:CB)-C12) | Inventive | 0.03 | 44 |
| Example 23 composition (N-dodecyl-N-acetylcellobiosylamine) | Inventive | 0.03 | 45 |
| Example 11 composition (N-decyl-N-acetylxylosylamine) | Inventive | 0.04 | 36 |
| Example 17 composition (N-tetradecyl N-acetyl oligosylamine (XOS/COS = 3:1)) | Inventive | <0.005% | 46 |

The results show that all the inventive surface-active concentrations greatly reduce the surface tension and reach their CMC at low wt % concentrations. Example 17 composition was found to have an especially low wt % (the value was found to be below 0.005 wt %, but cannot be estimated more precisely). CMC values or the surface tension at the CMC did not correlate significantly with chemical structures or identities of molecules, but the test confirms decisively the surface-active nature of the inventive compositions. Similarly, the surface tensions of the solutions of inventive example were much lower than water alone and competitive with commercially-used surface-active compositions (generally 30-50 mN).

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A surface-active composition comprising two or more compounds of Formula (I): H—$(X)_n$—Y—R1, wherein:

R1 is independently a substituted or unsubstituted $C_1$-$C_{18}$ alkyl, a substituted or unsubstituted $C_2$-$C_{18}$ alkenyl, or a substituted or unsubstituted $C_2$-$C_{18}$ heteroalkyl, Y is oxygen or N—R2, R2 is independently hydrogen or a substituted or unsubstituted —C(═O)—$C_1$-$C_{17}$ alkyl, X is independently a reducing saccharide residue comprising xylose and/or arabinose, n is an integer of 2 to 8, wherein at least one compound of the two or more compounds is different from another compound of the two or more compounds.

2. The surface-active composition of claim 1, wherein the reducing saccharide residue further comprises glucose.

3. The surface-active composition of claim 1, wherein Y is bound to an anomeric carbon of a first reducing saccharide residue of $(X)_n$.

4. The surface-active composition of claim 1, wherein compounds of at least 60% of the MS peak area obtained from LC-MS responses of the surface-active composition is assigned to compounds with an n of 2 to 8.

5. The surface-active composition of claim 2, wherein a first plurality of compounds of the two or more compounds is H-$(xylose)_n$-Y—R1, and wherein a second plurality of compounds of the two or more compounds is H-$(glucose)_n$-Y—R1.

6. The surface-active composition of claim 5, wherein a ratio of the first plurality of compounds to the second plurality of compounds is at least 99:1.

7. The surface-active composition of claim 5, wherein a ratio of the first plurality of compounds to the second plurality of compounds is at least 95:5.

8. The surface-active composition of claim 5, wherein a ratio of the first plurality of compounds to the second plurality of compounds is at least 90:10.

9. The surface-active composition of claim 5, wherein a ratio of the first plurality of compounds to the second plurality of compounds is at least 80:20.

10. The surface-active composition of claim 5, wherein a ratio of the first plurality of compounds to the second plurality of compounds is at least 10:90.

11. The surface-active composition of claim 5, wherein a ratio of the first plurality of compounds to the second plurality of compounds is at least 5:95.

12. The surface-active composition of claim 5, wherein a ratio of the first plurality of compounds to the second plurality of compounds is at least 1:99.

13. The surface-active composition of claim 1, wherein Y is N—R2.

14. The surface-active composition of claim 13, wherein R1 is independently a substituted or unsubstituted $C_1$-$C_{18}$ alkyl, a substituted or unsubstituted $C_8$-$C_{18}$ alkenyl, or a substituted or unsubstituted $C_2$-$C_{18}$ heteroalkyl.

15. The surface-active composition of claim 5, wherein the first plurality of compounds comprises xylo-oligosaccharides (XOS) and/or wherein the second plurality of compounds comprises cello-oligosaccharide (COS).

16. The surface-active composition of claim 1, wherein the surface-active composition comprises monosaccharide.

17. A personal care product, or a home care product, comprising the surface-active composition of claim 1 and a topically acceptable excipient.

18. The personal care product, or a home care product, of claim 17, wherein the personal care product, or the home care product, is an emulsion, a lotion, a gel, or a cream.

19. The personal care product, or the home care product, of claim 17, wherein the personal care product, or the home care product, is a water-in-oil emulsion containing the surface-active composition.

20. The personal care product, or the home care product, of claim 17, wherein the personal care product, or the home care product, is an oil-in-water emulsion containing the surface-active composition.

21. The surface-active composition of claim 1, wherein X is independently a reducing saccharide residue comprising xylose and arabinose.

* * * * *